United States Patent
Webb et al.

(10) Patent No.: US 12,476,792 B2
(45) Date of Patent: Nov. 18, 2025

(54) SYSTEM AND METHOD FOR KEY ESTABLISHMENT

(71) Applicant: ARQIT LIMITED, London (GB)

(72) Inventors: David Webb, Sussex (GB); Daryl Burns, Gloustershire (GB); David Williams, Surrey (GB)

(73) Assignee: Arqit Limited, London (GB)

( * ) Notice: Subject to any disclaimer, the term of this patent is extended or adjusted under 35 U.S.C. 154(b) by 151 days.

(21) Appl. No.: 18/272,091

(22) PCT Filed: Jan. 13, 2022

(86) PCT No.: PCT/GB2022/050069
§ 371 (c)(1),
(2) Date: Jul. 12, 2023

(87) PCT Pub. No.: WO2022/153051
PCT Pub. Date: Jul. 21, 2022

(65) Prior Publication Data
US 2024/0072996 A1    Feb. 29, 2024

(30) Foreign Application Priority Data

Jan. 13, 2021  (GB) ...................................... 2100434

(51) Int. Cl.
*H04L 9/08* (2006.01)
(52) U.S. Cl.
CPC .......... *H04L 9/0819* (2013.01); *H04L 9/0838* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| 5,764,765 A | * | 6/1998 | Phoenix | ................. | H04L 9/0858 380/256 |
| 6,748,083 B2 | * | 6/2004 | Hughes | ................. | H04L 9/0858 380/278 |

(Continued)

FOREIGN PATENT DOCUMENTS

| CN | 108134669 | 6/2018 |
| CN | 111245618 | 6/2020 |
| WO | 2019204213 | 10/2019 |

*Primary Examiner* — Sharif E Ullah
(74) *Attorney, Agent, or Firm* — Dentons US LLP

(57) ABSTRACT

A computer-implemented method of establishing a key between a first and a second device in a network including a first and a second key node, the first and second key nodes with access to a same set of keys, the method including receiving, at the first device, data representative of first key establishment data from the first key node and the second device for calculating a Bilocation Key from a selected key from the set of keys; and receiving, at the second device, data representative of second key establishment data from the first device for requesting the Bilocation Key from the second key node, wherein the Bilocation Key is calculated based on the selected key from the set of keys; and wherein the first and second devices use corresponding Bilocation Keys to each generate a Final Key based on an agreed portion of the first and second key establishment data.

15 Claims, 15 Drawing Sheets

FIG. 1b

(58) Field of Classification Search
CPC ....... H04L 9/3226; H04L 9/0891; H04L 9/14;
H04L 9/0827; H04L 2209/24; H04L 9/08;
H04L 9/0819; H04L 9/088; H04L 9/0869;
H04W 12/041; H04W 12/0431; H04W
12/0433; H04W 12/04; H04W 12/61;
H04W 12/63; H04W 12/71; G06F 21/31;
G06F 21/44; G06F 7/588; G06F 21/72;
G06F 21/86
USPC ........ 713/171, 150, 163, 181; 726/2, 21, 36;
380/255, 264, 276
See application file for complete search history.

(56) References Cited

U.S. PATENT DOCUMENTS

| | | | | |
|---|---|---|---|---|
| 7,437,081 | B2* | 10/2008 | Mitchell | H04B 10/70 398/154 |
| 8,050,566 | B2* | 11/2011 | Luo | H04L 9/0852 380/278 |
| 8,654,979 | B2* | 2/2014 | Hicks | H04L 9/0852 380/278 |
| 8,755,525 | B2* | 6/2014 | Wiseman | H04L 9/0852 380/278 |
| 8,762,728 | B2* | 6/2014 | Wiseman | H04L 9/321 380/279 |
| 8,855,316 | B2* | 10/2014 | Wiseman | H04L 9/0855 380/278 |
| 9,960,465 | B2* | 5/2018 | Dudley | H01M 50/204 |
| 10,057,058 | B2* | 8/2018 | Murakami | H04L 9/0858 |
| 11,621,836 | B2* | 4/2023 | Ashrafi | H04L 9/3239 713/171 |
| 2005/0138352 | A1* | 6/2005 | Gauvreau | H04L 9/3247 713/153 |
| 2005/0221759 | A1* | 10/2005 | Spadafora | G08G 1/093 455/39 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2011/0019822 | A1* | 1/2011 | Khan | H04L 9/0833 380/255 |
| 2011/0206204 | A1* | 8/2011 | Sychev | H04J 14/06 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0127127 | A1* | 5/2016 | Zhao | H04W 12/041 713/171 |
| 2016/0155327 | A1* | 6/2016 | Schlienz | G08G 1/096791 340/907 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2017/0338952 | A1* | 11/2017 | Hong | H04L 9/083 |
| 2018/0176091 | A1* | 6/2018 | Yoon | H04L 5/1446 |
| 2019/0036821 | A1* | 1/2019 | Levy | G06F 12/0868 |
| 2019/0260581 | A1* | 8/2019 | Su | H04L 9/08 |
| 2019/0349392 | A1* | 11/2019 | Wetterwald | H04L 43/0852 |
| 2020/0084222 | A1* | 3/2020 | William | H04L 63/12 |
| 2020/0322175 | A1* | 10/2020 | Chen | H04L 9/3066 |
| 2020/0412613 | A1* | 12/2020 | Masuda | H04L 12/185 |
| 2022/0006613 | A1* | 1/2022 | Hetzler | H04L 9/0825 |
| 2022/0360434 | A1* | 11/2022 | Choi | H04L 63/061 |
| 2022/0417750 | A1* | 12/2022 | Zhang | H04W 36/0038 |
| 2023/0145683 | A1* | 5/2023 | Mandich | H04L 9/0656 380/47 |

* cited by examiner

SYSTEM AND METHOD FOR KEY ESTABLISHMENT

This application is the National Stage filing under 35 U.S.C. 371 of International Application No. PCT/GB2022/050069, filed Jan. 13, 2022, claims the benefit of GB Application No. 2100434.6, filed Jan. 13, 2021, the contents of which are all hereby incorporated by reference herein in their entirety.

The present application relates to a system, apparatus and method for key establishment and applications thereto.

BACKGROUND

Quantum key distribution (QKD) is a secure communication method which implements a cryptographic QKD protocol involving components of quantum mechanics for distributing cryptographic keys. It enables two parties to produce a shared random secret key or cryptographic key known only to them, which can then be used to encrypt and decrypt messages. Satellite QKD systems may use satellite(s) to serve identical quantum-safe keys to two or more global locations using a quantum secure channel, thus ensuring that an eavesdropper cannot intercept the keys in transit between satellite and receiving ground stations. This allows large organisations and governments to install their own Optical Ground Receivers (OGRs) at strategic locations around the globe for receiving the quantum-safe keys from one or more satellites of a Satellite QKD system and directly harvest the quantum-safe keys from the OGR's Hardware Security Module (HSM) directly into their infrastructure and software applications for quantum-secure communications and/or other applications and the like.

However, for the majority of consumers, individuals and/or organisations the upfront costs and complexities associated with leasing, installing and maintaining a set of OGRs is prohibitive and, as such, a Quantum Key Distribution (QKD) System such as a Satellite QKD system (or terrestrial QKD system using fibre links and terrestrial receivers) will not be accessible.

There is a desire that allows or enables two parties to establish a key therebetween, where the key is unknown or underivable by any trusted or untrusted parties used in exchanging key information associated with the established key. There is also a desire for the established key to be derived/delivered to the two parties for use accordingly based on, without limitation, for example secure communications between the two parties; establish shared keys between the two parties for use in other group key establishment protocols for establishing a group key among a group of parties including the two parties; secure a communication session between the two parties; establish a long-lived communication channel between the two parties; the key that is established may form a signing secret between the two parties, which may be used, without limitation, for example to create a MAC etc.; delivering the same key to two parties (e.g. network devices); encrypting one or more files or data to a first party (e.g. an endpoint device) and the second party (e.g. a (cloud) server); encrypting a disk or data media to a first party (e.g. an endpoint device) and the second party (e.g. (cloud) server); using the same established key with two parties such as, without limitation, for example two separate cloud services and/or two separate applications; using the established key as a symmetric signing key to two parties; the key established between the two parties may be used for any other type of cryptography performed by each of or between the two parties and the like, and/or as the application demands. There is a further desire for QKD applications/services provided via a QKD cloud-based infrastructure/network to allow or enable more parties, consumers, individuals, and/or organisations to harness the power of QKD through a cloud based infrastructure hosted by a trusted party without the need to lease and install an OGR of their own. In particular, there is a desire for a QKD service that enables two parties external to the cloud-based infrastructure to securely establish a key in a quantum-secure manner between the two parties, where the key is unknown or underivable even to the trusted party hosting the QKD service.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of establishing or sharing a key that enables at least two different systems, endpoints or parties to request the same shared key or establish the same key, where a first system, endpoint, or party obtains the key information required to derive its copy from a server and/or key serving node in a communication system (e.g. a QKD communication network/system), and the other second system, endpoint or party securely obtains the key information required to derive its copy from a the same or a different server connected to the same or a different key serving-node in the communication system (e.g. a QKD communication network/system), which allows delivery of the shared keys (e.g. QKD keys if a set of QKD keys are used to derive the shared keys) rooted in the key serving node(s) (e.g. two separate QKD key nodes, or the same key node) through a cloud service.

In a first aspect, the present disclosure provides a computer-implemented method of establishing a key between a first device and a second device in a network, the network comprising a first key node and a second key node, the first key node and second key node with access to a same set of keys, the method comprising: receiving, at the first device, data representative of first key establishment data from at least the first key node and the second device for use in calculating a Bilocation Key, wherein the Bilocation key is based on a selected key from the set of keys; and receiving, at the second device, data representative of second key establishment data from at least the first device for use in requesting the Bilocation Key from the second key node, wherein the Bilocation Key is calculated based on the selected key from the set of keys; wherein the first and second devices use their corresponding Bilocation Keys to each generate a Final Key based on an agreed portion of the first key establishment data and second key establishment data.

As an option, the computer-implemented method according to the first aspect, wherein the first device and the second device are using a quantum-secure network, the quantum-secure network comprising the first key node and the second key node, the set of keys of the first key node and second key node being a set of quantum distributed keys that are the same, the method further comprising: receiving, at the first device, data representative of first key establishment data from at least the first key node and the second device for use in calculating the Bilocation Key, wherein the Bilocation key is based on a selected quantum distributed key from the set of quantum distributed keys; and receiving, at the second device, data representative of second key establishment data from at least the first device for use in requesting the Bilocation Key from the second key node, wherein the Bilocation Key is calculated based on the selected quantum distributed key from the set of quantum distributed keys; wherein the first and second devices use their corresponding Bilocation Keys to each generate the Final Key based on an agreed portion of the first key establishment data and second key establishment data.

As another option, the computer-implemented method according to the first aspect, wherein the Final Key is calculated by each of the first and second devices based on combining their corresponding Bilocation Keys with an agreed combination of one or more random nonces received in the first or second session establishment data therebetween.

As another option, the computer-implemented method according to the first aspect, wherein the Final Key is calculated by each of the first and second devices based on their corresponding Bilocation Keys and a challenge response protocol the results of which are used to agree the Final Key.

As an option, the computer-implemented method according to the first aspect, wherein receiving, at the first device, data representative of first session establishment data further comprising: performing a first handshake with the second device to receive data representative of identity data associated with the second device and second key node, and a first nonce generated by the second device; requesting an Intermediate Bilocation Key from the first key node, wherein the request includes data representative of the retrieved identity data and a third nonce computed from the received first nonce and a second nonce generated by the first device, wherein the first key node uses the request data and a selected key from the set of keys to establish the Intermediate Bilocation Key and a first anti- replay nonce; receiving the Intermediate Bilocation Key and the first anti-replay nonce from the first key node; and performing a further handshake with the second device for receiving a second anti-replay nonce from the second device after the second device receives the Bilocation Key and the second anti-replay nonce from the second key node.

As another option, the computer-implemented method according to the first aspect, wherein receiving, at the second device, data representative of second session establishment data further comprising: performing a second handshake with the first device to receive data representative of identity data associated with the first device and first key node, and the first anti-replay nonce, and the second nonce; requesting a Bilocation Key from the second key node, wherein the request includes data representative of the retrieved identity data, a third nonce computed from the first nonce and second nonce, and the first anti-replay nonce, wherein the second key node uses the data in the request and a selected key from the set of keys to generate the Bilocation Key; receiving the Bilocation Key from the second key node and a second anti-replay nonce generated by the second key node.

As another option, the computer-implemented method according to the first aspect, wherein receiving, at the first device, data representative of first session establishment data further comprising: sending, by the first device, a first handshake request for the second device to provide data representative of: the identity of the second device; the identity of the second key node; and a first nonce generated by the second device; receiving, from the second device, data representative of: the generated first nonce; the identity of the second device; and the identity of the second key node; generating, by the first device, a second random nonce; sending, from the first device, an Intermediate Bilocation Key request to the first key node, wherein the Intermediate Bilocation Key request includes data representative of: the identity of the second device, the identity of the second node, a third nonce based on combining the first and second nonces; receiving, at the first device, the Intermediate Bilocation Key established by the first key node and a first anti-replay nonce generated by the first key node; sending, by the first device, a second handshake message to the second device including data representative of: the second nonce and first anti-replay nonce; the identity of the first device; and the identity of the first key node; generating at the second device the third nonce based on the received second nonce and its generated first nonce; sending, by the second device, a Bilocation Key request to the second key node including data representative of: the third and first anti-replay nonces; the identity of the first device; and the identify of the first key node; receiving, at the second device, the Bilocation Key established by the second key node and a second anti-replay nonce generated by the second key node, wherein the second key node establishes the Bilocation Key based on generating the Intermediate Bilocation Key based on the received data from the second device and combining the Intermediate Bilocation Key with the second anti-replay nonce; sending, from the second device, in a further handshake message the received second anti-replay nonce to the first device; generating, at the first device, the Bilocation key based on combining the received second anti-replay nonce with the received Intermediate Bilocation Key; wherein the first device and second device each establish a Final Key therebetween based at least on the Bilocation key.

As an option, the computer-implemented method according to the first aspect, further comprising establishing, at the first key node, an Intermediate Bilocation Key for use by the first device in calculating the Bilocation Key, establishing the Intermediate Bilocation Key comprising: receiving, at the first key node from the first device, a Intermediate Bilocation Key request to generate the Intermediate Bilocation Key, wherein the request includes data representative of: the identity of the second device, the identity of the second key node, and a third nonce which is derived from a first random nonce generated by the second device and a second random nonce generated by the first device; selecting, at the first key node, a key from the set of keys accessible by the first key node using a key selection function with inputs based at least on data representative of the identity of the second device, the identity of the second key node, the identity of the first device, the identity of the first key node, and the third nonce, wherein the set of keys accessible by the first key node are the same as the set of keys accessible by the second key node; generating, at the first key node, a first random anti-replay nonce; generating, at the first key node, the Intermediate Bilocation Key based on the selected key, the first anti-replay nonce, the identity of the second device, the identity of the second key node, the identity of the first device, the identity of the first key node, and the third nonce; sending, from the first key node to the first device, the Intermediate Bilocation Key and the first anti-replay nonce.

As a further option, the computer-implemented method according to the first aspect, further comprising establishing, at the second key node, the Bilocation Key for use by the second device in calculating the Key, wherein establishing the Bilocation Key comprising: receiving, at the second key node from the second device, a request for a Bilocation Key, wherein the request includes data representative of: the identity of the first device, the identity of the first key node, a third nonce derived from a first random nonce generated by the second device and a second random nonce generated by the first device, and a first anti-replay nonce received at the second device from the first device; selecting a key from the set of keys accessible by the second key node using a key selection algorithm based at least on the identity of the second device, the identity of the second key node, the identity of the first device, the identity of the first key node, and the third nonce, wherein the set of keys accessible by the first key node are the same as the set of keys accessible by the second key node; generating, at the second key node, the Intermediate Bilocation Key based on the selected key, the first anti-replay nonce, the identity of the second device, the identity of the second key node, the identity of the first device, the identity of the first key node, and the third nonce; generating, at the second key node, a second random anti-replay nonce; generating, at the second key node, the Bilocation Key based on combining the Intermediate Bilocation Key with the second anti-replay nonce; and sending, from the second key node to the second device, data representative of the Bilocation Key and the second anti-replay nonce.

Optionally, the computer-implemented method according to the first aspect, wherein sending, from the first device, the Intermediate Bilocation Key request further comprising: generating, by the first device, a second random nonce, NI; generating, by the first device, the third nonce, N IR, based on the second random nonce, N I, and the first random nonce, N R; creating, by the first device, a first incomplete link-info data packet, L_I, based on data representative of at least: the identity of the second device, ID R; the identity of the second key node, KID_R; and the third nonce, N IR; sending, from the first device to the first key node, a Intermediate Bilocation Key requests, wherein the request includes data representative of the first incomplete link-info data packet, L_I.

As another option, the computer-implemented method according to the first aspect, wherein the first incomplete link-info packet takes the form L_I={ID_R, KID_R, N_IR}.

As another option, the computer-implemented method according to the first aspect, wherein the data representative of the third nonce, N IR, comprises data representative of a hash of the third nonce, N IR'.

As another option, the computer-implemented method according to the first aspect, wherein the first incomplete link-info packet takes the form L_I={ID_R, KID_R, N_IR'}

As an option, the computer-implemented method according to the first aspect, wherein establishing, by the first key node, the Intermediate Bilocation Key further comprising: receiving, at the first key node from the first device, the Intermediate Bilocation Key request, wherein the request includes data representative of the incomplete link-info data packet, L_I; generating, by the first key node, a first complete link-info data packet, L', using data representative of at least: the identity of the first device, ID I; the identity of the first key node, KID I; data representative of the received first incomplete link-info packet, L_I; calculating, by the first key node, the hash of L, denoted # (L') and using the # (L') as an index for selecting the set of keys associated with the first key node and the second key node; selecting, by the first key node, a key, KQ, from the set of keys accessible by the first key node using a key selection function applied to the complete link-info L', wherein the key selection function used by the first key node is the same as that used by the second key node; generating, by the first key node, the first random anti-replay nonce, N REPI; performing, by the first key node, a look-up of the identity key associated with the second key node, K R based on the identity of the second key node, ID R, wherein the first key node and second key node maintain a mapping or lookup table of identity keys and corresponding key node identifiers of key nodes within the network; performing, by the first key node, a look-up of the identity key associated with the first key node, KI; creating, by the first key node, the Intermediate Bilocation Key, K IBK, based on combining data representative of: the first complete link-information; the selected key, KQ; the identify key of the first key node, K I; the identity key of the second key node, K R; and the first anti-replay nonce, N REPI; and sending, from the first key node to the first device, the Intermediate Bilocation Key, K IBK, and the first anti-replay nonce, N REPI.

As an option, the computer-implemented method according to the first aspect, wherein the first complete link- info packet takes the form L'=(ID_I II KID_I I I L_I.ID_R L_LKID_R II L_I.N_IR) where II denotes concatenation.

As an option, the computer-implemented method according to the first aspect, wherein wherein the first complete link-info packet takes the form L'=(ID_I II KID_I II L_LID_R II L_I.KID_R II L_I.N_IR') where II denotes concatenation.

As another option, the computer-implemented method according to the first aspect, wherein the Intermediate Bilocation Key, K_IS, is created based on K_IS=# (K_Q, #(L'), N_REPI) XOR K_I XOR K_R.

As a further option, the computer-implemented method according to the first aspect, wherein the key selection function comprises one or more of: selecting the least significant N bits of #(L'), where N>=1; selecting the most significant N bits of #(L'), where N>=1; selecting a specific portion of N bits of #(L'), where N>=1; selecting the bottom N bits of #(L'), where N>=1; any other selection function suitable for generating a unique index for selecting a key from a set of keys; or any other function configured to select from any number of elements in an array representing #(L).

Optionally, the computer-implemented method according to the first aspect, wherein sending, from the second device, the Bilocation Key request further comprising: receiving, from the first device at the second device, the second random nonce, N I, and the first anti-replay nonce, N REPI; generating, by the second device, the third nonce, N IR, based on the second random nonce, N I, and the first random nonce, N_R; creating, by the second device, a second incomplete link-info data packet, L_R, based on data representative of at least: the identity of the first device, ID I; the identity of the first key node, KID_I; and the third nonce, N IR; sending, from the second device to the second key node, a Bilocation Key request, wherein the request includes data representative of the second incomplete link-info data packet, L_R, and the first anti-replay nonce, N REPI.

As another option, the computer-implemented method according to the first aspect, wherein the second incomplete link-info packet takes the form L_R={ICU, KID_L N_IR}.

As another option, the computer-implemented method according to the first aspect, wherein the data representative of the third nonce, N IR, comprises data representative of a hash of the third nonce, N IR'.

As another option, the computer-implemented method according to the first aspect, wherein the first incomplete link-info packet takes the form L_I={ID_R, KID_R, N_IR}.

As an option, the computer-implemented method according to the first aspect, wherein establishing, by the second key node, the Bilocation Key further comprising: receiving, at the second key node from the second device, the Bilocation Key request, wherein the request includes data representative of the second incomplete link-info data packet, L_R, and the first anti-replay nonce, N REPI; generating, by the second key node, the second complete link-info data packet, L', using data representative of at least: the identity of the second device, ID R; the identity of the second key node, KID_R; and data representative of the received second incomplete link-info packet, L_R; calculating, by the second key node, the hash of L, denoted #(L') and using the #(L') as an index for selecting the set of keys associated with the second key node and the first key node; selecting, by the second key node, the key, KQ, from the set of keys of the second key node using the key selection function applied to the second complete link-info L', wherein the key selection function used by the second key node is the same as that used by the first key node; generating, by the second key node, the second random anti-replay nonce, N REPR; performing, by the second key: node, a look-up of the identity key associated with the first key node, K/based on the identity of the first key node, KID I, wherein the first key node and second key node maintain a mapping or lookup table of identity keys and corresponding key node identifiers of key nodes within the network; performing, by the second key node, a lookup of the identity key associated with the second key node, K R; creating, by the second key node, the Intermediate Bilocation Key, K IBK, based on combining data representative of: the second complete link-information; the selected key, KQ; the identity key of the first key node, KI; the identity key of the second key node, K R; and the first anti-replay nonce, N REPI; creating, by the second key node, the Bilocation Key, K BK, based on combining data representative of: the Intermediate Bilocation Key, K IBK, and the second anti-replay nonce, N REPR; and sending, from the second key node to the second device, the Bilocation Key, K BK, and the second anti-replay nonce, N REPR.

Optionally, the computer-implemented method according to the first aspect, wherein the second complete link-info packet takes the form L'=(L_R.ID_I II L_R.KID_I II ID_R II KID_R II L_R.N_IR) where II denotes concatenation.

Optionally, the computer-implemented method according to the first aspect, wherein the second complete link-info packet takes the form L'=(L_R.ID_I I I L_R.KID_I II ID_RIIKID_RII L_R.N_IR') where II denotes concatenation.

Optionally, the computer-implemented method according to the first aspect, wherein the Intermediate Bilocation Key, K IBK, is created based on K_IBK=#(K_Q, #(L'), N_REP!) XOR K_I XOR K_R.

As another option, the computer-implemented method according to the first aspect, wherein the Bilocation Key, K BK, is created based on K_BK=#(K_IBK, N_REPR).

As another option, the computer-implemented method according to the first aspect, wherein generating the Bilocation Key, K BK, includes generating a final Bilocation Key, K BK'.

As another option, the computer-implemented method according to the first aspect, wherein the final Bilocation Key, K BK', is created based on K_BK'=#(N_IR, K_BK).

As an option, the computer-implemented method according to the first aspect, wherein the Final Key is calculated by each of the first and second devices based on combining their corresponding Bilocation Key with an agreed nonce.

As an option, the computer-implemented method according to the first aspect, wherein the Final Key is calculated by each of the first and second devices based on combining their corresponding final Bilocation Key with an agreed nonce.

As an option, the computer-implemented method according to the first aspect, the method further comprising generating, by the second device, a further nonce, NT, and sending, by the second device, the further nonce, N T, to the first device, wherein the further nonce is used for calculating the Final Key.

Optionally, the computer-implemented method according to the first aspect, wherein the Final Key is calculated based on one from the group of: K_S=K_BK XOR N_T; K_S=K_BK XOR K_EN XOR N_T; K_BK' XOR N_T; K_S=K_BK' XOR K_EN XOR N_T, wherein K_EN is an encryption key used between the first and second devices; K_S=K_BK XOR K_TLS XOR N_T; K_S=K_BK' XOR K_TLS XOR N_T, wherein K_TLS is a TLS session key used between the first and second devices.

As another option, the computer-implemented method according to the first aspect, wherein the Final Key is calculated by each of the first and second devices based on an intermediate key value, K X, derived from their corresponding Bilocation Key, K BK, and a challenge response protocol the results of which are used to agree the Final Key, the challenge response protocol further comprising: creating, at the first device, a first challenge nonce, C I; creating, at the second device, a second challenge nonce, C R; sending, from the first device to the second device, the first challenge nonce, C I; sending, from the second device to the first device, the second challenge nonce, C_R; calculating, at the first device, the first signed responses using C I and the received C R based on the following values of: X I=#(K_X, C_I, 0); X R=#(K_X, C_R, 1); R_I=#(X I, C_R); R_R=#(X R, C_I), where # is a hash function; calculating, at the second device, the second signed responses using C R and the received C I based on the following values of: X I=#(K_X, CI, 0); X R=#(K_X, C_R, 1); R_I=#(X C_R); R_R=#(X R, C_I), where # is the same hash function used by the first device; sending, from the first device to the second device, the first signed response R I; sending, from the second device to the first device, the second signed response R R; in response to determining, at the first device, that the R R received from the second device matches the value of R R calculated by the first device, calculating the Final Key as K_S=X I XOR X R; in response to determining, at the second device, the R I received from the first device matches the value of R/calculated by the second device, calculating the Final Key as K_S=X I XOR X R; in response to, either the first device and/or second device, determining the received signed response does not match the corresponding calculated signed response, abandoning the connection.

As a further option, the computer-implemented method according to the first aspect, wherein the intermediate key value, K X, is calculated at both the first and second device based on at least one from the group of: K X=K BK; K X=#(K BK, K TLS), where K TLS is a TLS session key between first and second devices; K X=K BK XOR K TLS, where K TLS is a TLS session key between first and second devices; K X=#(K BK, KEN), where K EN is a key shared between first and second devices; K X=K BK XOR K EN, where K EN is a key shared between first and second devices; and any other function for modifying K BK with one or more agreed values known to both the first and second devices.

As a further option, the computer-implemented method according to the first aspect, wherein the Final Key is calculated by each of the first and second devices based on an intermediate key value, K_X, derived from their corresponding final Bilocation Key, K_BK', and a challenge response protocol the results of which are used to agree the Final Key, the challenge response protocol further comprising: creating, at the first device, a first challenge nonce, C_I; creating, at the second device, a second challenge nonce, C_R; sending, from the first device to the second device, the first challenge nonce, C_I; sending, from the second device to the first device, the second challenge nonce, C_R; calculating, at the first device, the first signed responses using C_I and the received C_R based on the following values of: X_I=#(K_X, C_I, 0); X_R=#(K_X, C_R, 1); R_I=#(X_I, C_R); R_R=#(X_R, C_I), where # is a hash function; calculating, at the second device, the second signed responses using C_R and the received C_I based on the following values of: X_I=#(K_X, C_I, 0); X_R=#(K_X, C_R, 1); R_I=#(X_I, C_R); R_R=#(X_R, C_I), where # is the same hash function used by the first device; sending, from the first device to the second device, the first signed response R_I; sending, from the second device to the first device, the second signed response R_R; in response to determining, at the first device, that the R_R received from the second device matches the value of R_R calculated by the first device, calculating the Final Key as K_S=X_I XOR X_R or K_S=#(X_I, X_R); in response to determining, at the second device, the R_I received from the first device matches the value of R_I calculated by the second device, calculating the Final Key as K_S=X_I XOR X_R or K_S=#(X_I, X_R); in response to, either the first device and/or second device, determining the received signed response does not match the corresponding calculated signed response, abandoning the connection.

As a further option, the computer-implemented method according to the first aspect, wherein the intermediate key value, K_X, is calculated at both the first and second device based on at least one from the group of: K_X=K_BK'; K_X=#(K_BK', K_TLS), where K_TLS is a TLS session key between first and second devices; K_X=K_BK' XOR K_TLS, where K_TLS is a TLS session key between first and second devices; K_X=#(K_BK', K_EN), where K_EN is a key shared between first and second devices; K_X=K_BK' XOR K_EN, where K_EN is a key shared between first and second devices; and any other function for modifying K_BK with one or more agreed values known to both the first and second devices.

As another option, the computer-implemented method according to the first aspect, wherein the third nonce is calculated based on an exclusive or, XOR, operation between the first random nonce and the second random nonce.

In a second aspect, the present disclosure provides a computer-implemented method of establishing a key between a first device and a second device using a network, the network comprising a first key node and a second key node, the first key node for accessing a set of keys and the second key node for accessing the same set of keys, the method, performed by the first device, comprising: receiving, at the first device, data representative of first key establishment data from at least the first key node and the second device for use in calculating a Bilocation Key, wherein the Bilocation key is based on a selected key from the set of keys of the first key node and second key node; and wherein the second device receives data representative of second key establishment data from at least the first device for use in requesting the Bilocation Key from the second key node, wherein the Bilocation Key is calculated by the second key node based on the selected key from the set of keys of the second key node; and wherein the first and second devices use their corresponding Bilocation Key to each generate the Final Key based on an agreed portion of the first key establishment data and second key establishment data.

As an option, the computer-implemented method according to the second aspect, further comprising the computer-implemented method steps performed at the first device according to any of the first aspects.

In a third aspect, the present disclosure provides a computer-implemented method of establishing a key between a first device and a second device using a network, the network comprising a first key node and a second key node, the first key node for accessing a set of keys and the second key node for accessing the same set of keys, the method, performed by the first device, comprising: receiving, at the first device, data representative of first key establishment data from at least the first key node and the second device for use in calculating a Bilocation Key, wherein the Bilocation key is based on a selected key from the set of keys of the first key node and second key node; and wherein the second device receives data representative of second key establishment data from at least the first device for use in requesting the Bilocation Key from the second key node, wherein the Bilocation Key is calculated by the second key node based on the selected key from the set of keys of the second key node; and wherein the first and second devices use their corresponding Bilocation Key to each generate a final Bilocation Key, and use their final: Bilocation Key to each generate the Final Key based on an agreed portion of the first key establishment data and second key establishment data.

As an option, the computer-implemented method according to the third aspect, further comprising the computer-implemented method steps performed at the first device according to the first aspect.

In a fourth aspect, the present disclosure provides a computer-implemented method of establishing a key between a first device and a second device using a network, the network comprising a first key node and a second key node, the first key node for accessing a set of keys and the second key node for accessing the same set of keys, the method, performed by the second device, comprising: the first device receiving data representative of first key establishment data from at least the first key node and the second device for use in calculating a Bilocation Key, wherein the Bilocation key is based on a selected key from the set of keys of the first key node and second key node; receiving, at the second device, data representative of second key establishment data from at least the first device for use in requesting the Bilocation Key from the second key node, wherein the Bilocation Key is calculated by the second key node based on the selected key from the set of keys of the second key node; and wherein the first and second devices use their corresponding Bilocation Keys to each generate the Final Key based on an agreed portion of the first key establishment data and second key establishment data.

As an option, the computer-implemented method according to the fourth aspect, further comprising the computer-implemented method steps performed at the second device according to any one of the first, second or third aspects.

In a fifth aspect, the present disclosure provides a computer-implemented method of establishing a key between a first device and a second device using a network, the network comprising a first key node and a second key node, the first key node configured for accessing a set of keys and the second key node configured for accessing the same set of keys, the method, performed by the first key node, the method comprising: receiving an Intermediate Bilocation Key request from the first device, wherein the request includes data representative of a portion of first key establishment data received by the first device from the second device for use in calculating, by the first device, a Bilocation Key, wherein the Bilocation key is based on a selected key from the set of keys of the first key node and second key node; calculating the Intermediate Bilocation Key based on the received request data and a selected key from the set of keys to establish the Intermediate Bilocation Key and a first anti-replay nonce; sending the Intermediate Bilocation Key and the first anti-replay nonce to the first device for use in calculating the Bilocation Key; wherein the first and second devices use their corresponding Bilocation Keys to each generate the Final Key based on an agreed portion of the first key establishment data and second key establishment data.

As an option, the computer-implemented method according to the fifth aspect, further comprising the computer-implemented method steps performed at the first key node according to any one of the first, second, third and/or fourth aspects.

In a sixth aspect, the present disclosure provides a computer-implemented method of establishing a key between a first device and a second device using a network, the network comprising a first key node and a second key node, the first key node including a set of keys and the second key node including the same set of keys, the method, performed by the second key node, the method comprising: receiving a Bilocation Key request from the second device, wherein the request includes data representative of a portion of the second key establishment data received by the second device from at least the first device for use in requesting the Bilocation Key; establishing an Intermediate Bilocation Key based on the received request data and a selected key from the set of keys; establishing a Bilocation Key based on the established Intermediate Bilocation Key and a second anti-replay nonce; and sending the Bilocation Key and second anti-replay nonce to the second device; wherein the first and second devices use their corresponding Bilocation Key to each generate the Final Key based on an agreed portion of the first key establishment data and second key establishment data.

As an option, the computer-implemented method according to the sixth aspect, further comprising the computer-implemented method steps performed at the second key node according to any one of the first, second, third, fourth, and/or fifth aspects.

In a seventh aspect, the present disclosure provides a computer-implemented method of establishing a key between a first device and a second device using a network, the network comprising a first key node and a second key node, the first key node including a set of keys and the second key node including the same set of keys, the method, performed by the second key node, the method comprising: receiving a Bilocation Key request from the second device, wherein the request includes data representative of a portion of the second key establishment data received by the second device from at least the first device for use in requesting the Bilocation Key; establishing an Intermediate Bilocation Key based on the received request data and a selected key from the set of keys; establishing a Bilocation Key based on the established Intermediate Bilocation Key and a second anti-replay nonce; and sending the Bilocation Key and second anti-replay nonce to the second device; wherein the first and second devices use their corresponding Bilocation Key to each generate a final Bilocation Key, and use the final Bilocation Key to each generate the Final Key based on an agreed portion of the first key establishment data and second key establishment data.

As an option, the computer-implemented method according to the seventh aspect, further comprising the computer-implemented method steps performed at the second key node according to any one of the first, second, third, fourth, fifth, and/or sixth aspects.

As an option, the computer-implemented method according to any of the first, second, third, fourth, fifth, sixth and/or seventh aspects, wherein each of the key nodes are part of a quantum-secure network, and each set of keys are a set of quantum distributed keys delivered using a quantum key distribution system.

As an option, the computer-implemented method according to any of the first, second, third, fourth, fifth, sixth and/or seventh aspects, wherein each of the key nodes are part of a classically-secure network, and each set of keys or distributed keys are delivered using a classical key distribution system.

As an option, the computer-implemented method according to any of the first, second, third, fourth, fifth, sixth and/or seventh aspects, wherein the quantum key distribution system may include at least one from the group of: Satellite quantum key distribution system; Terrestrial-optical-quantum key distribution system; or any type of quantum key distribution system that is capable of delivering a set of quantum keys to a first and a second key node in a quantum-safe or quantum-secure fashion.

As an option, the computer-implemented method according to any of the first, second, third, fourth fifth, sixth and/or seventh aspects, wherein: communications between the first device and the first key node are performed over a first quantum-secure channel; communications between the second device and the second key node are performed over a second quantum-secure channel; and communications between the first device and second device are performed, during establishment of the Final Key over a classical communications channel.

As an option, the computer-implemented method according to any of the first, second, third, fourth, fifth, sixth and/or seventh aspects, wherein the set of keys is a set of one time pad keys.

As an option, the computer-implemented method according to any of the first, second, third, fourth, fifth, sixth and/or seventh aspects, wherein the classical communications channel is a standard encrypted communications channel.

As an option, the computer-implemented method according to any of the first, second, third, fourth, fifth, sixth and/or seventh aspects, wherein the first key node and second key node are located in different geographical locations, and the first key node is different to the second key node.

As an option, the computer-implemented method according to any of the first, second, third, fourth, fifth, sixth and/or seventh aspects, wherein the first key node and second key node are located in the same geographical location.

As an option, the computer-implemented method according to any of the first, second, third, fourth, fifth, sixth and/or seventh aspects, wherein the first key node and second key node are located in the same logical location.

As an option, the computer-implemented method according to any of the first, second, third, fourth, fifth, sixth and/or seventh aspects, wherein the first key node and second key node are the same key node, and the set of keys is only known by the first key node and the second key node.

As an option, the computer-implemented method according to any of the first, second, third, fourth, fifth, sixth and/or seventh aspects, wherein the first key node and second key node are the same logical key node, the set of keys of the logical key node are is only shared with itself or that only the logical key node owns, and the selected key is selected from the set of keys known only to the logical key node.

In an eighth aspect, the present disclosure provides an apparatus comprising a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspects.

In a ninth aspect, the present disclosure provides a system comprising a first device and a second device and a secure network, the secure network comprising a first key node and a second key node, the first key node including or accessing a set of keys and the second key node including or accessing the same set of keys, wherein each of the first device, the second device, the first key node and second key node include a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspect(s).

In a tenth aspect, the present disclosure provides a first device comprising a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspect(s).

In a eleventh aspect, the present disclosure provides a second device comprising a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspect(s).

In an twelfth aspect, the present disclosure provides a first key node comprising a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspect(s).

In a thirteenth aspect, the present disclosure provides a second key node comprising a processor unit, a memory unit, and a communication interface, the processor unit connected to the memory unit and the communication interface, wherein the processor unit, memory unit and communication interface are adapted to implement the corresponding steps of the computer-implemented method according to any of the first, second, third, fourth, fifth, sixth and/or seventh aspect(s).

In a fourteenth aspect, the present disclosure provides a system comprising: an first device comprising an apparatus according to any of the eighth and/or tenth aspects; a second device comprising an apparatus according to any of the eighth and/or eleventh aspects; an first key node comprising an apparatus according to any of the eighth and/or twelfth aspects; and a second key node comprising an apparatus according to any of the eighth and/or thirteenth aspects; wherein the first device and second device are configured to communicate with each other over standard communication channel and with the first key node and second key node, respectively, over corresponding quantum-secure channels for establishing a Final Key for a communication session between the first and second devices.

As an option, the system according to the fouteenth aspect, wherein the system is a satellite quantum key distribution system comprising a plurality of satellites, each satellite including the functionality of quantum key distribution, each satellite in communication with one or more ground receiving stations, and each ground receiving station coupled or connected over a quantum-secure channel to one of the first and second key nodes.

As another option, the system according to the fourteenth aspect, wherein the system is a terrestrial quantum key distribution system comprising a plurality of terrestrial quantum transceivers, each transceiver including the functionality of quantum key distribution and coupled or connected over a quantum-secure channel to one of the first and second key nodes.

In a fifteenth aspect, the present disclosure provides a system comprising: an first device comprising an apparatus according any of the eighth and/or tenth aspects; a second device comprising an apparatus according to any of the eighth and/or eleventh aspects; an first key node comprising an apparatus according any of the eighth and/or twelfth aspects; and a second key node comprising an apparatus according to any of the eighth and/or thirteenth aspects; wherein the first device and second device are configured to communicate with each other over standard communication channel and with the first key node and second key node, respectively, over corresponding classically-secure channels for establishing a Final Key for a communication session between the first and second devices.

As an option, the system according to the fifteenth aspect, wherein the system includes a classical key distribution system including the functionality of secure key distribution over classically-secure channels to each of the first and second key nodes.

In a sixteenth aspect, the present disclosure provides a computer-readable medium comprising computer code or instructions stored thereon, which when executed on a processor, causes the processor to perform the computer implemented method according to any of the first, second, third, fourth, fifth, sixth and/or seventh aspects and/or features thereof, modifications thereto, combinations thereof, as herein described and/or as the application demands.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Figure 1A:
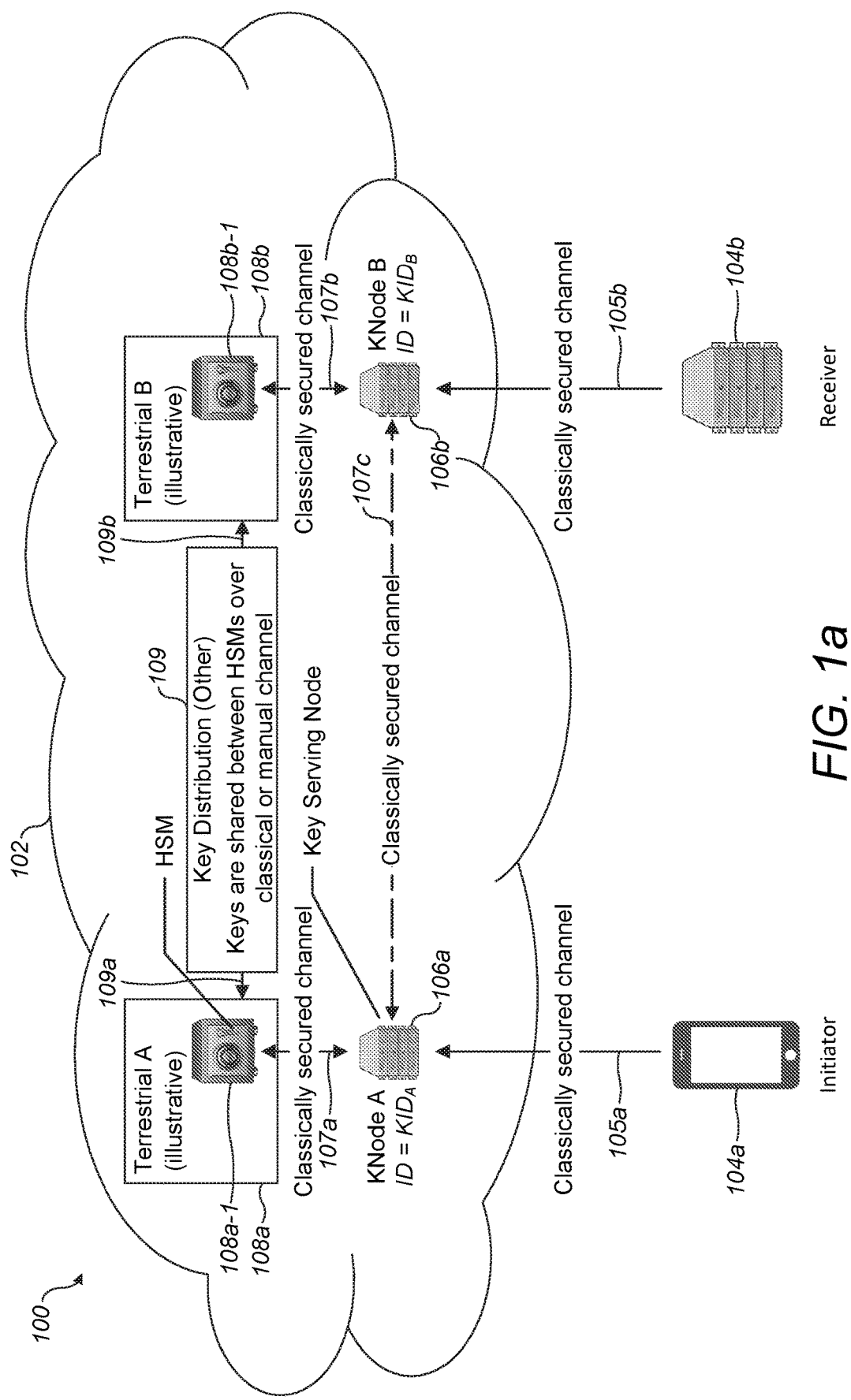
FIG. 1a is a schematic diagram illustrating an example system for use with a key establishment protocol or process applied between an initiator device and receiver device according to some embodiments of the invention.

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) of using a key establishment protocol for key establishment of a cryptographic key or a key between a first device or endpoint (e.g. initiator device/endpoint) and a second device or endpoint (e.g. a receiver device/endpoint) in communication with one or more key-serving nodes (KNodes) within a communication network. The key that is established between the first and second devices or that results from the key establishment protocol is referred to herein interchangeably as a final key, established key, and/or resulting key that is derived by the first and second devices at the end of the key establishment protocol as described herein, modifications thereto and/or combinations thereof. Each of the first and second devices in communication with a corresponding first and second key-serving node, where each key serving node has access to the same set of distributed keys (also referred to as a set of keys), which are inaccessible to the first and second devices. Each set of keys having been established or distributed to each key serving node of the first and second devices in a secure manner. For example, each set of keys may be distributed and/or formed based on, without limitation, for example using a classical key distribution protocol to form the set of keys; using quantum key distribution protocol to form a set of keys that comprise quantum distributed keys; and/or any other type of key distribution protocol that is suitable for providing a set of keys to the KNodes for use with the key establishment protocol for establishing a key (e.g. established key or final key) between the first and second device in a trustless manner.

As an option, the first key-serving node or key node (e.g. KNode A) and second key-serving node or key node (e.g. KNode B) may be located in different geographical locations, where the first key node is different to the second key node. Thus the initiator device/endpoint and receiver device/endpoint communicate with different key nodes as they are geographically spaced apart. This results in the established key being rooted in the same selected distributed key (e.g. QKD key) from the set of distributed keys (or selected key from the set of keys) at each key node that was delivered to the first and second key node geographical locations (e.g. servers/KNodes) in a secure manner. Alternatively or additionally, the first and second key nodes may be located in the same server and simply have two different logical locations or are the same logical key node (e.g. KNode A==KNode B); in other words where both initiator endpoint/device and receiver endpoint/device effectively communicate with the same computing device/server of the KNode. In this case, the logical KNode is configured to select a key (e.g. a QKD key) from an array or set of keys "shared with itself" (i.e. the distributed key is a set of keys that the KNode alone owns or knows). Thus the established key is rooted in a distributed key or key that only the KNode has access to in a secure manner. In this case, the first key node and second key node may be located in the same geographical location or located in the same logical location on a server or computing device and the like. As another example, the first key node and second key node may be the same key node that the initiator device/endpoint and receiver endpoint/device both communicate with, where the set of keys is only known by this same key node (e.g. only know by the first key node and the second key node). Alternatively or additionally, the first key node and second key node are the same logical key node, the set of keys of the logical key node are is only shared with itself or that only the logical key node owns, and the selected key is selected from the set of keys known only to the logical key node. For any given key agreement, the KNodes used could be the same KNode or different KNodes. Additionally, each KNode may comprise a single datacentre or a multi-datacentre region secured by QKD links.

In any event, whether the first key node is located in a different geographical location to the second key node in which the first key node and second key node have the same set of distributed keys, whether the first key node is the same as the second key node in which the same key node has a set of distributed keys that are known only to said same key node, or whether the first key node and the second key node are the same logical key node in which the same logical key node has a set of distributed keys that are known only to said same logical key node, the key establishment protocol or process(es) used for key establishment between the initiator endpoint/device and receiver endpoint device according to the invention and/or as herein described with reference to FIGS. 1 *a* to 4*b*, modifications thereto, combinations thereof and/or as herein described may be implemented in a similar manner or fashion.

As an example, the communication network may be based on, without limitation, for example a classical communication network (e.g. a cloud network/infrastructure and the like) in which communication channels within the network are secured using classical encryption/cryptography or non-quantum encryption/cryptography to form a classical secured communication network or classical-secure network (also referred to as a secure network). For example, the one or more key-serving nodes (KNodes) are part of the classical-secure network and communicate with each other over classical-secure communication channels. The set of keys used in the key establishment protocol according to the invention may be distributed to the classical-secure network (e.g. stored in one or more HSMs or secure servers and the like) using one or more of the various key distribution protocols to form a set of keys. The KNodes may thus have secure access to the set of keys over secure channels in the secure network. Each classical-secure communication channel between KNodes and/or other computing devices, nodes and/or components of the secure network may be based on a communication channel encrypted with, without limitation, for example a key from the set of keys, a key derived from the set of keys, or even a distributed key derived from a manual keyfill process and the like. Each of the first and second devices may have a classical-secure communication channel set up with each respective KNode during the key establishment protocol, where these classical-secure communication channels may comprise or represent a communication channel encrypted by, without limitation, for example a key from the set of keys; a key derived from the set of keys, even a distributed key derived from a manual . . . keyfill process; a key exchanged between the respective KNode and device; and/or any other manner of securing a communication channel between the KNode and the device; the like and/or as the application demands.

The set of distributed keys (or set of keys) may be stored within one or more servers within the classical-secure network (e.g. HSMs, secure servers, and the like). The set of keys may be, without limitation, for example a set of QKD keys. If there are two or more servers, then at least two of the servers may have a distinct or different geographic location to the other servers, where a key distribution system generates and securely distributes a set of distributed keys to said at least two servers. In this case, the key establishment protocol may be used between an Initiator device/endpoint (e.g. first device) and the Receiver device/endpoint (e.g. second device) such they receive the same key from different geographical locations (e.g. different servers/KNodes), but rooted in a distributed key that was delivered to the geographical locations (e.g. servers/KNodes) in a secure manner. Alternatively or additionally, the key establishment protocol may be used between an Initiator device/endpoint (e.g. first device) and the Receiver device/endpoint (e.g. second device) such they receive the same key from the same server and/or one or more servers in the same geographical location, where effectively the Initiator and Receiver device/endpoints contact the same server/KNode and/or a server/KNode in the same geographical location. In such a case, when the KNodes used by the Initiator and Receiver device/endpoints are the same (e.g. KNode A==KNodeB), then this KNode may derive the key using a key from a set of distributed keys shared with itself or using a key from a set of keys that the KNode alone owns. For example, The KNode may derive the key using a QKD key from an array of QKD keys shared with itself, i.e. keys that it alone owns and no other KNode/server has. Thus the received key is rooted in a key that only the KNode has access to in a secure manner.

Alternatively or additionally, the communication network may be based on, without limitation, for example a quantum-secure network (e.g. Quantum Cloud) and/or a classical communication network. For example, if the one or more key-serving nodes (KNodes) are within the quantum-secure network, they may communicate with each other over respective quantum-secure communication channels. The set of keys may be distributed to the quantum-secure network using quantum key distribution protocols and so forms a set of quantum distributed keys. The KNodes may thus have quantum-secure access to the set of keys, which are a set of quantum distributed keys. Each quantum-secure communication channel between KNodes and/or devices may comprise or represent a communication channel encrypted with a quantum distributed key or even a distributed key derived from a manual keyfill process and the like.

However, to ensure quantum security, the quantum distributed key may be from the set of quantum distributed keys or a key securely derived from one or more quantum distributed keys of the set of quantum distributed keys; and/or derived in any quantum secure manner using one or more quantum distributed keys and the like or a quantum secure keyfill process. The set of quantum distributed keys may be stored within two or more quantum servers within the quantum-secure network (e.g. OGRs/terrestrial transceivers and the like), each quantum server having a distinct or different geographic location to the other quantum servers, where a quantum key distribution system generates and distributes a set of quantum distributed keys to each quantum server. The key establishment protocol may be used between an Initiator device/endpoint and the Receiver device/endpoint such they receive the same key from different geographical locations (e.g. different quantum servers/KNodes), but rooted in a quantum distributed key that was delivered to the geographical locations (e.g. quantum servers/KNodes) in a quantum safe manner (e.g. photonically).

For example, a quantum distributed key may be delivered to quantum servers in different geographical locations using a quantum key distribution system/protocol based on, without limitation, for example a satellite quantum key distribution system with photonic/satellite links between a satellite and two or more optical ground receivers in different geographical locations; or a terrestrial quantum key distribution system with photonic fibre channels between at least two different geographically located terrestrial transceivers; combinations thereof; modifications thereto; as herein described; and the like and/or as the application demands.

A quantum-safe network, quantum-secure network, Quantum-Cloud or quantum cloud infrastructure may comprise or represent any communications network using quantum-secure/safe channels for communicating between infrastructure portions or elements of the communication network, the infrastructure portions or elements including, without limitation, for example cloud infrastructure elements, quantum servers, key node servers, OGRs, terrestrial receivers, nodes, computing devices of the communication network, and/or any other computing device, apparatus or component interconnected connected via quantum secure channels within the communication network. Each quantum-secure/safe communication channel between infrastructure elements or portions thereof may comprise or represent a communication channel (e.g. classical communication channel) encrypted with a quantum distributed key or even a key derived from one or more quantum distributed keys and/or an automated/manual keyfill process for generating keys and the like. The term, quantum network, quantum-safe network, quantum-secure network, Quantum Cloud, and/or quantum-cloud infrastructure and the like may be used interchangeably herein.

A device or endpoint may comprise or represent any computing device that is a client of the classical secure network, cloud infrastructure, quantum-secure network and/ or quantum cloud infrastructure that wishes to request and/or use a key established using the key establishment protocol as herein defined. This may include requesting a key established using classical secure channels in the classical secure network and/or quantum-secure channels with the quantum-secure network, and/or combinations of both; combinations thereof, modifications thereto, as herein described and/or as the application demands. Examples of a device or endpoint device according to the invention may include, without limitation, for example a user device; mobile device; smart phone; personal computer; laptop; portable computing device; any type of information of things (IOT) device; machine-to-machine (M2M) devices; other examples include, without limitation, for example mobile device communicating with a cloud server or communication network, a client application (e.g. mobile client) communicating with a server application (e.g. server), mobile phone talking to a cloud server, general application client talking to its server, client application talking to a database, command-and-control application talking to a drone or other device/computing device, satellite phone talking to another satellite phone, autonomous vehicle talking to another vehicle or to a cloud service/provider, industrial monitoring IoT device talking to a cloud service; any communication device, computing device or server and the like that may be a client of the classical-secure network or cloud infrastructure and capable of communicating over a classical-secure channel with the classical-secure network/cloud infrastructure and the like as the application demands; and/or any communication device, computing device or server and the like that may be a client of the quantum-secure network or quantum cloud infrastructure and capable of communicating over a quantum-secure channel with the quantum-secure network or quantum cloud infrastructure as the application demands.

An initiator device or endpoint may comprise or represent any device or endpoint that is the first to initiate a key establishment protocol with a receiver device or endpoint in which a Bilocation Key is distributed to the initiator device/ endpoint and receiver device/endpoint for establishing the final key therebetween. A Bilocation Key may. comprise or represent data or symbols representative of a random number, R B, which is established in two logical or physical locations, where each distinct copy of R B is rooted in a random number, RQ, located at a different logical location or different geographical location, delivered through quantum-safe means. The Bilocation Key (which is known to the classical network/Quantum Cloud/quantum-network) can then be used to establish/create a key shared between the initiator and receiver devices in which the classical network/ Quantum Cloud/network has no knowledge of, which renders the classical network/Quantum Cloud/network trustless. A receiver device or endpoint may comprise or represent any device or endpoint that is distinct from the initiator device or endpoint and is the endpoint/device that the initiator device/endpoint requests to establish a key with and which receives the same Bilocation Key as the initiator device or endpoint. Although the receiver device may be represented and described as an endpoint device in FIGS. 1a to 4b, this is by way of example only and the invention is not so limited, it is to be appreciated by the skilled person in the art that the receiver device may be a component of some other network device/node such as, without limitation, for example a key serving node or key node device (e.g. KNode) as described herein, which may allow the initiator device to establish a key with the key node (e.g. KNode) itself, perhaps for further processing on the key node and the like and/or as the application demands.

A key serving node (KNode) may comprise or represent any computing device or node that includes functionality for, without limitation, for example accessing a set of keys securely distributed within the communication network and/ or cryptographic processing functionality for using the set of keys in the key establishment protocol as herein described. For example, a key serving node within the quantum-secure network (or quantum cloud) may comprise or represent a computing device or node that is a part of and/or connected to a quantum-safe server (e.g. an OGR or a terrestrial transceiver) and receives a set of quantum distributed keys from the quantum-safe server. In this example, the key serving node may be a component or part of the quantum-safe server and thus may receive one or more quantum distributed keys of the set of quantum distributed keys for implementing the key establishment process according to the invention. In another example, a key serving node may be external to the quantum-safe server but connected to the quantum-safe server over a quantum-secure channel within the quantum-secure network and receives one or more quantum distributed keys of the set of quantum distributed keys for implementing the key establishment process according to the invention.

The key establishment protocol is configured to use various nonces generated by the Initiator, Receiver, and corresponding key serving nodes (KNodes) that are transmitted in link information (L) packets from Initiator and Receiver to corresponding KNodes, where these KNodes each have access to a key pool (or KEYPOOL) that includes the same set of keys securely distributed within the communication network and used for deriving the Bilocation Key and/or intermediate Bilocation Keys and the like. This ensures the Bilocation Key (K_BK) negotiated between the Initiator device and Receiver device is used to form the final or established key that is unique and defends against replay attacks. The final key may be the Bilocation Key and/or may be a shared key derived by each of the Initiator and Receiver devices from the Bilocation Key. For example, when the Initiator device requests an Intermediate Bilocation Key, the Initiator device will receive form the corresponding KNode a different Intermediate Bilocation Key for each request (e.g. call to create_intermediate_bilocation_keyO), even when passing the same link information data (L), which is due to the requirement to use of a nonce N IR in the Intermediate Bilocation Key request for randomising the key selected from the set of keys from the key pool of the Initiator's KNode (e.g. the set of keys may be a set of QKD keys when the network is a quantum-secure network) and/or an anti-replay nonce N REP/generated by the corresponding key serving node (KNode) in the response to the Intermediate Bilocation Key: request from the Initiator. The key establishment protocol is further configured to ensure that the Receiver device can only request and receive a Bilocation Key from a specified or respective key serving node (KNode). For example, should the Initiator KNode request the Bilocation Key (e.g. calling create_bilocation_key ( ) instead of create_intermediate_bilocation_key ( )) this will result in a different Bilocation Key being generated. This is because the Receivers identity is populated (e.g. by create_bilocation_key ( ) function) from the caller's authentication, thus if the Initiator pretends to be the Receiver or requests the Bilocation Key, then different link information will be formed and the resulting key will therefore be different than would be given to the Receiver. Similarly, the Receiver device will receive a different Bilocation Key for each Bilocation key request (e.g. call to create_bilocation_key ( )), even when passing the same link information data (L), which is due to the requirement to use the nonce N IR in the Bilocation Key request for ensuring the same key of the set of keys is selected from the key pool of the Initiator's KNode is also selected from the key pool of the Receiver's KNode and/or an anti-replay nonce N_REPR generated by the Receiver's KNode in response to the Bilocation Key request from the Receiver. In other words, if—for a given pair of Receivers—the respective KNode associated with each Receiver is different, a different key will be generated by the Initiator KNode (e.g. by calling create_biolocation_key ( )). This is because of the use of the Receiver's KNode identity key in the generation by the Initiator.

For example, should an eavesdropper (e.g. Eve) create a secure connection to the quantum-safe network (or Quantum Cloud) and requests a Bilocation key (e.g. calls create_bilocation_key () with the data passed across between the Initiator device and Receiver device connections, then Eve will receive a different Bilocation Key (e.g. K BK BK) because Eve's identity is required when forming the link information packets (L) (which will give different keys) when requesting the Intermediate Bilocation Key and final Bilocation Key than was negotiated between the Initiator device and Receiver device, thus making the final key formed based on the Bilocation Key (e.g. K BK) established between Initiator device and Receiver device unique and defends against replay-type attacks.

Each of the keys, set of keys, quantum-safe/secure keys, Bilocation Keys, Intermediate Bilocation Keys, final/established keys and the like, and/or nonces may comprise or represent symbol strings or sets of symbol strings (e.g. n bit(s) per symbol are represented by $M=2^n$ different symbols, where n>1). Processing of the symbol strings may include combining of sets of symbol strings, e.g. a first symbol string may be combined with a second symbol string based on, without limitation, for example one-time-pad encryption/decryption, masking, exclusive OR (XOR) operations on bits when symbols are converted to bits, or extended XOR operations on symbols or obfuscated set of the symbol strings.

Combining a first set of symbols of a first symbol string with a second set of symbols of a second symbol string may be performed using, without limitation, for example: exclusive or (XOR) operations on corresponding symbols of the sets of symbols of the first and second symbol strings (e.g. converting the symbol strings into bit strings and performing bitwise XOR); bitwise XOR operations when the first and second secret symbol strings are bit symbols; extended XOR operations on the sets of symbols of the first and second symbol strings (e.g. using a mathematically defined extended set of "symbol XOR" operations on symbols that preserve the mathematical properties of bitwise XOR operations); one-time-pad encryption of the set of symbols of the first secret symbols using the set of symbols of the second secret symbols; any other trapdoor or encryption operation on the set of symbols of the first symbol string such that the second device is able to decrypt and retrieve set of symbols of the first symbol string using the set of symbols of the second symbol string successfully received by the second device.

Thus, the Initiator device and Receiver device may use the above-mentioned key establishment process to generate a key where the established/final key is used for, without limitation, for example secure communications between the Initiator and Receiver devices; establish shared keys between the Initiator and Receiver devices for use in other group key establishment protocols for establishing a group key among a group of parties including the Initiator and Receiver devices; secure a communication session between the Initiator and Receiver devices; establish a long-lived communication channel between the Initiator and Receiver devices; the key that is established may form a signing secret between the Initiator and Receiver devices, which may be used, without limitation, for example to create a message authentication code (MAC) or tag etc.; the key established between the Initiator and Receiver devices may be used for any other type of cryptography application/operations performed by each of or between the Initiator and Receiver devices and the like, and/or as the application demands.

Figure 1a is a schematic diagram illustrating an example cloud system/infrastructure 100 that includes a secure communications network 102 (e.g. a classically secured network using classical cryptography techniques) and at least a first and a second device 104a-104b in communication with the secure communications network 102. The network 102 includes at least a first key node 106a and a second key node 106b (or a plurality of key nodes 106a-106b). Each of the first and second devices 104a-104b and the corresponding first and second key nodes 106a-106b may be configured to perform a key exchange protocol/process as described herein for enabling the first and second devices 104a-104b to exchange and/or agree on a key (or established key/final key) between the first and the second device 104a-104b. The established key may be used, without limitation, for example for securing a communication session therebetween; group key formation; future message signing and/or any other cryptographic operation or application and the like. In order to do this, each of the key nodes 106a-106b may have access to the same set of securely distributed keys also referred to as a set of keys, or a set of keys in the key pool associated with each key node 106a-106b. In this example, each of the key nodes 106a-106b may be in communication over secure channels 107a or 107b (e.g. classically secure channel that uses classical encryption techniques) to a secure server 108a or 108b, respectively, or each of the key nodes 106a-106b may be part of the secure server 108a or 108b, respectively, which may dispense with the secure channels 107a or 107b. In this example, each secure server 108a or 108b of the network 102 may include a secure distributed key store 108a-1 (e.g. hardware security module (HSM)) or 108b-1 (e.g. an HSM). Alternatively, each secure server 108a or 108b may not have a secure distributed key store 108a-1 or 108b-1, but rather another user node or device/server (e.g. customer owned equipment or corporate equipment and the like) of the secure network 102 may include a secure distributed key store (or HSM) from which the secure server 108a or 108b may transmit or securely deposit distributed keys for storage within said another user node, device/server and the like. The secure distributed key stores 108a-1 or 108b-2 may be configured to securely store a set of distributed keys or set of keys. It may be assumed that each set of keys may be generated and distributed to each of the secure servers 108a-108b via a suitable key distribution system or other system 109 that is configured to ensure the same set of keys are shared between the secure distributed key stores 108a-1 and 108b-2 as the application demands. The key distribution system 109 may use any suitable key distribution process, system or technique such as, without limitation, for example classical key distribution, manual key distribution, quantum key distribution and the like and/or as the application demands. It is assumed that the key distribution system 109 ensures that the first and second secure servers 108a and 108b have access to the same set of keys, such that the first key node 106a and the second key node 106b also have access to this same set of keys over the secure communication channels 107a and 107b of the secure communication network 102.

The secure distributed key stores 108a-1 and 108a-2 may be, without limitation, an HSM, where an HSM may comprise or represent a physical computing device, component or apparatus (e.g. apparatus/component including functionality of Intel Software Guard Extensions (SGX) (RTM) enclave) that is configured to safeguard and manage, without limitation, for example the distributed set of keys, cryptographic or distributed keys, and provide, without limitation, for example secure execution of core modules/components such as, without limitation, for example critical instructions, code, computer-implemented methods/process(es) and the like implementing cryptographic operations and/or core functionality of a quantum server and the like. The HSM includes anti-tampering technology that may, without limitation, for example wipe secrets/keys/QD keys and the like in case of physical and/or software breach and the like. The HSM could be customer furnished equipment outside of the secure server, distribution system 109 just forwards keys into the customer HSM Furthermore, although it may be described that the key nodes 106a and 106b may perform cryptographic operations during the key establishment process according to the invention, this is by way of example only and the invention is not so limited, it is to be appreciated by the skilled person that an HSM may also include functionality for performing cryptographic operations on one or more of the keys of the set of keys stored inside each HSM on behalf of an associated key node 106a or 106b, which may be used to further secure the key establishment process according to the invention and/or as the application demands. For example, as the keys themselves may be securely stored inside a first HSM 108a-1 connected to a first key node 106a, some or even most and/or all of the cryptographic operations performed by the key node 106a using the corresponding keys, intermediate keys, and/or bilocation keys and the like during the key establishment process/protocol according to the invention and/or as described herein with reference to FIGS. 1a to 4b may be performed inside the corresponding HSM 108a-1. This may prevent the first key node 106a from ever seeing the keys of the set of keys and/or operations performed thereon, which may enhance the security of the key establishment process as described herein. Similarly, for a second HSM 108b-1 connected or accessible by the second key node 106b, some or even most and/or all of the cryptographic operations performed by the second key node 106b using the corresponding keys from the set of keys, intermediate keys, and/or bilocation keys and the like during the key establishment process according to the invention and/or as described herein with reference to FIGS. 1a to 4b may be performed inside the second HSM 108b-1. This may also prevent the second key node 106b from ever seeing the keys of the set of keys and/or operations performed thereon, which may further enhance the security of the key establishment process as described herein.

Although the following description may describe that the first key node (e.g. KNodeA) and second key node (e.g. KNodeB) are located in different geographical locations (e.g. KNodeA<>KNodeB), this is for simplicity and by way of example only and the invention is not so limited, it is to be appreciated by the skilled person that the key establishment systems, apparatus and process(es) according to the invention and/or as described herein with reference to FIGS. 1a to 4b and/or herein described are also applicable to or can be modified to take into account when first key node and second key nodes are the same key node, or have two different logical locations on the same key node, or are the same logical key node (e.g. KNode A==KNode B), where both Initiator endpoint/device and Receiver endpoint/device communicate with the same server/computing device of the KNode or logical KNode rather than two different geographically located servers/computing devices of two different KNodes, and the resulting KNode may be configured to select a key from the set of keys (e.g. a QKD key from an array of QKD keys) "shared with itself (i.e. keys that it alone owns or knows) for use in generating the Bilocation or Intermediate Bilocation keys. for the corresponding endpoints/devices when establishing a key between the Initiator endpoint/device and Receiver endpoint/device.

FIG. Ia illustrates that each of the secure servers 108a-108b is distinct from the other and is located at a different location to the other. In this example, each of the key nodes 106a-106b are connected via classical-secure channels 107a-107b (or secure classical channels) to the corresponding secure servers 108a-108b. In some examples, each of the key nodes 106a-106b may be co-located at the geographical locations of the respective secure servers 108a-108b to which they are connected via classical-secure channels 107a-107b. In other example, one and/or the other of the key nodes 106a-106b may be located at geographical locations distinct from the respective secure servers 108a-108b to which they are connected via secure channels 107a-107b. Although there are only two distinct secure servers 108a-108b that are located in different geographical locations that are connected via secure channels 107a-107b (e.g. classically secured channels) with the respective two key nodes 106a-106b, this is by way of example only and the invention is not so limited, it is to be appreciated by the skilled person that there may be a plurality of distinct secure servers in the network 102, each located in a different geographical location, where each of the secure servers has a corresponding key node located at the location of said each secure server and/or there may be a plurality of distinct secure servers, each located in a different geographical location, and each connected via a secure channel to a corresponding key node that may or may not be co-located with the secure server to which it is connected.

For example, in FIG. 1 a, the set of distributed keys or set of keys may be generated and distributed using, without limitation, for example a conventional classical or manual key distribution system 109 configured to perform a secure key distribution protocol for generating and communicating data representative of a set of distributed keys over secure channels 109a and 109b with the secure servers 108a and 108b, respectively. Regardless of the secure key distribution system 109 used, each of the secure distributed key stores 108a-1 to 108b-1 includes a set of distributed keys that have been securely distributed thereto. Each of the secure servers 108a-108b may include the same set or subset of distributed keys stored in the corresponding secure distributed key stores 108a-1 to 108b-1. The set of distributed keys stored on the secure distributed key stores 108a-1 to 108b-1 may be used to set up each of the secure communication channels 107a-107c of the secure network 102 and/or the secure channels 105a-105b between the network 102 and/or key nodes 106a/106b and the first and second devices 104a-104b, respectively. That is, each secure communications channel may comprise or represent a communications channel that is encrypted with a corresponding securely distributed key from the set of distributed keys, and/or encrypted with a key derived from one or more securely distributed keys of the set of distributed keys or set of keys. Each secure channel may use symmetric encryption based on a key from the set of keys that has been agreed upon by each side of the channel. For simplicity, it is assumed that the connections between the first device/endpoint 104a, second: device/endpoint 104b and the quantum-secure network 102 are protected by a pre-established distributed key, and/or via any other type of key establishment protocol, and that interservice communications within the secure network 102 and/or the cloud system/infrastructure 100 are similarly protected by secure channels/connections from the set of keys and the like.

In the examples of FIG. Ia, first key node 106a is in communication with the first device 104a over a first classically-secure channel 105a. The second key node 106b is in communication with the second device 104b over a second classically-secure channel 105b. In addition, each of the key nodes 106a-106b within the secure network 102. are also in communication with each other over a third classically-secure channel 107c. The key nodes 106a-106b and secure servers 108a-108b and corresponding classically-secure channels 105c, 107a, 107b, 107c form a portion of the secure cloud/network 102. Although a first and second key node 106a-106b are described, this is by way of example only and the invention is not so limited, it is to be appreciated by the skilled person in the art that the secure network 102 may include a plurality of key nodes and a plurality of secure servers, each secure server connected to via a classically-secure channel to a corresponding key node of the plurality of key nodes, and each of the key nodes connected by a classically-secure channel (e.g. when needed) with one or more other key nodes as needed and/or as required.

As described, each of the first and second devices 104a-104b and the corresponding first and second key nodes 106a-106b may be configured to perform a key establishment/exchange protocol/process for enabling the first and second devices 104a-104b to exchange and/or agree on an established or final key such as, without limitation, for example an established/final key derived from one or more distributed keys of the set of keys and the like for use in cryptographic operations/applications on each of the devices 104a-104b and/or between each of the devices 104a-104b and the like. For example, the established key may be used between the first and second devices 104a-104b to secure a communication session between the first and the second devices 104a-104b. In another example, the established/final key may be used in any other cryptographic operation on each of the first and second devices 104a-104b and/or between each of the first and second devices 104a-104b based on the type of cryptographic application operating thereon or therebetween and the like. In this example, the first device 104a is called the Initiator endpoint 104a and the second device 104b is called the Receiver endpoint 104b. It is assumed that each device/endpoint has a unique identification and that each device/endpoint 104a-104b already has established a secure channel 105a and 105b to communicate with a different or unique key-service node (KNode) 106a or 106b of the secure network 102. This may be achieved using, without limitation, for example an application programmable interface (API) gateway, gateway and/or load balancer and the like within the network 102. For example, the unique identification of each endpoint 104a/104b may be based on, without limitation, for example during an authentication of said each endpoint 104a/104b with the corresponding KNode 106a/106b, and/or gateway and the like of the network 102 including the KNode 106a/106b, which uniquely and incontrovertibly identifies the endpoint identifier (ID) of said each endpoint 104a/104b. Each endpoint 104a/104b negotiates its copy of the Bilocation Key with the corresponding KNode 106a/106b. Since both parties of the endpoints 104a/104b separately authenticate to the corresponding different KNodes, mutual authentication is provided. It is also assumed that all communication channels 107a-107c between KNodes 104a-104b and/or secure servers 108a-108b within the quantum network 102 (e.g. all inter-service connections within the cloud infrastructure) are suitably secure, that is each of the channels 107a-107c are classically-secure communication channels. In addition, the connections, if any, between the Initiator endpoint 104a and Receiver endpoint 104b may be, without limitation, for example over a classically-secure or encrypted communications channel such as, without limitation, for example transport layer security (TLS) or equivalent—e.g. this is not a clear channel.

The key establishment/exchange protocol/process establishes a key that is derived from a Bilocation Key that is shared by the corresponding KNodes 106a and 106b with the Initiator and Receiver endpoints 104a and 104b, respectively, where the Initiator endpoint 104a collects its copy of the Bilocation Key from a different KNode 106a than the KNode 106b used by the Receiver endpoint 104b to collect its copy of the Bilocation Key. Alternatively or additionally, this may enable the Initiator endpoint 104a and/or Receiver endpoint 104b to use the Bilocation Key to form a final key for use in one or more other cryptographic operations and/or applications such as, without limitation, for example quantum-secure communications therebetween; quantum-secure digital signing applications; other group key establishment protocols for establishing a group key among a group of parties including the Initiator and Receiver devices; establishing a long-lived communication channel between the Initiator and Receiver devices; the key established between the Initiator and Receiver devices may be used for any other type of cryptography application/operations performed by each of or between the Initiator and Receiver devices and the like, and/or as the application demands.

In addition, the key establishment process is configured to use a combination of one or more handshaking processes, distribution of different nonces between endpoints and/or KNodes, and/or distribution of different Intermediate Bilocation Keys to endpoints may be used to, without limitation, for example mathematically/cryptographically prevent replay attacks; prevent an eavesdropper (e.g. Eve) gaining access to the key in the event that Eve intercepts data exchanged as part of the one or more handshaking process(es); and/or prevent Eve gaining access to the resulting/final key in the event that Eve penetrates the secure network 102.

The established or final key is created either by: a) the Initiator device 104a and Receiver device 104b based on the collected copies of the Bilocation Key or related parts thereof from geographically distinct locations and a nonce generated by the Receiver device 104b that is known to both devices 104a-104b; or b) a challenge/response protocol in which the Initiator and Receiver devices 104a-104b send challenge nonces to each other and calculate corresponding challenge responses based on the received challenge nonces and the Bilocation Keys, which are sent therebetween, in which when the received challenge responses are confirmed by the Initiator and Receiver devices 104a-104b the final key is created by a combination of corresponding unsent portions of the challenge response.

Thus, the Initiator device and Receiver device 104a-104b may use the above-mentioned key establishment process (and/or as described with reference to FIGS. 1 b to 4b) to generate or establish a final key that may be used for, without limitation, for example secure communications between the Initiator and Receiver devices; establish shared keys between the Initiator and Receiver devices for use in other group key establishment protocols for establishing a group key among a group of parties including the Initiator and Receiver devices; secure a communication session between the Initiator and Receiver devices; establish a long-lived communication channel between the Initiator and Receiver devices; the key that is established may form a signing secret between the Initiator and Receiver devices, which may be used, without limitation, for example to create a message authentication code (MAC) or tag etc.; the final key established between the Initiator and Receiver devices may be used for any other type of cryptography application/operations performed by each of or between the Initiator and Receiver devices and the like; modifications thereof; combinations thereto; and/or as the application demands.

Although it is described herein that the first key node (e.g. KNodeA) and second key node (e.g. KNodeB) are located in different geographical locations (e.g. KNodeA<>KNodeB), this is for simplicity and by way of example only and the invention is not so limited, it is to be appreciated by the skilled person that the key establishment systems, apparatus and process(es) according to the invention are also applicable when first key node and second key nodes are the same key node, or have two different logical locations on the same key node, or are the same logical key node (e.g. KNode A==KNode B), where both Initiator endpoint/device and Receiver endpoint/device communicate with the same server/computing device of the KNode or logical KNode rather than two different geographically . . . located servers/computing devices of two different KNodes, and the resulting KNode may be configured to select a key from the set of keys (e.g. a QKD key from an array of QKD keys) "shared with itself" (i.e. keys that it alone owns or knows) for use in generating the Bilocation or Intermediate Bilocation keys for the corresponding endpoints/devices when establishing a key between the Initiator endpoint/device and Receiver endpoint/device.

FIGS. 1 b and 1c are a schematic diagrams illustrating an example quantum cloud system/infrastructure 110 and 120 in which the secure communication network 102 is a quantum-secure network (or Quantum Cloud) 112 or 122 in which at least the first and a second devices 104a-104b are configured to be in communication with the quantum-secure network 102. For simplicity, reference numerals used in FIG. Ia are reused for the same or similar components when describing FIGS. Ib and Ic. The quantum-secure network 110 or 120 includes at least the first key node 106a and the second key node 106b (or a plurality of key nodes 106a-106b). Each of the first and second devices 104a-104b and the corresponding first and second key nodes 106a-106b may be configured to perform a key establishment/exchange protocol/process for enabling the first and second devices 104a-104b to exchange and/or agree on a key in a quantum-secure manner as the final or established key between the first and the second device 104a-104b (e.g. for securing a communication session therebetween, group key formation, future message signing and/or any other cryptographic operation or application and the like). In order to do this, each of the key nodes 106a-106b may have access to the set of keys which are a set of quantum-safe distributed keys. In this example, each of the key nodes 106a-106b may be in communication over quantum-secure channels 117a or 117b to the secure server 108a and 108b, where the secure server 108a and 108b is now referred to as a quantum server 108a or 108b (e.g. OGR A or OGR B), respectively, or each of the key nodes 106a-106b may be part of the quantum server 108a or 108b (e.g. OGR A or OGR B), respectively, which may dispense with the quantum-secure channels 117a or 117b. In this example, each quantum server 108a or 108b may include a secure distributed key store 108a-1 (e.g. HSM) or 108b-1 for securing a set of quantum distributed keys (the set of keys), referred to as quantum distributed key stores 108a-1 and 108b-1, and a quantum transceiver 108a-2 or 108*b*-2 (e.g. in FIG. 1 *b* this may be a telescope or in figure Ic this may be optical quantum transceiver). Alternatively, each quantum server 108*a* or 108*b* may not have a quantum distributed key store 108*a*-1 or 108*b*1, but rather another user node or device/server (e.g. customer owned equipment or corporate equipment and the like) may include a quantum distributed key store (or HSM) from which the quantum server 108*a* or 108*b* (e.g. OGR A or OGR B) may transmit or securely deposit quantum distributed keys for storage within said another user node, device/server and the like. The quantum distributed key store 108*a*-1 or 108*b*-2 is configured to securely store a set of quantum-safe distributed keys. It may be assumed that each set of quantum-safe distributed keys may be generated and distributed to each of the quantum-safe servers 108*a*-108*b* via a suitable quantum key distribution system as the application demands.

The quantum distributed key stores 108*a*-1 and 108*a*-2 may be a HSM as described with reference to FIG. 1*a* that is configured to safeguard and manage, without limitation, for example cryptographic or quantum distributed keys, and provide, without limitation, for example secure execution of core modules/components such as, without limitation, for example critical instructions, code, computer-implemented methods/process(es) and the like implementing cryptographic operations and/or core functionality of a quantum server and the like. The HSM includes anti-tampering technology that may, without limitation, for example wipe secrets/QD keys and the like in case of physical and/or software breach and the like. The HSM could be customer furnished equipment outside of the OGR, so that the OGR just forwards keys into the customer HSM Furthermore, although it may be described that the key nodes 106*a* and 106*b* may perform cryptographic operations during the key establishment process according to the invention, this is by way of example only and the invention is not so limited, it is to be appreciated by the skilled person that an HSM may also include functionality for performing cryptographic operations on the QKD keys stored inside the HSM on behalf of an associated key node 106*a* or 106*b*, which may be used to further secure the key establishment process according to the invention and/or as the application demands. For example, as the QKD keys themselves may be securely stored inside a first HSM 108*a*-1 connected to a first key node 106*a*/OGR 108*a*-2, some or even most and/or all of the cryptographic operations performed by the key node 106*a* using the corresponding QKD keys, intermediate keys, and/or bilocation keys and the like during the key establishment process according to the invention and/or as described herein with reference to FIGS. Ia to 4*b* may be performed inside the HSM 108*a*-1. This may prevent the key node 106*a* from ever seeing the QKD keys and/or operations performed thereon, may enhance the security of the key establishment process as described herein. Similarly, an second HSM 108*b*-1 connected to the second key node 106*b*/OGR 108*b*-2, some or even most and/or all of the cryptographic operations performed by the key node 106*b* using the corresponding QKD keys, intermediate keys, and/or bilocation keys and the like during the key establishment process according to the invention and/or as described herein with reference to FIGS. Ia to 4*b* may be performed inside the HSM 108*b*-1. This may also prevent the key node 106b from ever seeing the QKD keys and/or operations performed thereon, which may further enhance the security of the key establishment process as described herein.

FIGS. 1 *b* and Ic illustrate that each of the quantum servers 108*a*-108*b* (e.g. OGR/terrestrial quantum transceivers) is distinct from the other and is located at a different location to the other. Each of the key nodes 106*a*-106*b* are connected via quantum-secure channels 117*a*-117b (or secure classical channels) to the corresponding quantum servers 108*a*-108*b*. In some examples, each of the key nodes 106*a*-106*b* may be colocated at the geographical locations of the respective quantum servers 108*a*-108*b* to which they are connected via quantum-secure channels 117*a*-117*b*. In other example, one and/or the other of the key nodes 106*a*-106*b* may be located at geographical locations distinct from the respective quantum servers 108*a*-108*b* to which they are connected via quantum-secure channels 117*a*-117*b*. Although there are only two distinct quantum servers 108*a*-108*b* that are located in different geographical locations that are connected via quantum-secure channels 117*a*-117*b* with the respective two key nodes 106*a*-106*b*, this is by way of example only and the invention is not so limited, it is to be appreciated by the skilled person that there may be a plurality of distinct quantum servers, each located in a different geographical location, where each of the quantum servers has a corresponding key node located at the location of said each quantum server and/or there may be a plurality of distinct quantum servers, each located in a different geographical location, and each connected via a quantum-secure channel to a corresponding key node that may or may not be co-located with the quantum server to which it is connected.

For example, in FIG. 1 *b*, the quantum-safe distributed keys may be generated and distributed using, without limitation, for example a satellite quantum key distribution system 119 configured to perform a satellite quantum key distribution protocol for generating and communicating data representative of a set of quantum distributed keys over quantum/non-quantum satellite channels 119*a*-119*b* with the quantum transceivers 108*a*-2 to 108*b*-2, respectively. In another example, in FIG. 1 *c*, the quantum-safe distributed keys may be generated and distributed using, without limitation for example, a terrestrial-based quantum key distribution system configured to perform a terrestrial quantum key distribution protocol for generating and distributing the set of quantum distributed keys using quantum/non-quantum fibre channels 119*c* with corresponding quantum transceivers 108*a*-2 to 108*b*-2: (e.g. optical quantum transceivers), respectively. Although two types of quantum key distribution systems are briefly described, this is by way of example only and the invention is not so limited, it is to be appreciated by the skilled person that any type of quantum key distribution protocol and/or quantum key distribution system may be used such as, without limitation, for example satellite quantum key distribution, terrestrial quantum key distribution, satellite/terrestrial hybrid quantum key distribution, and/or any other type of quantum key distribution system, combinations thereof, modifications thereto, as herein described and/or as the application demands.

Regardless of the quantum key distribution system 119 used, e.g. satellite and/or terrestrial QKD, combinations thereof, modifications thereto and/or the like as the application demands, each of the quantum distributed key stores 108*a*-1 to 108*b*-1 includes a set of quantum distributed keys. Each of the quantum servers 108*a*-108*b* may include the same set or subset of quantum distributed keys stored in the corresponding quantum distributed key stores 108*a*-1 to 108*b*-1. The set of quantum-safe distributed keys stored on the quantum distributed key stores 108*a*-1-108b-1 may be used to set up each of the quantum-secure communication channels 117*a*-117*c* of the quantum-secure network 102 and/or the quantum-secure channels 115*a*-115*b* between the quantum-secure network 102 and the first and second devices 104a-104b, respectively. That is, each quantum-secure communications channel (or quantum-safe communications channel) may comprise or represent a communications channel that is encrypted with a corresponding quantum safe distributed key from the set of quantum-safe distributed keys, and/or encrypted with a quantum-safe key derived from one or more quantum-safe distributed keys of the set of quantum-safe distributed keys. A quantum-secure channel may use symmetric encryption based on a quantum-safe key that has been agreed upon by each side of the channel. For simplicity, it is assumed that the connections between the first device/endpoint 104a, second device/endpoint 104b and the quantum-secure network 112 or 122 are protected by a preestablished quantum-safe distributed key, and that inter-service communications within the quantum-secure network 112/122 and/or the quantum cloud system/infrastructure 110/120 are similarly protected by quantum-secure channels/connections.

Figure 1B:
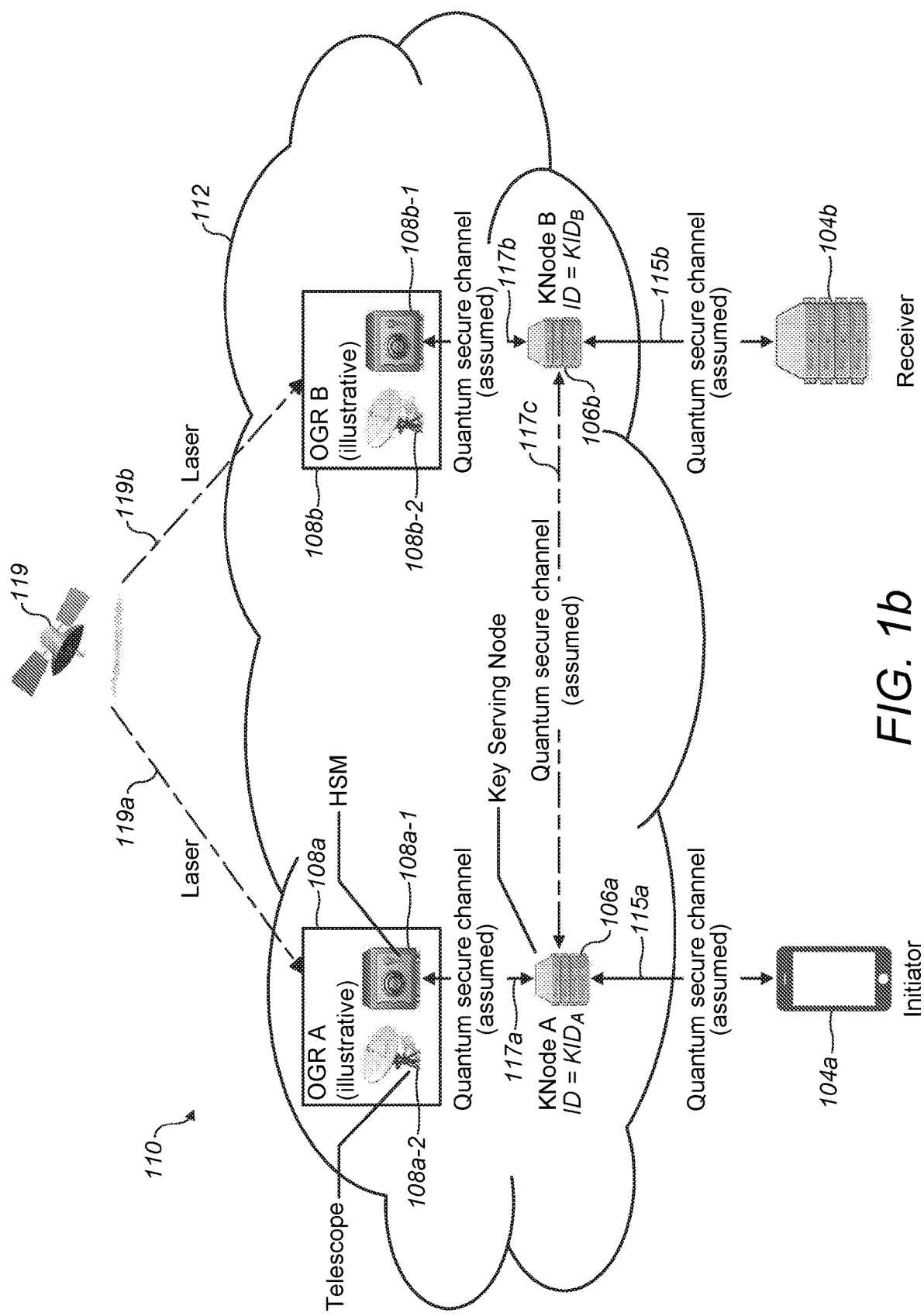
FIG. 1b is a schematic diagram illustrating another example system for use with a key establishment protocol or process applied between an initiator device and receiver device according to some embodiments of the invention.
Figure 1C:
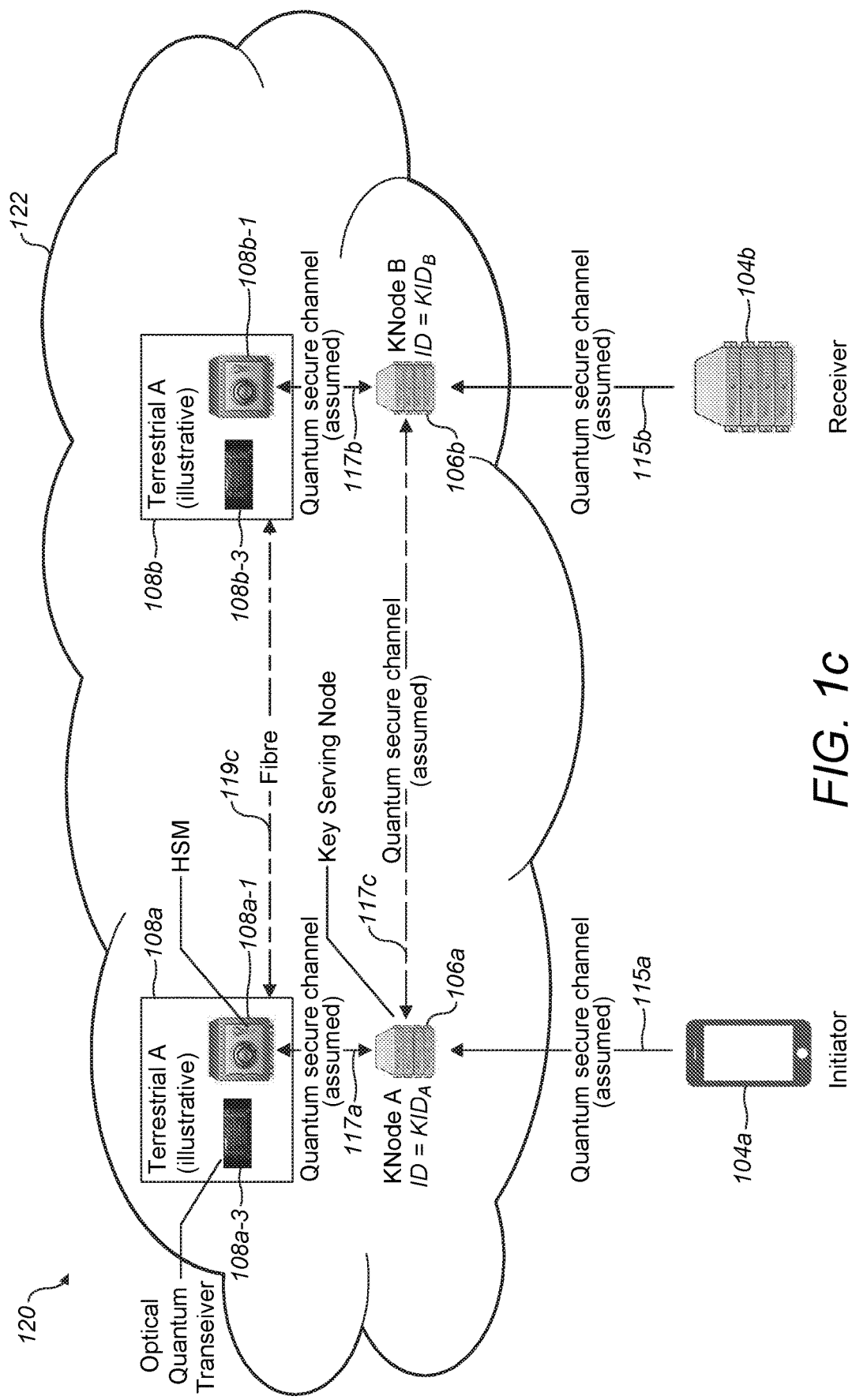
FIG. 1c is a schematic diagram illustrating yet another example system for use with a key establishment protocol or process applied between an initiator device and receiver device according to some embodiments of the invention.

In the examples of FIGS. 1b and 1c, first key node 106a is in communication with the first device 104a over a first quantum-secure channel 115a. The second key node 106b is in communication with the second device 104b over a second quantum-secure channel 115b. In addition, each of the key nodes 106a-106b are also in communication with each other over a third quantum-secure channel 117c. The key nodes 106a-106b and quantum servers 108a-108b and corresponding quantum-secure channels 115c, 117a, 117b and 117c form a portion of the quantum cloud/network 112/122. Although a first and second key node 106a-106b are described, this is by way of example only and the invention is not so limited, it is to be appreciated by the skilled person in the art that the quantum-secure network 112/122 may include a plurality of key nodes and a plurality of quantum servers, each quantum server connected to via a quantum-secure channel to a corresponding key node of the plurality of key nodes, and each of the key nodes connected by a quantum-secure channel (e.g. when needed) with one or more other key nodes as needed and/or as required.

As described, each of the first and second devices 104a-104b and the corresponding first and second key nodes 106a-106b may be configured to perform a key establishment/exchange protocol/process for enabling the first and second devices 104a-104b to exchange and/or agree on an established or final key such as, without limitation, for example an established/final key derived from one or more quantum distributed keys and the like in a quantum-secure manner for use in cryptographic operations/applications on each of the devices 104a-104b and/or between: each of the devices 104a-104b and the like. For example, the established key may be used between the first and second devices 104a-104b to secure a communication session between the first and the second devices 104a-104b. In another example, the established key may be used in any other cryptographic operation on each of the first and second devices 104a-104b and/or between each of the first and second devices 104a-104b based on the type of cryptographic application operating thereon or therebetween and the like. In this example, the first device 104a is called the Initiator endpoint 104a and the second device 104b is called the Receiver endpoint 104b. It is assumed that each device/endpoint has a unique identification and that each device/endpoint 104a-104b already has established a quantum-secure channel 115a and 115b to communicate with a different or unique key-service node (KNode) 106a or 106b of the quantum-secure network 112/122 (e.g. Quantum Cloud). This may be achieved using, without limitation, for example an API gateway, gateway and/or load balancer and the like within the quantum network 112/122 (or Quantum Cloud). For example, the unique identification of each endpoint 104a/104b may be based on, without limitation, for example during an authentication of said each endpoint 104a/104b with the corresponding KNode 106a/106b, and/or gateway and the like of the quantum network including the KNode 106a/106b, which uniquely and incontrovertibly identifies the endpoint identifier (ID) of said each endpoint 104a/104b. Each endpoint 104a/104b negotiates its copy of the Bilocation Key with the corresponding KNode 106a/106b. Since both parties of the endpoints 104a/104b separately authenticate to the corresponding different KNodes, mutual authentication is provided. It is also assumed that all communication channels 117a-117c between KNodes 104a-104b and/or quantum servers 108a-108b within the quantum network 112/122 (e.g. all inter-service connections within the quantum cloud infrastructure) are suitably quantum-secure, that is each of the channels 117a-117c are quantum-secure communication channels. In addition, the connections, if any, between the Initiator endpoint 104a and Receiver endpoint 104b may be, without limitation, for example over a classically-secure or encrypted communications channel such as, without limitation, for example transport layer security (TLS) or equivalent—e.g. this is not a clear channel.

The key exchange protocol/process for enabling the first and second devices 104a-104b to exchange and/or agree on a key such as, without limitation, for example a key derived in a quantum-secure manner. This may enable the Initiator endpoint 104a to communicate with Receiver endpoint 104b over a communication channel encrypted with a key derived from the Bilocation Key, where the Initiator endpoint 104a collects its copy of the Bilocation Key from a different KNode 106a than the KNode 106b used by the Receiver endpoint 104b to collect its copy of the Bilocation Key. Alternatively or additionally, this may enable the Initiator endpoint 104a and/or Receiver endpoint 104b to use the Bilocation Key to form a final key in one or more other cryptographic operations and/or applications such as, without limitation, for example quantum-secure communications therebetween; quantum-secure digital signing applications; other group key establishment protocols for establishing a group key among a group of parties including the Initiator and Receiver devices; establishing a long-lived communication channel between the Initiator and Receiver devices; the key established between the Initiator and Receiver devices may be used for any other type of cryptography application/operations performed by each of or between the Initiator and Receiver devices and the like, and/or as the application demands.

In addition, a combination of one or more handshaking processes, distribution of different nonces between endpoints and/or KNodes, and/or distribution of different Intermediate Bilocation Keys to endpoints may be used to, without limitation, for example mathematically/cryptographically prevent replay attacks; prevent an eavesdropper (e.g. Eve) gaining access to the key in the event that Eve intercepts data exchanged as part of the one or more handshaking process(es); and/or prevent Eve gaining access to the resulting/final key in the event that Eve penetrates the Quantum Cloud 112/122 (or quantum-secure network 112/122) infrastructure.

The final or established key is created either by: a) the Initiator device 104a and Receiver device 104b based on the collected copies of the Bilocation Key or related parts thereof from geographically distinct locations and a nonce generated by the Receiver device 104b that is known to both devices 104a-104b; or b) a challenge/response protocol in which the Initiator and Receiver devices 104a-104b send challenge nonces to each other and calculate corresponding challenge responses based on the received challenge nonces and the Bilocation Keys, which are sent therebetween, in which when the received challenge responses are confirmed by the Initiator and Receiver devices 104a-104b the final key is created by a combination of corresponding unsent portions of the challenge response.

Thus, the Initiator device and Receiver device 104a-104b may use the above-mentioned key establishment process to generate or establish a final key that may be used for, without limitation, for example secure communications between the Initiator and Receiver devices; quantum-secure communications therebetween; establish shared keys between the Initiator and Receiver devices for use in other group key establishment protocols for establishing a group key among a group of parties including the Initiator and Receiver devices; secure a communication session between the Initiator and Receiver devices; establish a long-lived communication channel between the Initiator and Receiver devices; the key that is established may form a signing secret between the Initiator and Receiver devices, which may be used, without limitation, for example to create a message authentication code (MAC) or tag etc.; the final key established between the Initiator and Receiver devices may be used for any other type of cryptography application/operations performed by each of or between the Initiator and Receiver devices and the like; modifications thereof; combinations thereto; and/or as the application demands.

Figure 2A:
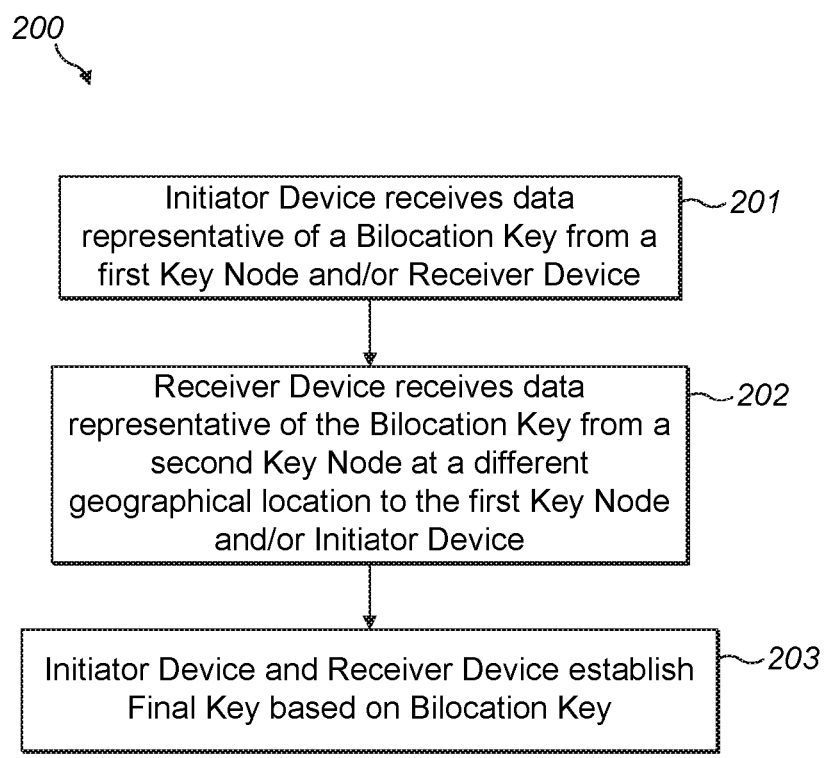
FIG. 2a a flow diagram illustrating an example key establishment process for use with the systems of FIGS. 1a and 1b according to some embodiments of the invention.

FIG. 2a a flow diagram illustrating another example key establishment process 200 for use with the systems 100, 110 and/or 120 of FIGS. Ia to Ic according to some embodiments of the invention. For simplicity, reference numerals from FIGS. 1 a, 1 b and/or Ic are reused for the same or similar components. The final key that is established is for use by a first device or endpoint 104a (e.g. initiator device/endpoint) and a second device or endpoint 104b (e.g. a receiver device/endpoint), where during the key establishment the first device 104a and second device 104b communicates over a secure channel (e.g. classically secured channel 105a/105b or quantum-secured channel 115a/115b) with a first key node 106a and a second key node 106b of the secure network 102, 112 or 122 and the like (e.g. e.g. network 102 or Quantum Cloud 112/122), where the first key node 106a is in a different geographical location to the second key node 106b. Each of the key nodes 106a and 106b may form a pair in that they share the same set of keys (e.g. same set of quantum distributed keys when quantum-secure network 112 or 120 used) what were received by respective secure/quantum servers 108a and 108b from a key distribution system 109 (e.g. quantum distribution system including satellite QKD system 119 or terrestrial QKD system 119c etc.) configured for distributing the same set of keys to different geographical locations. The key establishment process 200 for establishing a Final Key between the first device 104a and the second device 104b includes one or more of the following steps of:

In step 201, the first device 104a (or Initiator Device/Endpoint) receives data representative of key establishment data from a first Key Node 106a over a secure channel (e.g. a classically secure channel 105a in network 102 or quantum-secure channel 115a in networks 112 or 122) and the second device 104b (e.g. Receiver Device/Endpoint) over a standard encrypted communication channel for use in generating or deriving a Bilocation Key. The Bilocation Key being generated/derived by the first key node 106a based on data representative of the same distributed key selected by both the first and second key nodes 106a and 106b from the set of distributed keys (e.g. same set of quantum distributed keys when quantum-secure network 112 or 120 used) and/or cryptographic data representative of one or more random nonces generated by the first device 104a, the second device 104b and/or the first and/or second key nodes 106a and 106b and/or combinations thereof. For example, each of the first and second key nodes 106a and 106b selects a key from the corresponding key pool (e.g. each key pool includes the same set of distributed keys) performs a key selection algorithm based on received data that outputs the same distributed key index or location in the set of distributed keys enabling the first and second key nodes 106a and 106b to select the same distributed key for use in deriving the Bilocation key. For example, when quantum-secure network 112 or 120 used, the key selection algorithm performed at first and second key nodes 106a and 106b selects the same quantum distributed key from the set of quantum distributed keys.

In step 202, the second device 104b (or Receiver Device/Endpoint) receives data representative of key establishment data from a second Key Node 106b over a secure channel (e.g. encrypted channel 105b/115b) and the first device 104a (e.g. Initiator Device/Endpoint) over the standard encrypted communication channel for use in deriving the Bilocation Key. The Bilocation Key derived or received by the first device is the same as the Bilocation Key received or derived by the second device. The Bilocation Key being generated/derived by the second key node 106b based on data representative of the same distributed key selected by both the first and second key nodes 106a and 106b from the set of distributed keys and cryptographic data representative of one or more random nonces generated by the first device 104a, the second device 104b and/or the first and/or second key nodes 106a and 106b, and/or combinations thereof.

In step 203, the first and second devices 104a and 104b use their corresponding Bilocation Keys to generate the same final key. The final key may be used for, without limitation, for example in secure communications; quantum-secure communications, when the set of keys includes quantum distributed keys; group key formation; digital signing; and/or other cryptographic operations/applications and/or purposes and the like at each of and/or between the first and second devices 104a and 104b. For example, the first and second devices 104a and 104b may form the final key based on combining their corresponding Bilocation Keys with an agreed combination of random nonces received therebetween. Alternatively or additionally, the first and second devices 104a and 104b may generate the final key based on performing one or more challenge response protocols based on the Bilocation Key the results of which are used to agree upon the final key derived from the corresponding Bilocation Keys.

Thereafter, the first device 104a and second device 104b may use the final key for use in cryptographic operations/applications and the like. For example, the first and second devices 104a-104b may initiate a communication session using the final key to encrypt their communications channel and/or data communicated therebetween. Alternatively or additionally, as another example, the first and second devices 104a-104b may use the final key as a shared key therebetween for use in establishing a group key with a group of other devices including the first and second devices 104a-104b.

The key establishment protocol may be used between an Initiator device/endpoint 104a and the Receiver device/endpoint 104b such they receive the same final key from different geographical locations (e.g. different secure servers/KNodes), but rooted in a distributed key (e.g. quantum distributed key when quantum-network 112 or 122) that was delivered to the geographical locations (e.g. quantum servers/KNodes) in a quantum safe manner (e.g. photonically). Although several example applications or uses of the final key is presented, this is by way of example only and the invention is not so limited, it is to be appreciated by the skilled person that the final key that is the same at the first device and the second device 104a and 104b may be used in any suitable cryptographic operation, application, system, communications and the like, as herein described, combinations thereof, modifications thereto, and/or as the application demands.

Figure 2B:
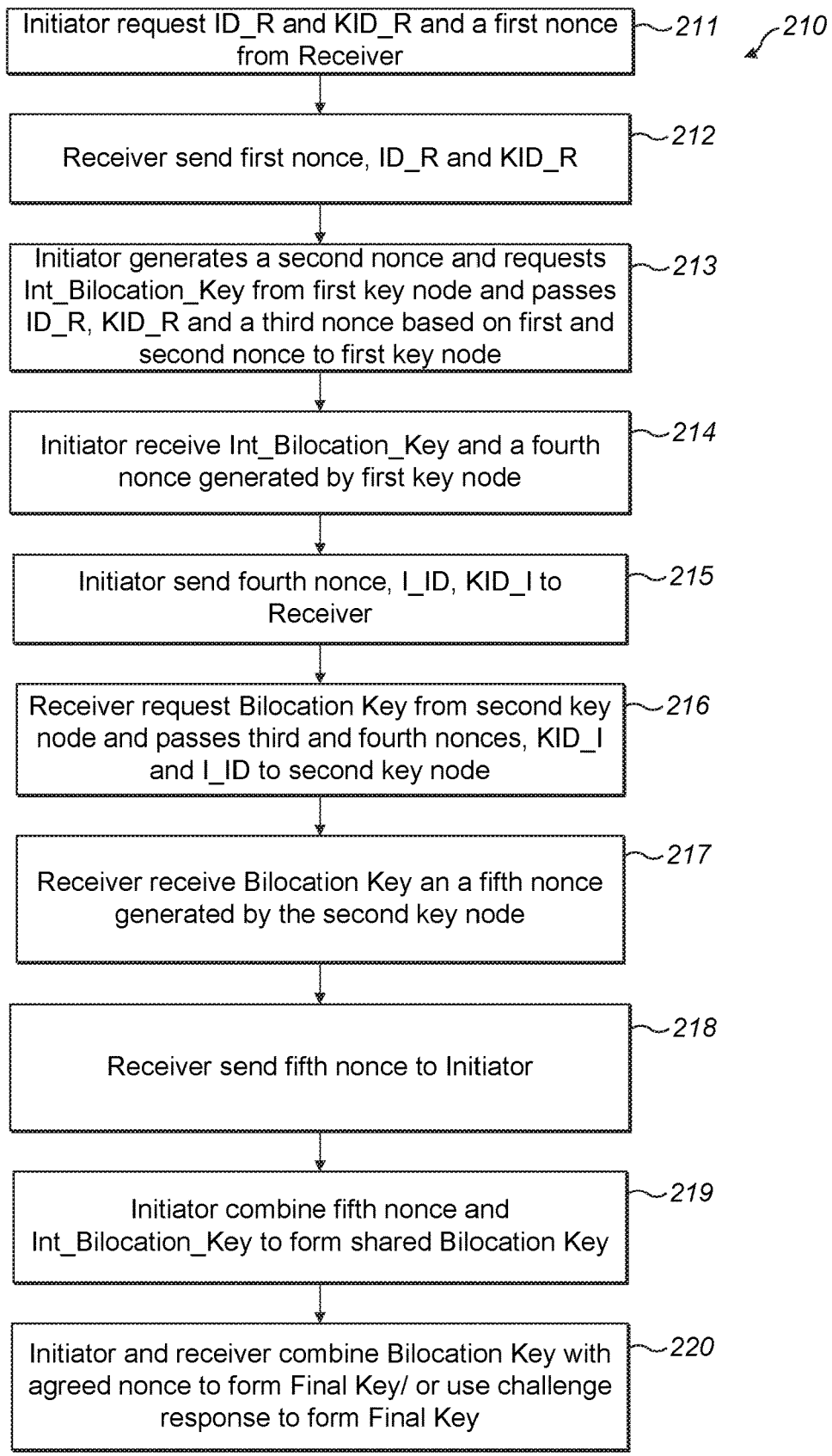
FIG. 2b a flow diagram illustrating another example key establishment process for use with the systems of FIGS. 1a and 1b according to some embodiments of the invention.

FIG. 2b is a flow diagram illustrating another example key establishment process 210 that may be used to further modify the key establishment process 200 of FIG. 2a for use with the network systems 100, 110 and/or 120 of FIGS. Ia, 1 b and/or Ic according to some embodiments of the invention. For simplicity, reference numerals from FIGS. 1 a, 1 b and/or Ic are reused for the same or similar components. In this example, the first device 104a is called the Initiator endpoint and the second device 104b is called the Receiver endpoint. The Initiator device/endpoint 104a initiates the key establishment procedure to establish a Final Key between the Initiator device/endpoint 104a and the Receiver device/endpoint 104b. For example, the Final Key may be used for securing a communication session between the Initiator device 104a and the Receiver device 104b and/or any other suitable purpose. The key establishment process 210 includes one or more of the following steps of:

In step 211, the Initiator endpoint 104a requests for the Receiver endpoint 104b to provide: a) the ID of the Receiver endpoint 104b (e.g. ID_R); the ID of the KNode 106b that the Receiver endpoint 104b wishes to negotiate with (e.g. KID_R); and a first nonce generated by the Receiver endpoint 104b (e.g. N_R).

In step 212, the Receiver endpoint responds with data representative of: a) the generated first nonce (e.g. N_R); b) the ID of the Receiver endpoint 104b (e.g. ID_R); c) and the ID of the KNode 104b (e.g. KID_R).

In step 213, Initiator generates a second nonce (e.g. N_I) and requests an Intermediate Bilocation Key (e.g. Int_Bilocation_Key) from a different KNode 106a than that of the Receiver endpoint 104b, in which the request includes data representative or passes data representative of: a) the ID of the Receiver endpoint 104b (e.g. ID_R); b) the ID of Receiver endpoint's KNode 106b (e.g. KID_R); and c) a third nonce which is derived from the first and second nonces. The third nonce may be based on a combination or function based on the first nonce and the second nonce (e.g. an XOR-type operation using the first and second nonces; i.e. N_IR=N_R XOR N_I, when binary symbols are used or a hash-type operation using the first and second nonces; i.e., N_IR=#(N_R, N_I)).

In step 214, in response to the Intermediate Bilocation Key request, the Initiator endpoint 104a is returned or receives an Intermediate Bilocation Key (e.g. Int_Bilocation_Key) and a fourth nonce (e.g. a first anti-replay nonce) used in its creation from the KNode 106a.

In step 215, Initiator sends or passes data representative of: a) the second and fourth nonces (e.g. N_I and first anti-replay nonce); b) the ID of the Initiator endpoint 104a (ID_I); and c) the ID of its chosen KNode 106a (e.g. KID_I); to the Receiver endpoint 104b. The Receiver endpoint 104b generates the third nonce (e.g. N_IR) from the received second nonce and its generated first nonce (e.g. N_IR=N_I XOR N_R or N_IR=#(N_I, N_R)).

In step 216, the Receiver endpoint 104b requests a Bilocation Key from its KNode 106b and sends/passes data representative of: a) the third and fourth nonces; b) ID_I; and c) KID_I; to the KNode 106b, which is used to generate the Bilocation Key. Note that the third nonce N_IR may be hashed (e.g., as N_IR') before being sent to the cloud on both Initator 104a and Receiver 104b.

In step 217, the Receiver endpoint 104b is sent/passed a Bilocation Key and a fifth nonce (e.g. second anti-replay nonce) used in its creation from the KNode 106b.

In step 218, Receiver endpoint 104b sends/passes the fifth nonce (e.g. second anti-replay nonce) back to the Initiator endpoint 104a.

In step 219, Initiator endpoint 104a combines the fifth nonce (e.g. second anti-replay nonce) and the Intermediate Bilocation Key to form the shared Bilocation Key. The Bilocation Key received by the Receiver endpoint 104b is the same as the Bilocation Key calculated at the Initiator endpoint 104a and, so has been shared therebetween, thus the Bilocation Key at each of the endpoints 104a-104b may be referred to as a shared Bilocation Key.

In step 220, Initiator endpoint 104a and Receiver endpoint 104b form the Final Key based on either: a) combining the Bilocation Key with an agreed nonce (e.g. the third nonce, which is a combination of the first and second nonces) to form the Final Key; or b) use a challenge-response protocol to form the Final Key; c) hash the third nonce, N_IR, into a bilocation key to form Final Key. The final bilocation key is not known to the QuantumCloud 112/122.

Thereafter, the Initiator endpoint 104a and Receiver Endpoint 104b initiate a communication session using the Final Key to, without limitation, for example encrypt their communications channel and/or data communicated therebetween and/or for other purposes. Although in this example, the Final Key is used to secure a communication channel between the Initiator endpoint 104a and Receiver Endpoint 104b, this is by way of example only and the invention is not so limited, it is to be appreciated by the skilled person that the Final Key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Figure 2C:
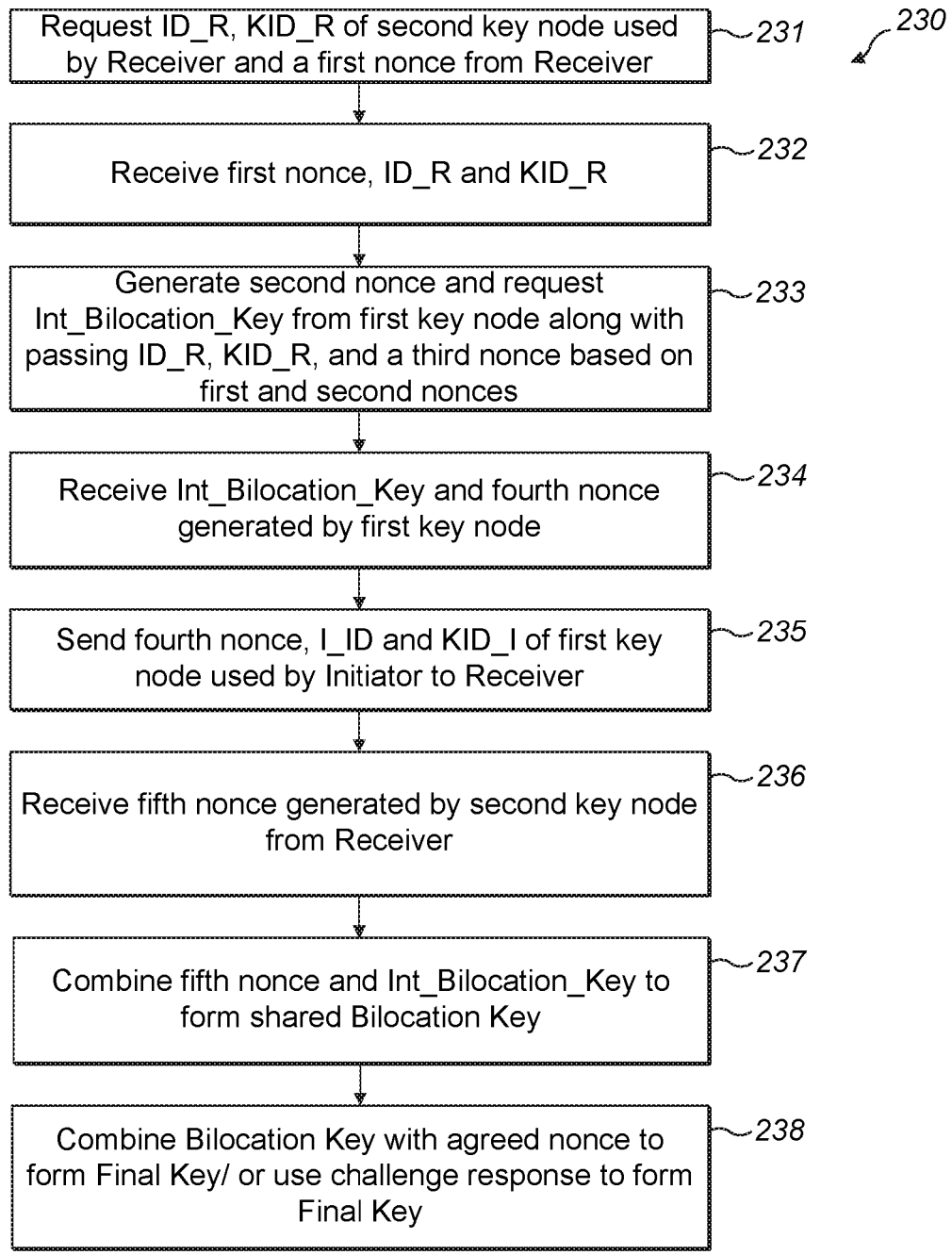
FIG. 2c a flow diagram illustrating another example key establishment process for an initiator device of FIG. 2b according to some embodiments of the invention.

FIG. 2c is a flow diagram illustrating an example initiator key establishment process 230 performed by an initiator device 104a for the key establishment process 210 of FIG. 2b according to some embodiments of the invention. For simplicity, reference numerals from FIGS. 1 a, 1 b and/or Ic are reused for the same or similar components. The Initiator device/endpoint 104a initiates the key establishment procedure to establish a Final Key between the Initiator device/endpoint 104a and the Receiver device/endpoint 104b. For example, the Final Kay may be used, without limitation, for example for securing a communication session between the Initiator device 104a and the Receiver device 104b and/or for any other suitable purpose. The Initiator key establishment process 230, performed by the Initiator device 104a, includes one or more of the following steps of:

in step 231, the Initiator endpoint 104a requests for the Receiver endpoint 104b: a) the ID of the Receiver endpoint 104b (e.g. ID_R); b) the ID of the KNode 106b (e.g. KID_R)

that the Receiver endpoint 104b wishes to negotiate with; and c) a first random nonce generated by the Receiver endpoint 104b (e.g. N_R).

In step 232, the Initiator endpoint 104a receives from the Receiver endpoint 104b data representative of: a) ID_R; b) KID_R; and c) the first random nonce (e.g. N_R).

In step 233, Initiator endpoints 104a generates a second random nonce (e.g. N_I) and requests an Intermediate Bilocation Key (Int_Bilocation_Key) from a different KNode 106a located in a different geographical location than that of the Receiver endpoint's 104b KNode 106b, in which the request includes data representative of or passes data representative of: a) ID_R; b) KID_R; and c) a third random nonce (e.g. N_IR) derived from the first and second nonces (e.g. N_R and N_I). The third nonce may be based on a combination or function based on the first nonce and the second nonce (e.g. an XOR-type operation using the first and second nonces; i.e. N_IR=N_R XOR N_I, when binary symbols are used, or a hash-type operation using the first and second nonces, i.e., N_IR=#(N_R, N_I)).

In step 234, the Initiator endpoint 104a receives the Int_Bilocation_Key from the Knode 106a and a fourth nonce (e.g. first anti-replay nonce) used in its creation by the KNode 106a.

In step 235, the Initiator endpoint sends or passes data representative of: a) the fourth nonce (e.g. first anti- replay nonce); b) the ID of the Initiator endpoint 104a (ID_I); and c) the ID of its chosen KNode 106a (KID_I); to the Receiver endpoint 104b. The Receiver endpoint 104b sends this received information in a request for a Bilocation Key from the Knode 106b that the Receiver endpoint 104b is using/ negotiating with, where the Knode 106b generates the Bilocation Key and a fifth nonce (e.g. second anti-replay nonce) and sends back data representative of the Bilocation Key and the fifth nonce to the Receiver endpoint 104b.

In step 236, the Initiator endpoint 104a receives from the Receiver endpoint 104b the fifth nonce (e.g. second anti-replay nonce).

In step 237, the Initiator endpoint 104a combines the fifth nonce (e.g. second anti-replay nonce) and the Int_Bilocation_Key to form the shared Bilocation Key. For example, this may be based on a hash of the Int_Bilocation_Key and the second anti-replay nonce. The Bilocation Key received by the Receiver endpoint 104b is the same as the Bilocation Key calculated at the Initiator endpoint 104a and, so has been shared therebetween, thus the Bilocation Key at each of the endpoints 104a-104b may be referred to as a shared Bilocation Key.

In step 238, Initiator endpoint 104a either: a) forms the Final Key based on combining the shared Bilocation Key with a common nonce agreed with the Receiver endpoint 104b (e.g. the third nonce, which is a combination of the first and second nonces), where the Receiver endpoint 104b does the same operations to form the same Final Key at the Receiver endpoint 104b; or b) communicates with the Receiver endpoint 104b using a challenge-response protocol to form a common Final Key.

Thereafter, the Initiator endpoint 104a and Receiver Endpoint 104b initiate a communication session using the Final Key to, without limitation, for example encrypt their communications channel and/or data communicated therebetween and/or for other purposes. Although in this example, the final key is used to secure a communication channel between the Initiator endpoint 104a and Receiver Endpoint 104b, this is by way of example only and the invention is not so limited, it is to be appreciated by the skilled person that the final key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Figure 2D:
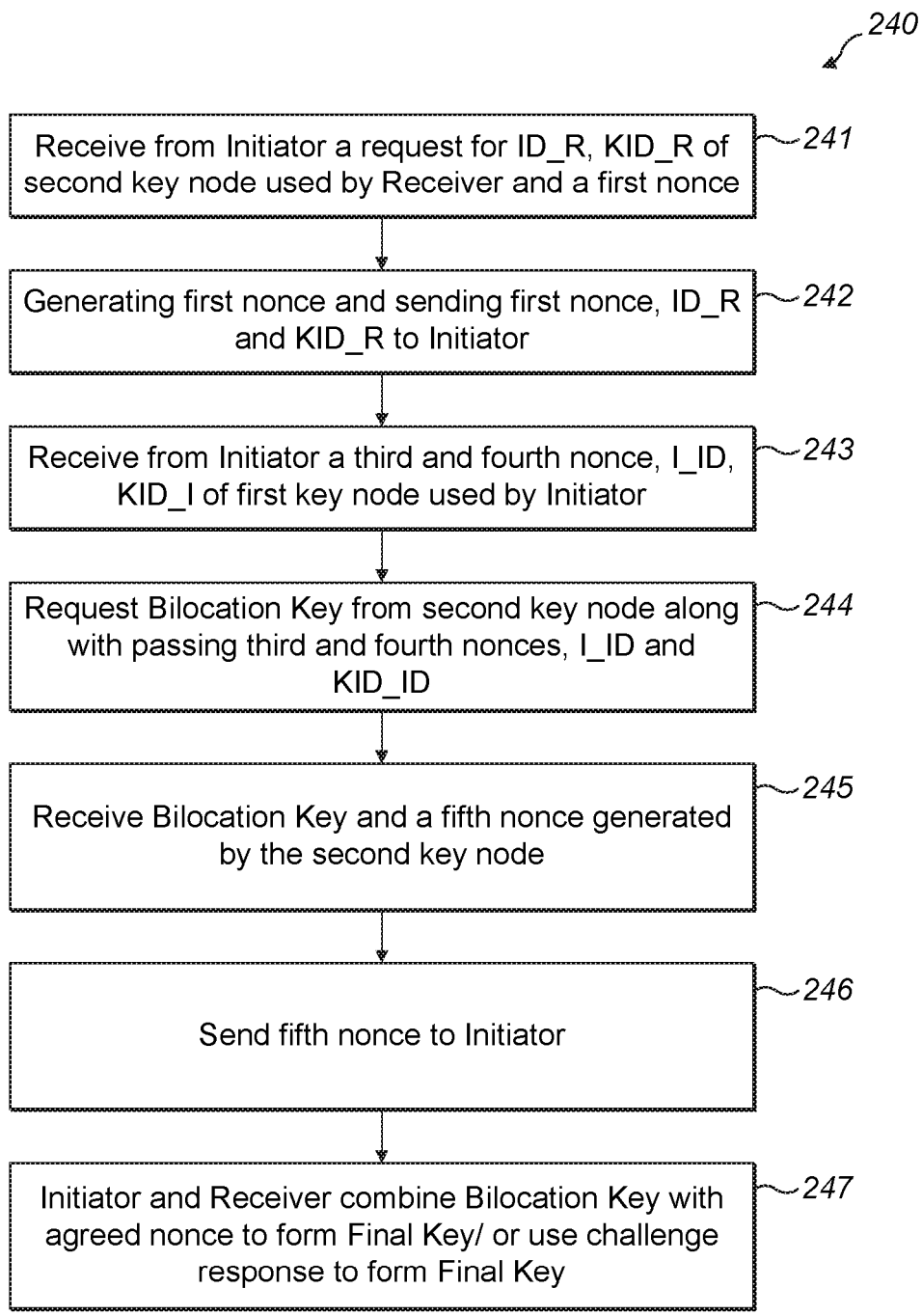
FIG. 2d a flow diagram illustrating another example key establishment process for a receiver device of FIG. 2b according to some embodiments of the invention.

FIG. 2d is a flow diagram illustrating an example receiver key establishment process 240 performed by a receiver device 104b for the key establishment process 210 of FIG. 2b according to some embodiments of the invention. For simplicity, reference numerals from FIGS. 1 a, Ib and/or Ic are reused for the same or similar components. The Initiator device/endpoint 104a initiates the key establishment procedure to establish a Final Key between the Initiator device/endpoint 104a and the Receiver device/endpoint 104b. For example, the Final Kay may be used, without limitation, for example for securing a communication session between the Initiator device 104a and the Receiver device 104b and/or for any other suitable purpose. The receiver key establishment process 240, performed by the Receiver device 104b, includes one or more of the following steps of:

In step 241, receiving a request from the Initiator endpoint 104a during the key establishment process for: a) the ID of the Receiver endpoint 104b (e.g. ID_R); the ID of the KNode 106b (e.g. KID_R) that the Receiver endpoint 104b wishes to negotiate with; and c) a first random nonce (e.g. N_R) to be generated by the Receiver endpoint 104b. The Receiver endpoint 104b generates a random first nonce (e.g. N_R).

In step 242, sending the Initiator endpoint 104a data representative of: a) ID_R; b) KID_R; and c) the generated random first nonce (e.g. N_R). On receipt of this information, in step 233 of process 230, the Initiator device 104a generates a second random nonce (e.g. N_I) and derives a third nonce (e.g. N_IR) based on the first and second nonces (e.g. N_R and N_I). The third nonce may be based on a combination or function based on the first nonce and the second nonce (e.g. an XOR-type operation using the first and second nonces; i.e. N_IR=N_R XOR N_1, when binary symbols are used, or a hash-type operation using the first and second nonces, i.e. N_IR=#(N_R, N_I)). The Initiator device 104a requests an Intermediate Bilocation Key (Int_Bilocation_Key) from a different KNode 106a in a different geographical location to that of the KNode 106b used by the Receiver endpoint 104b. The Knode 106b derives the Int_Bilocation_Key and a fourth nonce (e.g. first anti-replay nonce), which is sent back to the Initiator device 104a in step 234 of process 230.

In step 243, the Receiver endpoint 104b receives from the Initiator endpoint 104a data representative of: a) the second nonce generated by the Initiator device 104a (e.g. N_I) and the fourth nonce (e.g. first anti-replay nonce) generated by the first key node 106a; b) the ID of the Initiator endpoint 104a (ID_1); and c) the ID of its chosen KNode 106a of the Initiator endpoint 104a (KID_I).

In step 244, the Receiver endpoint 104b requests a Bilocation Key from its KNode 106b and sends/passes data representative of: a) the third and fourth nonce (e.g. N_IR and the first anti-replay nonce); and b) ID_I; and c) KID_I. On receipt of this information, the Knode 106b is configured to generate the Bilocation Key and a fifth nonce (e.g. second anti-replay nonce) and sends back data representative of the Bilocation Key and the fifth nonce (e.g. second anti-replay nonce).

In step 245, the Receiver endpoint 104b receives from the KNode 106b the Bilocation Key and the fifth nonce (e.g. second anti-replay nonce) used in its creation by the KNode 106b.

In step 247, Receiver endpoint 104b sends/passes the fifth nonce (e.g. second anti-replay nonce) to the Initiator endpoint 104a. On receipt of the fifth nonce, the Initiator endpoint 104a combines the fifth nonce (e.g. second anti-replay nonce) and the Int_Bilocation_Key to form the shared Bilocation Key. The Bilocation Key received by the Receiver endpoint 104b is the same as the Bilocation Key calculated at the Initiator endpoint 104a and, so has been shared therebetween, thus the Bilocation Key at each of the endpoints 104a-104b may be referred to as a shared Bilocation Key.

In step 248, Receiver endpoint 104b and Initiator endpoint 104a form the Final Key based on either: a) combining the Bilocation Key with an agreed nonce (e.g. the combination of the first and second nonces) to form the Final Key; or b) use a challenge-response protocol to form the Final Key.

Thereafter, the Initiator endpoint 104a and Receiver Endpoint 104b may initiate a communication session using the Final Key to, without limitation, for example encrypt their communications channel and/or data communicated therebetween. Although in this example, the final key is used to secure a communication channel between the Initiator endpoint 104a and Receiver Endpoint 104b, this is by way of example only and the invention is not so limited, it is to be appreciated by the skilled person that the final key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Figure 2E:
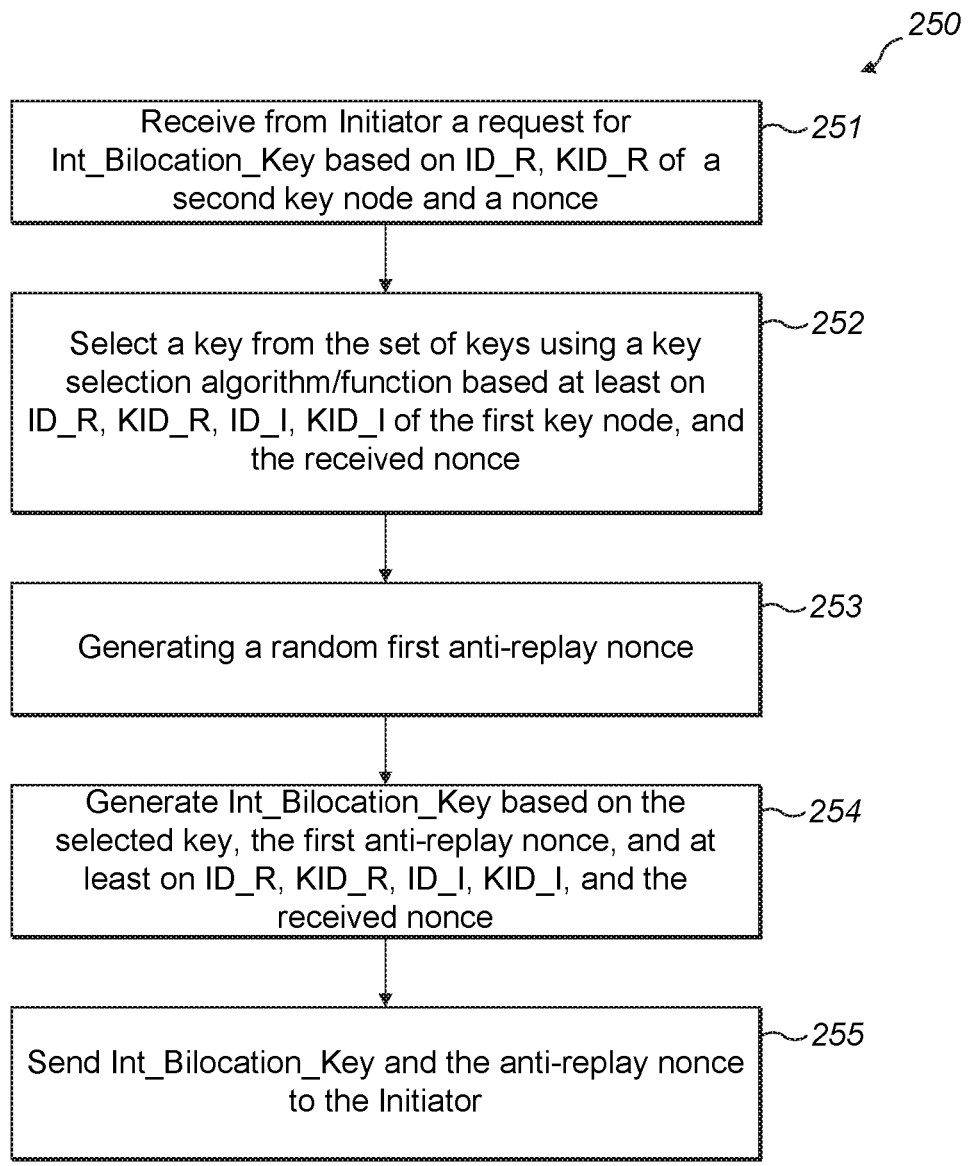
FIG. 2e a flow diagram illustrating another example key establishment process for a key node used by the initiator device of FIG. 2b according to some embodiments of the invention.

FIG. 2e is a flow diagram illustrating an example first key node key establishment process 250 performed by a first key node 106a used by the Initiator Device 104a in key establishment process 210 of FIG. 2b according to some embodiments of the invention. For simplicity, reference numerals from FIGS. 1a, 1b and/or 1c are reused for the same or similar components. In this example, the first key node 106a includes a set of distributed keys (or set of keys) and are the same as the set of distributed keys of the second key node 106b used by the Receiver endpoint 104b. For example, when the secure network is a quantum network 112 or 120, the set of distributed keys is a set of quantum distributed keys. The Initiator device/endpoint 104a initiates the key establishment procedure to establish a Final Key between the Initiator device/endpoint 104a and the Receiver device/endpoint 104b. For example, the Final Key may be used, without limitation, for example for securing a communication session between the Initiator device 104a and the Receiver device 104b and/or for any other suitable purpose. The key node key establishment process 250 includes one or more of the following steps:

In step 251, receiving from the Initiator Device 104a a request to generate an Intermediate Bilocation Key, in which the request includes data representative of: a) the ID of the Receiver endpoint 104b (ID_R); b) the ID of Receiver endpoint's KNode 106b i.e. the second key node 106b (KID_R); and c) a third nonce (e.g. N_IR) which is derived from a first random nonce (e.g. N_R) generated by the Receiver endpoint 104b and a second random nonce (e.g. N_I) generated by the Initiator end point 104a. The third nonce may be based on a combination or function based on the first nonce and the second nonce (e.g. an XOR-type operation using the first and second nonces; i.e. N_IR=N_R XOR N_I, when binary symbols are used, or a hash-type operation using the first and second nonces, i.e., N_IR=#(N_R, N_I)).

In step 252, selecting a key from the set of distributed keys (or set of keys) using a key selection algorithm/function based at least on the ID_R, KID_R, the ID of the Initiator endpoint 104a (ID_I), the ID of the first key node 106a (KID_I), and the third nonce. The ID_I of the Initiator endpoint 104a may be received or derived during authentication of the Initiator endpoint 104a with the first key node 106a. The key selection algorithm/function may be based on a hash function. For example, when the secure network is a quantum-secure network 112 or 120, the selected key is selected from the set of quantum distributed keys and so is a quantum distributed key.

In step 253, the first key node 106a generates a first random anti-replay nonce for use in deriving/generating the Int_Bilocation_Key.

In step 254, the first key node 106a generates the Int_Bilocation_Key based on the selected key, the first anti-replay nonce, and at least on ID_R, KID_R, ID_I, KID_I, and the received third nonce (e.g. N_IR). For example, the Int_Bilocation_Key may be based on a hash of at least the selected key, the first anti-replay nonce, and at least on ID_R, KID_R, ID_I, KID_I, and the received third nonce.

In step 255, the first key node 106a sends the Int_Bilocation_Key and the first anti-replay nonce (e.g. fourth nonce in step 236 of process 230) to the Initiator Device 104a for use by the Initiator Device 104a and Receiver Device 1094b in establishing the Final Key therebetween based on processes 200, 210, 230, 240 of FIGS. 2a to 2d and/or as herein described.

Thereafter, the Initiator endpoint 104a and Receiver Endpoint 104b may initiate a communication session using the final Key to, without limitation, for example encrypt their communications channel and/or data communicated therebetween and/or for other purposes. Although in this example, the final key is used to secure a communication channel between the Initiator endpoint 104a and Receiver Endpoint 104b, this is by way of example only and the invention is not so limited, it is to be appreciated by the skilled person that the final key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Figure 2F:
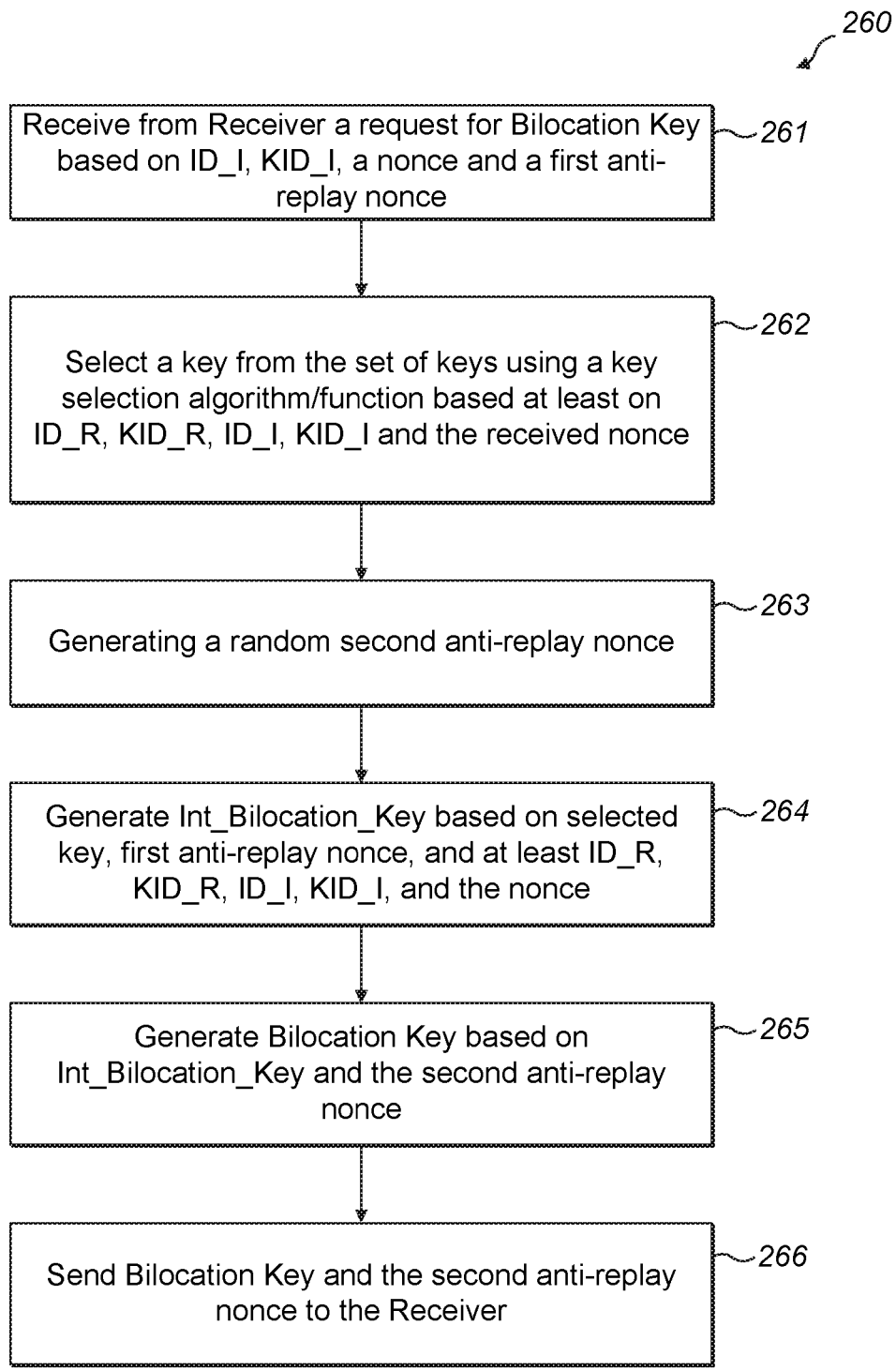
FIG. 2f a flow diagram illustrating another example key establishment process for a key node used by the receiver device of FIG. 2b according to some embodiments of the invention.

FIG. 2f is a flow diagram illustrating an example second key node key establishment process 260 performed by a second key node 106b used by the Receiver Device 104b in key establishment process(es) 210, 230, 240 and/or 250 of FIGS. 2b to 2e according to some embodiments of the invention. For simplicity, reference numerals from FIGS. 1a, 1b and/or 1c are reused for the same or similar components. In this example, the first key node 106a includes a set of distributed keys (or set of keys) and are the same as the set of distributed keys of the second key node 106b used by the Receiver endpoint 104b, which have been delivered to the first and second key nodes 106a and 106b based on a key distribution protocol/system. For example, when the secure network is a quantum-secure network 112 or 120, the set of distributed keys is a set of quantum distributed keys that may be distributed using a satellite quantum key distribution system and/or terrestrial quantum key distribution system and the like. The first key node 106a is located in a different geographic location to the second key node 106b. The second key node 106b is used by the Receiver Device 104b. The Initiator device/endpoint 104a initiates the key establishment procedure to establish a Final Key between the Initiator device/endpoint 104a and the Receiver device/endpoint 104b. For example, the Final Key may be used, without limitation, for example for securing a communication session between the Initiator device 104a and the Receiver device 104b and/or for any other suitable purpose. The second key node key establishment process 260 includes one or more of the following steps of:

In step 261, receiving from the Receiver Device 104b a request to generate an Bilocation Key, in which the request includes data representative of: a) the ID of the Initiator endpoint 104a (ID_I); b) the ID of Initiator endpoint's KNode 106a i.e. the first key node 106a (KID_I); c) a third nonce (e.g. N_IR) which is derived from a first random nonce (e.g. N_R) generated by the Receiver endpoint 104b and a second random nonce (e.g. N_I) generated by the Initiator end point 104a. The third nonce may be based on a combination or function based on the first nonce and the second nonce (e.g. an XOR-type operation using the first and second nonces; i.e. N_IR=N_R XOR N_I, when binary symbols are used or a hash-type operation using the first and second nonces, i.e. N_IR=#(N_R, N_I)); and an Initiator or first anti-replay nonce received by the Initiator endpoint 104a from the first key node 106a.

In step 262, selecting a key from the set of distributed keys using a key selection algorithm/function based at least on the ID_I, KID_I, the ID of the Receiver endpoint 104b (ID_R), the ID of the second key node 106b (KID_R), and the third nonce (e.g. N_IR). It is noted that the ID_R of the Receiver endpoint 104b may be received or derived previously by the second key node 106b during authentication of the Receiver endpoint 104b with the second key node 106b. The key selection algorithm/function used by the second key node 106b is the same as the key selection algorithm/function used by the first key node 106a in step 252 of process 250. The key selection algorithm/function may be based on a hash function. This means, that given the first and second key nodes have the same set of distributed keys, and given that the second key node is passed a set of inputs that enables it to provide the key selection algorithm/function with the same inputs, then the key selected by the second key node 106b is the same as the key selected by the first key node 106a in step 252 of process 250.

In step 263, the second key node 106b generates a random receiver anti-replay nonce for use in deriving/generating the Bilocation Key.

In step 264, the second key node 106b generates the Int_Bilocation_Key based on the selected key and at least on the ID_I, KID_I, the ID of the Receiver endpoint 104b (ID_R), the ID of the second key node 106b (KID_R), the third nonce (e.g. N_IR), and the received Initiator or first anti-replay nonce. For example, the Int_Bilocation_Key may be based on a hash of at least the selected key, the first anti-replay nonce, and at least on ID_R, KID_R, ID_I, KID_I, and the received third nonce.

In step 265, the second key node 106b generates the Bilocation Key based on combining the Int_Bilocation_Key with the Receiver or second anti-replay nonce. For example, this may be based on a hash of the Int_Bilocation_Key and the second anti-replay nonce.

In step 266, the second key node 106b sends the Bilocation Key and the Receiver or second anti-replay nonce (e.g. fifth nonce in step 245 of process 240) to the Receiver Device 104b for use by the Receiver Device 104b and Initiator Device 104a in establishing the Final Key based on processes 200, 210, 230, 240, 250 of FIGS. 2a to 2e and/or as herein described.

Thereafter, the Initiator endpoint 104a and Receiver Endpoint 104b may initiate a communication session using the Final Key to, without limitation, for example encrypt their communications channel and/or data communicated therebetween and/or for other purposes. Although in this example, the final key is used to secure a communication channel between the Initiator endpoint 104a and Receiver Endpoint 104b, this is by way of example only and the invention is not so limited, it is to be appreciated by the skilled person that the final key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Figure 2G:
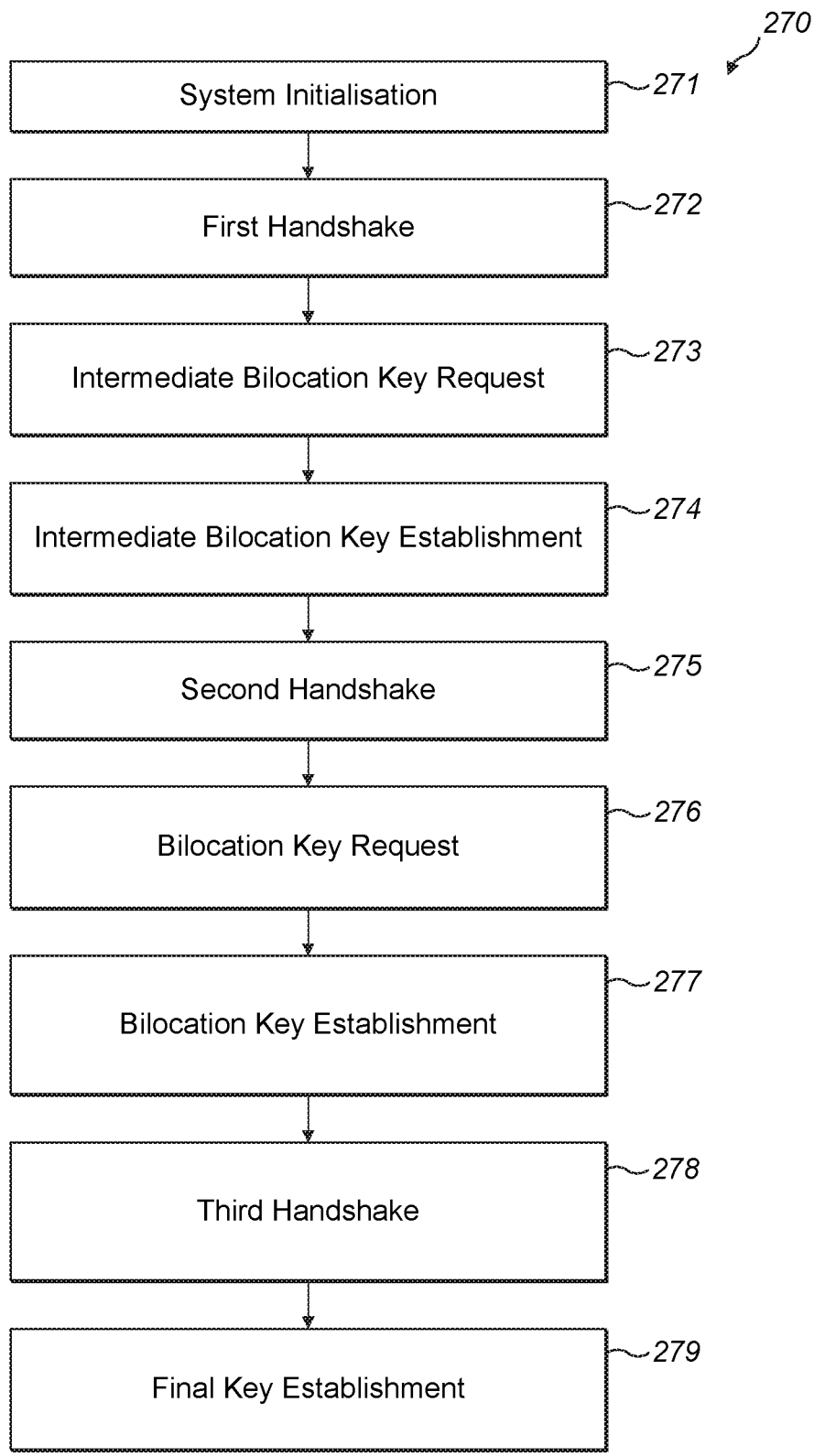
FIG. 2g a flow diagram illustrating another example key establishment process according to some embodiments of the invention.

FIG. 2g a flow diagram illustrating another example key establishment process 270 for use with the system 100, 110 and/or 120 of FIGS. 1 a, 1 b and/or 1c and/or for modifying the session establishment protocol/process(es) 200, 210, 230, 240, 250 and/or 260 of FIGS. 2a to 2f according to some embodiments of the invention. For simplicity, reference numerals from FIGS. 1 a, 1b and/or 1c are reused for the same or similar components. The key establishment process 270 includes one or more of the following steps of:

In step 271, a system initialisation may be performed to ensure at least a corresponding pair of key nodes (KNodes) 106a and 106b each has access to the same set of distributed keys, each has a unique KNode identifier (ID), and that each has its own identity key, which is shared between the pair of KNodes 106a-106b over a-secure channel 107c (or quantum-secure channel 117c). The set of distributed keys of each KNode may be a unique set of symmetric keys. As an option and/or as previously described, the distributed keys may be stored inside e HSM (e.g. HSM 108a-2 and 108b-2 attached to a corresponding OGR) that matches or is securely accessible by the corresponding at least one KNode 106a or 106b, and cryptography operations may be performed within the HSM on behalf of the corresponding KNode 106a or 16b and the like.

In step 272, in a first handshake between the Initiator endpoint 104a and the Receiver endpoint 104b, the Initiator endpoint 104a requests first handshake data representative of the unique ID of the Receiver endpoint 104b, ID_R, the unique ID of the KNode 106b, KID R, that the Receiver endpoint connects to, which is a different KNode 106b to the KNode 106a that the Initiator endpoint connects to, and a receiver random nonce, NR. The Receiver endpoint 104b randomly generates N R and sends all of the requested first handshake data information (e.g. NR, KID_R, ID_R) to the Initiator endpoint 104a.

In step 273, once the first handshake data is received by the Initiator endpoint 104a, the Initiator endpoint 104a sends an Intermediate Bilocation Key Request to the KNode 106a. This is performed by the Initiator endpoint 104a generating an initiator random nonce, N I, and combines this (e.g. with an XOR function or a hash-type operation) with the received N R (received in step 202) to form a compound initiator/receiver random nonce, N IR. The Initiator endpoint 104a opens a secure channel 105a (or quantum-secure channel 115a) with Knode 106a, in which KNode 106a has a different unique ID to KNode 106b, KID R. During opening of the secure channel 105a with Initiator endpoint 104a, the KNode 106a is proved the identifier of the Initiator endpoint 104a, ID I, (e.g. due to authentication etc.). The Initiator endpoint 104a sends an intermediate bilocation key (IBK) request data packet to the Knode 106a, where the IBK request data packet includes data representative of the compound nonce N IR, unique ID of the Receiver endpoint/device 104b, ID_R, unique ID of the Knode 106b KID_R, to be used by the Receiver endpoint 104b.

In step 274, the KNode 106a performs an Intermediate Bilocation Key establishment after it receives, over the secure channel 105a with Initiator endpoint 104a, the IBK request and, selects a key, KQ, from the set of distributed keys assigned to the KNode 106a using a key selection algorithm based on the received data in the IBK request data packet including ID I, KID_R, and N IR, which outputs the index or location of the selected KQ in the set of distributed keys. The key selection algorithm may be based on a hash of data representative of a combination of IBK request data packet, ID_I, KID R, and N IR. It is noted that the KNode 106b also has the same set of distributed keys that KNode 106a has. The KNode 106a also generates a random initiator anti-replay nonce N REPI and generates an Intermediate Bilocation Key, K IBK, by processing at least the data representative of N IR, ID I, ID_R, KID_R, KQ, N REPI using various operations such as, without limitation, for example hash functions, XOR functions, key selection and the like. The KNode 106a sends an IBK response packet including data representative of the generated IBK, K_IBK, and the anti-replay nonce N REPI to the Initiator endpoint 104a. The KNode 106a may delete or remove the generated K_IBK after sending the IBK response packet to the Initiator endpoint 104a.

In step 275, a second handshake process is performed between the Initiator endpoint 104a and the Receiver endpoint 104b over a quantum-secure or classically-secure connection/channel between Initiator and Receiver endpoints 104a and 104b. The Initiator endpoint sends to the Receiver endpoint 104b second handshake data representative of the unique ID of the Initiator, ID I, the unique ID of the KNode 106a, KID I, used by the Initiator endpoint 104a, the random initiator nonce N I generated in step 203, and the initiator anti-replay nonce N KEPI.

In step 276, on receiving the second handshake data from the Initiator endpoint 104a, the Receiver endpoint 104b sends a Bilocation Key request to the KNode 106b. This is performed by the Receiver endpoint 104b forming or creating (e.g. using an XOR function or a hash function) a compound nonce N IR using random receiver nonce N R (created in step 202) and the received random initiator nonce N I (received in step 205) (received in step 202). The Receiver endpoint 104b opens a secure channel 105b (or quantum-secure channel 115b) with Knode 106b, in which KNode 106b has a different unique ID to KNode 106a, KID I. During opening of the secure channel 105b with Receiver endpoint 104b, the KNode 106b infers the identifier of the Receiver endpoint 104b, ID R, (e.g. due to authentication etc.). The Receiver endpoint 104b sends an Bilocation Key (K BK) request data packet to the KNode 106b, where the K BK request data packet includes data representative of the compound nonce N IR, unique ID of the Initiator endpoint/device 104a, ID I, unique ID of the KNode 106a, KID I, being used by the Initiator endpoint 104a to collect its ISK, and the initiator anti-replay nonce N KEPI.

In step 277, the KNode 106b establishes the Bilocation Key (K_BK) or performs Bilocation Key establishment when it receives, over the secure channel 105b with Receiver endpoint 104b, the K BK request and, selects the key, KQ, from the set of distributed keys assigned to the KNode 106b, using the same key selection algorithm as KNode 106a used in step 204, based on K BK request data packet, ID I, KID I, and N IR, which outputs the same index or location that KNode 106a derived for selecting K Q from the set of distributed keys. The key selection algorithm may be based on a hash of data representative of a combination of K BK request data packet, ID I, KID R, and N IR. Given that the KNode 106b has the same set of distributed keys that the KNode 106a has, then using the same key selection algorithm with the same inputs enables KNode 106b to select the same KQ from the set of distributed keys. The KNode 106b also generates a random receiver anti-replay nonce N REPR and generates the Bilocation Key (K_BK) by processing at least the data representative of N IR, 10_1, ID R, KID_R, KQ, N KEPI using the same various operations such as, without limitation, for example hash functions, XOR functions, key selection and the like that the KNode 106a used when creating the IBK, K IBK, in step 204. The KNode 106a also creates the Bilocation Key, K BK, based on combining the K IBK with the N REPR. The KNode 106b sends a Bilocation Key (K BK) response packet including data representative of the generated K BK and the anti-replay receiver nonce N REPR to the Receiver endpoint 104b. The KNode 106b may delete or remove the generated K BK after sending the K BK response packet to the Receiver endpoint 104b.

In step 278, a third handshake process is performed between the Receiver endpoint 104b and the Initiator endpoint 104a over the secure connection (e.g. a quantum-secure channel or classically-secure channel) between Initiator and Receiver endpoints 104a and 104b. The Receiver endpoint 104b sends to the Initiator endpoint 104a third handshake data representative of the unique the receiver anti-replay nonce N REPR. On receiving the receiver anti-replay nonce N REPR, the Initiator endpoint 104a generates the Bilocation Key, K BK, which was received by the Receiver endpoint 104b in step 207, using the K IBK received by the Initiator endpoint 104a in step 204 and the received N REPR. Now, both the Initiator endpoint 104a and the Receiver endpoint 104b are in possession of the same Bilocation Key, K BK, where each of the parties of the Initiator endpoint 104a and Receiver endpoint 104b have received their copy of the K BK rooted in a different geographical location.

In step 279, the Initiator endpoint 104a and the Receiver endpoint 104b may both perform a Final Key establishment using the Bilocation Key, K BK. For example, the Initiator and Receiver endpoints 104a and 104b may generate the same Final Key, K S, based on combining the Bilocation Key K BK with the compound initiator receiver nonce N IR. In another example, the Initiator and Receiver endpoints 104a and 104b may perform a challenge/response protocol/process in which the Initiator and Receiver devices 104a-104b generate corresponding challenge nonces C I and C R, respectively, which are sent to each other. Each endpoint 104a or 104b calculate corresponding challenge responses R for R R, respectively, based on the corresponding received challenge nonces C and C R combined with the Bilocation Key K BK. The challenge responses R I or R R are sent from the Initiator or Receiver endpoint 104a or 104b, respectively, and when the received challenge responses R R or R I are confirmed by the Initiator and Receiver devices 104a-104b, respectively, then the key K S is created by a combination of corresponding unsent portions of the challenge response X I and X R (e.g. using an XOR function or a hash function).

Thereafter, the Initiator endpoint 104a and Receiver Endpoint 104b may, without limitation, for example initiate a communication session using the Final Key, K_S, to encrypt their communications channel and/or data communicated therebetween and/or for any other purpose. Although in this example, the final key is used to secure a communication channel between the Initiator endpoint 104a and Receiver Endpoint 104b, this is by way of example only and the invention is not so limited, it is to be appreciated by the skilled person that the final key that is the same at the Initiator endpoint 104a and the Receiver Endpoint 104b may be used for any suitable purpose, cryptographic operation, cryptographic application, system, securing data and/or communications and the like; combinations thereof; modifications thereto; as herein described; and/or as the application demands.

Although the first key node (e.g. KNodeA) and second key node (e.g. KNodeB) are described in FIGS. 2a-2g as being located in different geographical locations (e.g. KNodeA<>KNodeB), this is for simplicity and by way of example only and the invention is not so limited, it is to be appreciated by the skilled person that the key establishment systems, apparatus and process(es) according to the invention and/or as described herein with reference to FIGS. 2a to 2g and/or herein described are also applicable to or can be modified to take into account when first key node and second key nodes are the same key node, or have two different logical locations on the same key node, or are the same logical key node (e.g. KNode A==KNode B), where both Initiator endpoint/device: and Receiver endpoint/device communicate with the same server/computing device of the KNode or logical KNode rather than two different geographically located servers/computing devices of two different KNodes, and the resulting KNode may be configured to select a key from the set of keys (e.g. a QKD key from an array of QKD keys) "shared with itself" (i.e. keys that it alone owns or knows) for use in generating the Bilocation or Intermediate Bilocation keys for the corresponding endpoints/devices when establishing a key between the Initiator endpoint/device and Receiver endpoint/device.

FIGS. 3a-3d are signal flow sequence diagrams illustrating a further example key establishment process 300. The system 100 of figures 1a and/or 1b and/or session establishment protocol/process(es) 200, 210, 230, 240, 250, 260 and/or 270 of FIGS. 2a to 2g may be further modified based on the steps and/or process(es) of the key establishment process 300 as described with reference to FIGS. 3a to 3d, combinations thereof, modifications thereto, as herein described and/or as the application demands. For simplicity, reference numerals from FIGS. Ia and/or 1 b are reused for the same or similar components. The key establishment process 300 is described by the signal flow sequence with reference to FIGS. 3a to 3d.

Figure 3A:
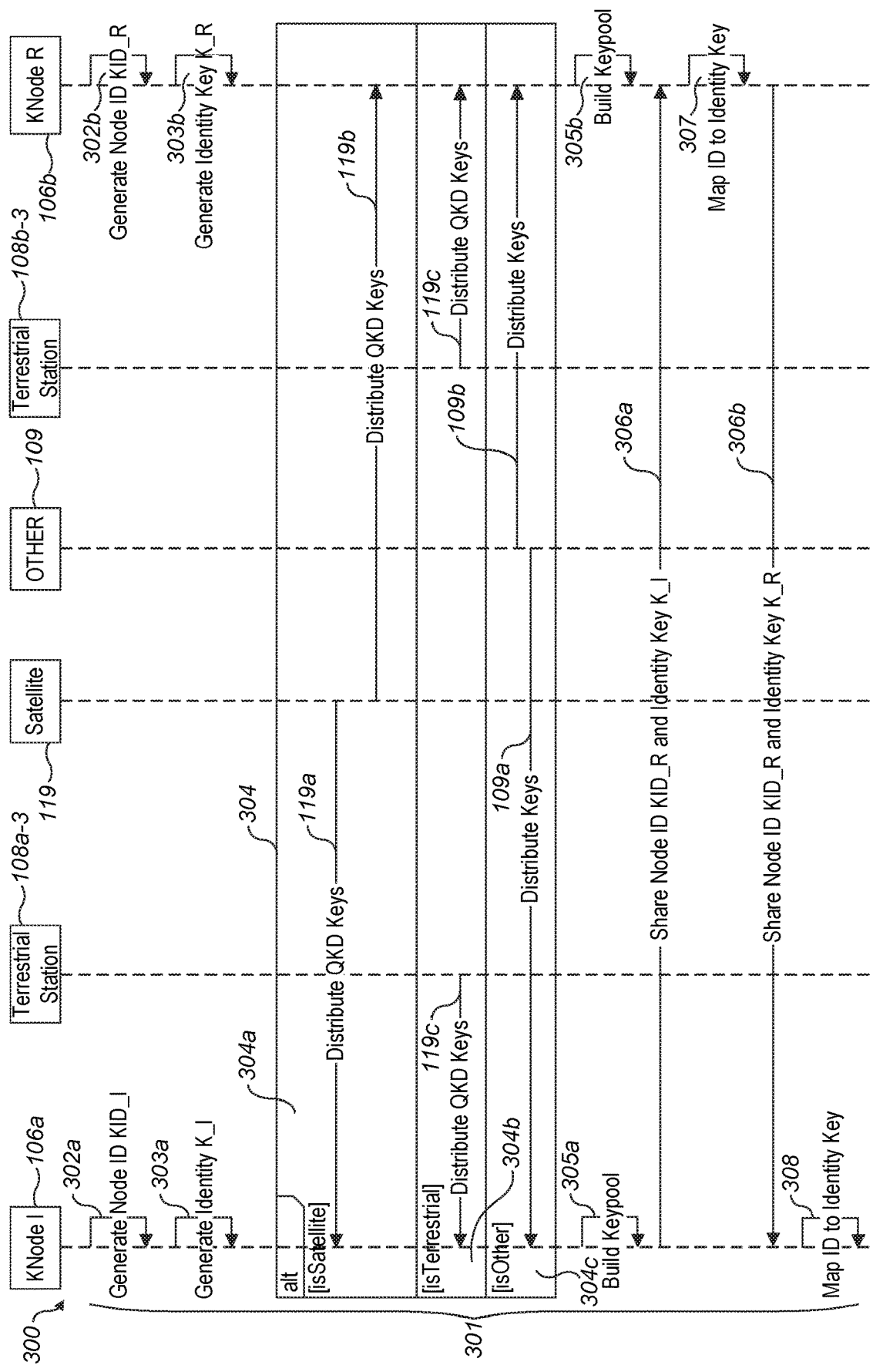
FIG. 3a is a signal flow sequence diagram illustrating an example a system initialisation process for use with a key establishment process according to some embodiments of the invention.

FIG. 3a describes a system initialisation process 301 that may be required for ensuring the cloud system 100, quantum-cloud systems 110 and/or 120 of FIGS. 1 a, 1 b and/or Ic and, in particular, the corresponding first and second key nodes 106a and 106b (e.g. KNode I and KNode R) are properly configured for use in the key establishment protocol/process 300. Assuming the cloud system 100 or quantum-cloud systems 110 or 120 are properly set-up, FIG. 3b includes signal flow sequence diagrams illustrating the initiation of the key establishment protocol/process 300 by a first handshake process 310, and follows on with an Intermediate Bilocation Key (IBK) request process 315, and IBK establishment process 320 of the key establishment protocol/process 300. FIG. 3c follows on from FIG. 3b with signal flow sequence diagrams illustrating a second handshake process 330, bilocation key (BK) request process 335, BK establishment process 340, and a final handshake process 350 of the key establishment protocol/process 300. Finally, FIG. 3d follows on from FIG. 3c with further signal flow diagrams illustrating at least two options 355 and 360 for establishing the Final Key between the Initiator and Receiver endpoints 104a and 104b. The Final Key may be used, without limitation, for example for use in a secure communication session between the Initiator and Receiver endpoints 104a and 104b and/or for any other suitable purpose.

Referring to FIG. 3a, the system initialisation process 301 of the key establishment process 300 includes the steps of sharing KNode ID/Identity between the key nodes 106a and 106b (e.g. KNode I and KNode R) that will be involved in the session establishment process 300. This is followed by distribution of a set of distributed keys using, without limitation, for example a satellite quantum key distribution system via satellite 119 and satellite channels 119a and 119b; a terrestrial fibre-based quantum key distribution system 119c using terrestrial stations 108a-2/108b-2 and corresponding fibre links 119c; or a set of keys or distributed keys using any other type of key distribution system 109 such as a classical key distribution system using classical or manual channels 109a or 109b and the like; combinations thereof; modifications thereto and/or as the application demands.

Although a satellite quantum key distribution system 119, terrestrial quantum key distribution system, or other key distribution system 109 are described, this is by way of example only and the invention is not so limited, it is to be appreciated by the skilled person that these quantum key distribution systems or classical key distribution systems may be replaced with, without limitation, for example any other suitable type of quantum key distribution system or non-quantum key distribution system, any other one-time-pad or cryptography key distribution system, "man with a briefcase" or other manual key distribution system for securely distributing a set of keys, as long as the distributed keys are securely distributed to the key nodes 106a and 106b and/or accessed by the key nodes 106a and 106b. For added security, may be in a quantum-safe or quantum-secure manner, but can be, without limitation, for example in a non-quantum or classical secure manner. Once the set of keys have been distributed to both key nodes 106a and 106b and/or are made accessible to both key nodes 106a and 106b, then a set of distributed keys that are the same for each key node 106a and 106b is arranged/pooled into a distributed key pool. The distributed key pool for each key node 106a and 106b may include other distributed and also the set of distributed keys, which are the same for both key nodes 106a and 106b.

Alternatively or additionally, or as an option, each of the KNodes 106a and 106b may have access to an HSM (e.g. HSM 108a-1 or 108b-1 of FIGS. Ia and Ib) in which the distributed keys may be stored/held and in which some of the following cryptography operations involving a distributed key of the set of distributed keys or set of keys may be performed on behalf of the corresponding KNode 106a or 106b with in the corresponding HSM 108a-1 or 108b-1 so that the corresponding KNode 106a or 106b never sees the plaintext keys of the set of keys. In this case, the KNodes 106a and 106b would effectively have matching arrays of distributed key IDs of the set of distributed keys in each HSM, and when selecting a particular key of the set of distributed keys, they use the distributed key IDs to reference/select a distributed key in the HSMs to allow distributed key selection. In this example, each of the key nodes 106a and 106b has access to the same set of distributed keys and may have them stored within the key nodes 106a and 106b and/or have access to them from an HSM accessible to each of the key nodes 106a and 106b in a secure manner. For added security, this may be in a quantum-safe or quantum-secure manner as described with reference to quantum networks 112 and/or 122 of FIGS. 1 b or Ic.

The system initialisation process 301 of the key establishment process 300 includes the following steps of: In step 302a, the first key node 106a (e.g. KNode I) generates its own unique ID (e.g. KID I).

In step 302b, the second key node 106b (e.g. KNode R) generates its own unique ID (e.g. KID R). In step 303a, the first key node 106a (e.g. KNode I) generates its own identity key (e.g. K I).

In step 303b, the second key node 106b (e.g. KNode R) generates its own identity key (e.g. K R).

In step 304, each unique pair of key nodes are provisioned with a unique pool or set of symmetric distributed keys by a key distribution system. Thus, each key node in the pair of key nodes has access to the same set or pool of distributed keys. These are symmetric cryptographic keys. For example, in step 304a, when the system 100 is a satellite QKD system 110 as described in FIG. 1 b then, for the first and second key nodes 106a and 106b, which may form a unique pair of KNodes in a quantum cloud system 110 with quantum-secure network 112, the satellite QKD System 110 is configured to provision each pair of KNodes 106a and 106b with a unique pool of symmetric quantum distributed keys over a satellite QKD Secure Channels 119a and 119b which may be used to form a so-called KEYPOOL, which in this case includes the set of quantum distributed keys unique to that pair of KNodes 106a and 106b. The number of quantum distributed keys in the KEYPOOL including the set of quantum distributed keys may be more than 1. In another example, in step 304b, when the system 100 may a terrestrial QKD system 120 with quantum-secure network 122 that may form a quantum cloud system then, for the first and second key nodes 106a and 106b, which may form a unique pair of KNodes in the terrestrial QKD system 120, the terrestrial QKD System 120 is configured to provision each pair of KNodes 106a and 106b with a unique pool of symmetric keys over a terrestrial QKD Secure Channels 119c to form a so-called KEYPOOL including a set of quantum distributed keys unique to that pair of KNodes 106a and 106b. The number of quantum distributed keys in the KEYPOOL including the set of quantum distributed keys may be more than 1. In another example, in step 304c, the system 100 may be any other system secured by a set of keys that are distributed over another key distribution system 109 as described in FIG. Ia then, for the first and second key nodes 106a and 106b, which may form a unique pair of KNodes in the system 100 with secure network 102, the system 100 may include a key distribution system 109 other than SQKD or Terrestrial QKD that is configured to provision each pair of KNodes 106a and 106b with a unique pool of symmetric distributed keys over a secure channels 109a and 109b which may be used to form a so-called KEYPOOL at each node 106a and 106b. The KEYPOOL in this case includes the set of distributed keys that are unique to that pair of KNodes 106a and 106b. The number of distributed keys in the KEYPOOL including the set of distributed keys may be more than 1. In any event, in step 304 each of the first and second key nodes 106a and 106b are configured to receive the same set of distributed keys (e.g. classical distributed keys or quantum distributed keys etc.).

In steps 305a and 305b the first and second key nodes build their respective sets of distributed keys, e.g. key pools KNodefilKEYPOOL [p] =KNoderaKEYPOOL [p] for all valid p, where i and r denote the first and second key nodes respectively, such that the set of distributed keys received or accessible by the first key node 106a are the same as the set of distributed keys received or accessible by the second key node 106b. As an option, to prevent the KNodes 106a and 106b having access to the raw distributed keys, the KEY-POOLs could be populated with a set of keys derived from the set of distributed (e.g. QKD keys), e.g. by hashing the distributed key (e.g. QKD key), perhaps using a salt. The use of a salted hash (or other random value) would require that the salt (or random value) is securely shared between the pair of KNodes to ensure that the same set of keys in the KEYPOOL matches in both locations, unless the salt is set to the index of the slot in the array into which the key is placed which would be known in both KNodes 106a and 106b.

In step 306a, the first key node 106a (e.g. KNode I) shares its ID (e.g. KID I) and Identity Key (e.g. K I) securely over one or more secure channels (e.g. quantum-secure channels) with every other key node in the system 100 (or quantum cloud system 110 or 120) such as, without limitation, for example the second key node 106b (e.g. KNode R).

In step 306b, the second key node 106b (e.g. KNode R) shares its ID (e.g. KID_R) and Identity Key (e.g. K R) securely over one or more secure channels (or quantum-secure channels) with every other key node in the quantum cloud system 100 such as, without limitation, for example the first key node 106a (e.g. KNode I).

In step 307, the second key node 106b (e.g. KNode R) maintains a mapping or lookup table of each received KNode ID against the KNode Identity Key for all other key nodes. In this example, the second key node 106b (e.g. KNode R) receives the KID I and K I of the first key node 106a and updates its mapping or lookup table in relation to the mapping between KID I and K I of the first key node 106a. In fact, each KNode of the system 100, 110 or 120 maintains a lookup of KNode ID against KNode Identity Key for all other KNodes.

In step 308, the first key node 106a (e.g. KNode I) also maintains a mapping or lookup table of each received KNode ID against the KNode Identity Key for all other key nodes. In this example, the first key node 106a (e.g. KNode I) receives the KID_Rand K R of the second key node 106b (e.g. KNode R) and updates its mapping or lookup table in relation to the mapping between KID_R and K R of the second key node 106b.

The system initialisation process 301 may be performed at any time prior to as long as at least two key nodes that form a pair of key nodes have been properly initialised and mapped with the corresponding key node IDs, key node Keys and also sets of distributed keys (e.g. set of classically distributed keys in system 100 or set of quantum distributed keys in system 110 or 120). It is thus assumed that the key nodes are appropriately provisioned and operate accordingly when performing the respective steps of a key establishment process in relation to a first device/endpoint 104a (e.g. Initiator endpoint) and a second device/endpoint 104b (e.g. Receiver endpoint).

Figure 3B:
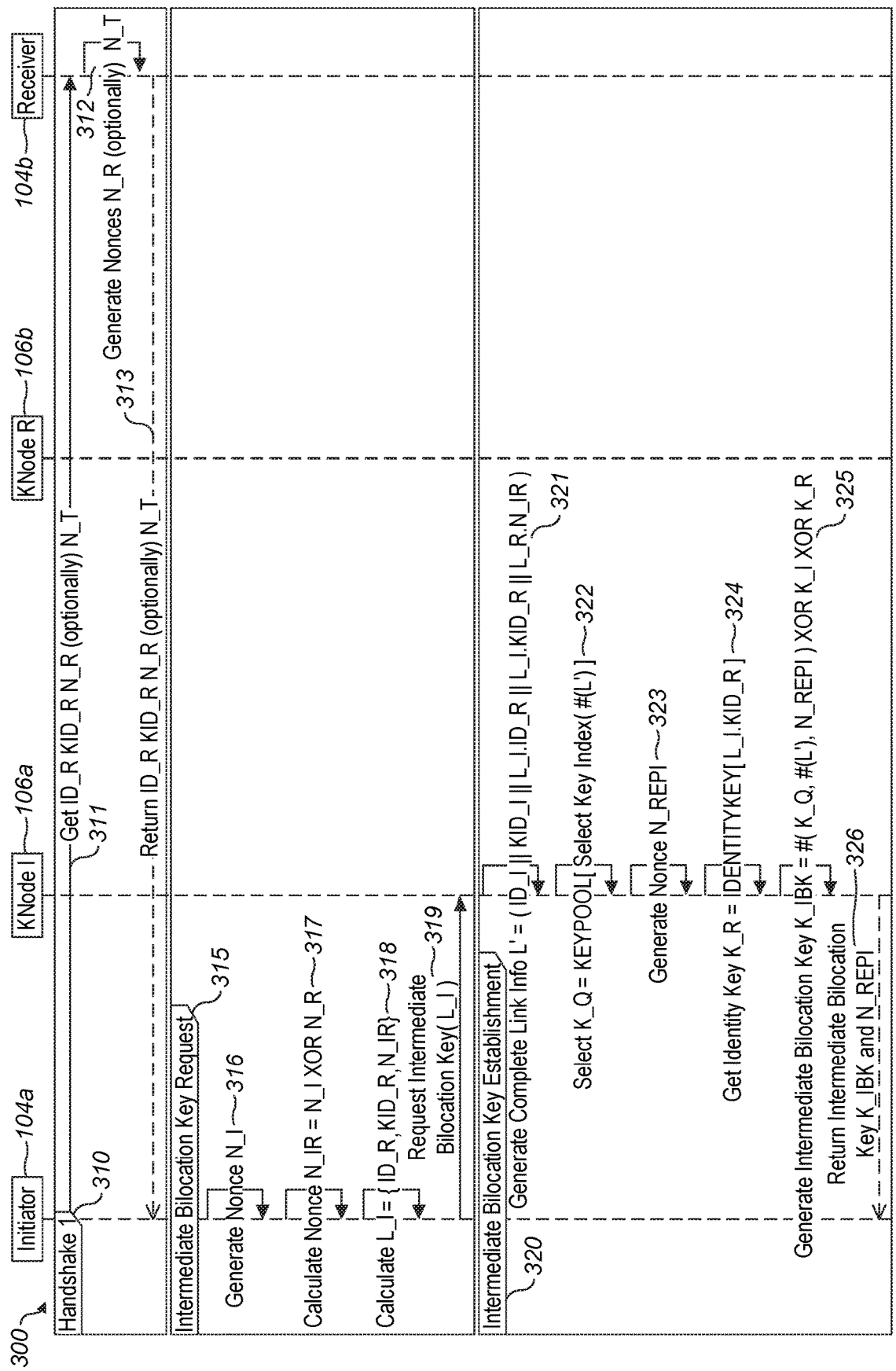
FIG. 3b is a signal flow sequence diagram illustrating an example first handshake process, an example Intermediate Bilocation Key request process, and an example Intermediate Bilocation Key establishment process for a key establishment process according to some embodiments of the invention.
Figure 3C:
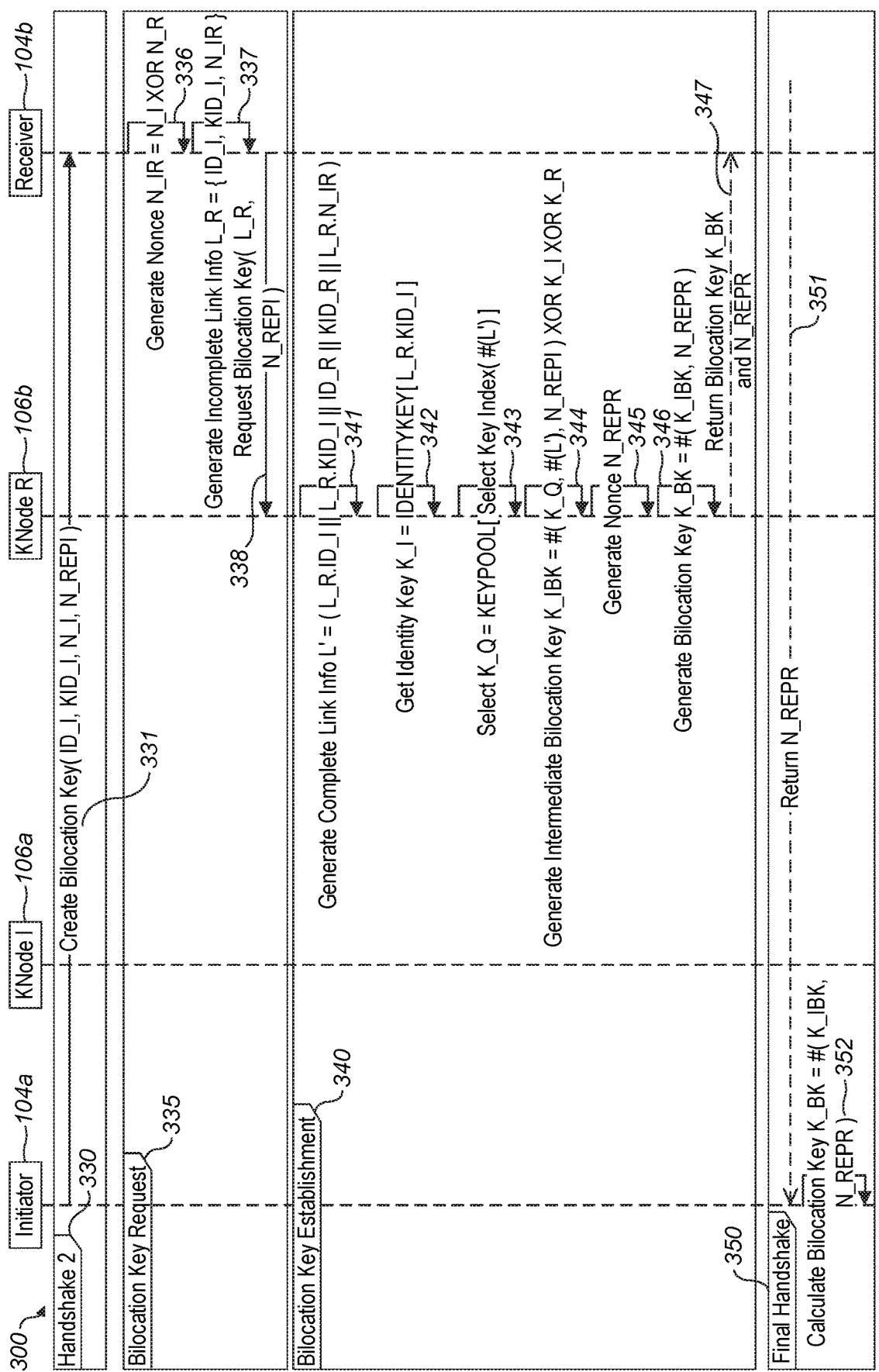
FIG. 3c is a signal flow sequence diagram illustrating an example second handshake process, an example bilocation key request process, an example bilocation key establishment process, and a final handshake process for the key establishment process according to some embodiments of the invention.

Referring to FIG. 3b, it is now assumed that a first device 104a (e.g. Initiator endpoint) and a second device 104b (e.g. Receiver endpoint) wish to perform key establishment process 300 to establish a Final Key therebetween. For example, the Final Key that is established therebetween may be for use in securing a communication session therebetween and/or any other suitable purpose. In this example, given the Final Key is established using a selected key from the set of distributed keys provisioned in a secure manner with the first and second key nodes 1046a and 106b, the Final Key is also a secure key. For example, in systems 110 and 120 of FIGS. 1b and/or 1c the Final Key is established using a selected key from the set of quantum distributed keys provisioned in a quantum-secure manner with the first and second key nodes 1046a and 106b Establishing the Final Key may be performed using key nodes 106a and 106b that have already been initialised with a KEYPOOL including a set of distributed keys as described with reference to initialisation process 301 of FIG. 3a and step 304 in relation to the type of system 100, 110 and/or 120 and secure network 100, quantum secure networks 112 and 122, respectively, that may be implemented.

Referring to FIG. 3b, initially, the Initiator endpoint 104a performs a first handshake process 310 (e.g. Handshake 1) with Receiver endpoint 104b. The first handshake process 310 of the key establishment process 300 includes the following steps of:

In step 311, the Initiator endpoint 104a opens a connection to Receiver endpoint 104b. This may be a classical secure communication channel based on, without limitation, for example a classically secure channel using transport layer security (TLS) etc. and the like and/or as the application demands. The Initiator endpoint 104a requests (e.g. Get ID R, KID R, N R, and optionally N_T) at least data representative of the following information from Receiver endpoint 104b: a) The unique ID of the Receiver (e.g. ID_R); b) The ID of a KNode 106b (e.g. KID_R) where Receiver endpoint 104b will collect its copy of the Bilocation Key; and c) a first random nonce from the Receiver endpoint (e.g. N R); and, as an option, d) a "trustless" random nonce never shared with the server infrastructure to ensure a "trustless" process (e.g. N 7).

In step 312, the Receiver endpoint 104b generates the first random nonce from the Receiver endpoint (e.g. N R), and, if required, as an option the Receiver endpoint 104b also generates the "trustless" random nonce (e.g. N_T). The Receiver endpoint 104b also determines the ID of a KNode 106b (e.g. KID R) where Receiver endpoint 104b will collect its copy of the Bilocation Key. It is noted that the KNode 106a used by the Initiator endpoint 104a and the KNode 106b used by the Receiver endpoint 104b are different and also in different geographic locations.

In step 313, the Receiver endpoint 104b returns (e.g. Return ID R, KID_R, N R and optionally NT) the data representative of the following information to the Initiator endpoint: a) The unique ID of the Receiver (e.g. ID_R); b) The ID of the KNode 104b that the Receiver endpoint 104b selects as the location to collect its copy of the Bilocation Key (preferably one geographically close to the Receiver endpoint 104b) (e.g. KID_R) and c) the first random nonce, generated by the Receiver, (e.g. N R). As an option, or if required, the Receiver endpoint 104b also returns the optional "trustless" random nonce (e.g. N T) to the Initiator endpoint 104a. Thus, both receiver endpoint 104b and initiator endpoint 104a have the "trustless" nonce NT. The "trustless" nonce N T may be used by the Initiator and Receiver endpoints 104a and 104b in first key creation process 355 of FIG. 3d during creation of the Final Key and ensures that the cloud service or applications of the secure network/cloud 102 (or quantum cloud service of the quantum-secure network/cloud 112 or 122) can never know the Final Key shared between the Initiator and Receiver endpoints 104a and 104b.

This ends the first handshake process 310. After the first handshake process 310, on receiving data representative of at least the ID R, KID_R, and N R from the Receiver endpoint 104b, the Initiator endpoint 104a performs a intermediate bilocation key request process 315 as part of the session establishment process 300. In FIG. 3b, the intermediate bilocation key request process 315, which is performed by the Initiator endpoint 104a, is based on the following steps of:

In step 316, the Initiator endpoint 104a generates a second random nonce (N I).

In step 317, the Initiator endpoint 104a generates a third compound nonce (e.g. N IR) based on combining the first and second random nonces (e.g. N/and N R). For example, an XOR-type operation, a hash operation and/or a suitable function that is capable of being replicated at the Initiator endpoint 104a and Receiver endpoint 104b may be used. In this example, an XOR-type operation is performed, by way of example only, but the invention is not so limited. In this example, the third nonce, N IR, may be generated by XORing the second random nonce, N I, with the first random nonce received from the Receiver, N_R, to create the third nonce (a compound nonce), N_IR, e.g. N_IR=N_IXOR NR.

In step 318, the Initiator endpoint 104a creates an incomplete link-info data packet, L_I, based on the following: a) the Initiator endpoint 104a selecting a first key node or KNode 106a that is not the second key node or KNode 106b that is being used by the Receiver endpoint 104b, where the first key node 106a is preferably a key node that is geographically close to the Initiator endpoint 104a, but is in a different geographical location to the second key node 106b. The selected key node, i.e. first key node 106a, has the KNode ID KID_I; b) The Initiator creates the incomplete link-info data packet, L_I, based on data representative of: i) The unique ID of the Receiver endpoint 104b, ID R; ii) The unique ID, KID_R, of the KNode whence the Receiver endpoint 104b wishes to collect the Bilocation Key; iii) The hash of compound nonce, N IR'=#(N_IR), thus keeping N_IR itself confidential to the endpoints and preventing the KNode from determining the final bilocation key; where, without limitation, for example the link-info packet takes the form L_I = (ID_R, KID_R, In step 319, the Initiator endpoint 104a opens a connection and authenticates to the first key node 106a (e.g. KNode I) that it selected, where the connection is over a secure channel. For example, the secure channel may be a classically secure channel 105a as described in system 100 of FIG. 1 a, or a quantum-secure channel 115a as described in systems 110 or 120 of FIG. 1 b or 1 c. In any event, this means that the first key node 106a may infer (e.g. from the authentication process etc.) the identity of the Initiator endpoint 104a, which is denoted ID_1. For example, the connection between the key node 106a and the Initiator endpoint 104 may be a communication channel encrypted with a symmetric key shared with the first key node 106a, which the Initiator endpoint 104a may have stored thereon. The Initiator endpoint 104a is configured to have collected the symmetric key in a secure manner (e.g. a quantum distributed key in a quantum-secure/safe fashion) from the system 100 or quantum system 110 or 120, where the symmetric key is to be used for secure communications with one or more servers, nodes, key nodes and the like of the system 100 or systems 110 or 120. In any event, it is assumed that the Initiator endpoint 104a capable or configured to establish a secure communication channel 105a (or quantum-secure communication channel 115a) with the first key node 106a in the network 102 (or quantum network(s) 112 or 122) of the cloud system 100 (or quantum cloud systems 110 or 120). Note that the authentication of this channel implies that the identity of the Initiator endpoint, ID I, has been inferred by and/or provided to the first key node 106a (e.g. KNode I).

The Initiator requests that the selected KNode I, that is the first key node 106a, creates an Intermediate Bilocation Key, K IBK, an Initiator anti-replay nonce, N REpi, and a check value, C, in which the request passes data representative of the incomplete link-info, L_I, to the first key node 106a. The IBK request may take the form of: (KBK,N_REPI,C) =create_intermediate_bilocation_key (L_I). In this way, it may be possible to prevent replay attacks by an eavesdropper if C is made equal to N_IR' by the KNode I and the Initiator confirms that C is equal to N_IR'. Additionally or alternatively, as an option, the Initiator endpoint 104a could generate an asymmetric transport key (e.g. RSA or PQA) and pass the public part of this key, PK, in the IBK request with which the server should encrypt the IBK response to avoid interception as it flows back through the quantum cloud infrastructure. The IBK request may take the form of: ({K_IBK, N_REPI,C}PK)=create_intermediate_bilocation_key (L_I, PK), where {K_IBK} PK denotes the K_IBK encrypted with the public part of the key, PK. Additionally, as an option, the Initiator endpoint 104a may be further configured to add additional metadata to the IBK request describing which functions that the first key node 106a is to use in the calculation of the intermediate bilocation key, K IBK, etc. This metadata would need to be passed to the Receiver endpoint 104b so that it can request the same functions at its end are used by the second key node 106b.

After the Intermediate Bilocation Key request process 315, the Initiator endpoint 104a awaits reception of the Intermediate Bilocation Key, K IBK, which is generated by the first key node 106a or an HSM connected to the first key node 106a using the Intermediate Bilocation Key establishment process 320. Although in this example the steps of the IBK establishment process 320 are performed by the first key node 106a, this is by way of example only and the invention is not so limited, it is to be appreciated by the skilled person that the cryptographic operations used in IBK process 320 may be performed inside an HSM that the first key node 106a may have access to, may be connected to or related to and/or by any other secure computing component associated with the first key node 106a and/or the first key node 106a itself, combinations thereto, modifications thereof, as herein described and/or as the application demands. The Intermediate Bilocation Key establishment process 320 may be based on the following steps of:

In step 321, the first key node 106a (e.g. KNode (Initiator)) supplements the received link-info, L_I, to create the complete link-info L' using data representative of: a) The unique ID of the Initiator endpoint 104a (implied as the Initiator endpoint 104a has authenticated-however, this may be provided by the Initiator endpoint 104a explicitly too in a trusted fashion), ID/and b) The unique ID of the first key node (e.g. KNode I) itself, KID I. This information is combined to form the following complete link-info L' such as, without limitation, for example L'=(ID_I∥ KID_I ∥ L_LID_R ∥ L_LKID_R ∥ L_I.N_IR') where ∥ denotes concatenation and X.Y denotes a dereference of the value Y from the Link Info structure X.

In step 322, the first key node 106a (e.g. KNode (Initiator) or Knode I) selects a key from the set of distributed keys in the KEYPOOL of the first key node 106a that it has been provided with (the set of distributed keys are the same as the set of distributed keys in the KEYPOOL of the second key node 106b that have been provided to the second key node 106b) based on a key selection process using the complete link-info, L'. For example, the key selection process may be based on, without limitation, for example: calculating the hash of L, denoted # (L'), and using the #(L') to provide the location or index of the selected key in the set of distributed keys of the KEYPOOL that is associated with both the first key node 106a and the second key node 106b. That is, the first key node 106a (KNode (Initiator) or KNode I) uses #(L) to identify which key should be selected from the set of distributed keys in the KEYPOOL that is shared with the second key node 106b (e.g. KNode R) with ID KID R. The first key node 106a (e.g. KNode (Initiator) or KNode I) selects a key, KQ, from the set of distributed keys in the KEYPOOL (e.g. pool of shared QKD keys) using an appropriate key selection algorithm applied to the complete link-info L'. For example, the key selection algorithm may be based on, without limitation, for example, one or more of the bottom N bits of #(L'), selecting the least significant N bits of #(L'); selecting the most significant N bits of #(L'); selecting a specific portion of N bits of #(L'); selecting the bottom N bits of #(L'); or any other selection function suitable for generating a unique key index for selecting a key from a set of distributed keys; and/or any other function named SelectKeyIndex that is capable or suitable for selecting a key index. However, it is assumed that the second key node 106b also uses the same key selection algorithm as is used by the first key node 106a, which ensures the same key, K Q, is selected by the first and second key nodes accordingly. In any event, the first key node 106a selects a key, KQ, from the set of distributed keys in the KEYPOOL based on, without limitation, for example K_Q=KEYPOOLIKID_RH SelectKeyindex( #(L') )] where KEYPOOL[K/D R] is the set of distributed keys of the KEYPOOL that are shared with KNode 106b with ID KID$_R$.

In step 323, the first key node 106a (e.g. KNode (Initiator) or KNode I) creates a random anti-replay nonce, N REPI.

In step 324, the first key node 106a (e.g. KNode (Initiator) or KNode I) looks up the identity key associated with ID R, K R from the KNode mapping or lookup table maintained by the first key node 106a (e.g. Get Identity Key KR=IDENTITYKEY (L_/K/D_R)). The first key node 106a (e.g. KNode (Initiator) or KNode I) of course knows its own identity key, K I.

in step 325, the first key node 106a (e.g. KNode (Initiator) or KNode I) creates the Intermediate Bilocation Key, K IBK, by hashing the following data and XORing the result with K I and K R: a) The selected key, K Q; b) The hash of the complete link-info, #(L'); and c) The anti-replay nonce, N REPI. The Intermediate Bilocation Key, K IS, is created based on, without limitation, for example K_IS=#(K_Q, #(0, N_REPI) XOR K_I XOR K_R.

In step 326, the first key node 106a (e.g. KNode (Initiator) or KNode I) returns or sends the Intermediate Bilocation Key, K IBK, the check value C (equal to the N IR' it received), and the Initiator anti-replay nonce, N REPI, to the Initiator endpoint 104a (e.g. Return_Intermediate_Bilocation_Key (K IBK, N REPO). The Initiator endpoint 104a may check that the returned check value C matches the hashed nonce N IR' to prevent replay attacks against the client. If the values do not match, an exception may be thrown. Once this has been sent, the first key node 106a (e.g. KNode (Initiator) or KNode I) zeros or deletes the data representative of K IBK.

After the Intermediate Bilocation Key establishment process 320, the Initiator endpoint 104a receives the Intermediate Bilocation Key, K IBK, that was created/generated by the first key node 106a and/or sent from the first key node 106a and created/generated using an HSM and the like connected/accessible to the first key node 106a using the Intermediate Bilocation Key establishment process 320 of FIG. 3b. The key establishment process 300 now proceeds to FIG. 3c, where a second handshake process 330, bilocation key request process 335, bilocation key establishment process 340, and a final handshake process 350 of the session establishment protocol/process 300 for establishing a Final Key for use by the Initiator endpoint 104a and Receiver endpoint 104b. For example, the Final Key may be used in a secure communication session therebetween and/or for any other suitable purpose.

Referring to FIG. 3c, the second handshake process 330 between the Initiator device 104a and the Receiver device 104b of the session establishment process 300 includes the following steps of:

In step 331, the Initiator endpoint 104a sends the following data to the Receiver endpoint 104b through the open connection therebetween, or if closed opens another connection with the Receiver endpoint 104b: a) the unique ID of the Initiator endpoint, ID I; b) the unique ID of the KNode 106a (KNode I), KID I, that the Initiator endpoint 104a used in the Intermediate Bilocation Key request and establishment process(es) 315 and 320; c) the Initiator endpoint 104a nonce, NI; and d) the Initiator anti-replay nonce, N REPI. This may be sent from the Initiator endpoint 104a to the Receiver endpoint 104b in a call, API call, or packet based on, without limitation, for example Create_Bilocation_Key (LD I, KID_I, N I, N REPI). Additionally, or as an option, the Initiator device 104a may send additional metadata describing which functions to use in the calculation of the bilocation key etc., which the Receiver endpoint 104b may relay to the second key node 106b. In this example, the Receiver endpoint 104b receives data representative of ID I, KID_I, N/and N REPI and an indication or trigger to create a bilocation key or request creation of the bilocation key, K BK.

After the second handshake process 330, the Receiver endpoint 104b and second key node 106b (e.g. KNode R) proceeds with the bilocation key request process 335 and the bilocation key establishment process 340 of the key establishment process 300. The bilocation key request process 335, performed by the Receiver endpoint 104b, is based on the following steps of:

In step 336, the Receiver endpoint 104b creates the compound or third nonce, N_IR, using nonce N R created earlier in step 312 of the first handshake process 310 and the nonce N I, which was received from the Initiator endpoint in step 331. The compound or third nonce, N_IR, may be based on, without limitation, combining the first nonce N_R with the second nonce N_I using a function such as, without limitation, for example a XOR-type function, a hash function, or other function with similar properties as the XOR function and the like. For example, NJR=XOR NR.

In step 337, the Receiver endpoint 104b also creates an incomplete link-info data packet, comprising data representative of: a) The unique ID of the Initiator endpoint 104a, ID I; b) The unique ID, KID_I, of the first key node 106a (e.g. KNode I) where the Initiator endpoint 104a collected its Intermediate Bilocation Key; c) The hash of compound nonce, N IR'=#(N IR), thus keeping N IR itself confidential to the endpoints and preventing the KNode from determining the final bilocation key and d) the compound nonce, N IR; where, without limitation, for example the incomplete link-info packet takes the form L_R=ID_L KIDJ, In step 338, the Receiver endpoint 104b opens a connection over a secure channel 105b (or quantum-secure channel 115b) and authenticates to the second key node 106b (e.g. KNode R) that it selected. Note that the authentication of this channel provides the second key node 106b (e.g. KNode R) with the ID of the Receiver endpoint, ID R. However, this may be alternatively be securely obtained explicitly from the Receiver endpoint after the secure connection is established etc. Over the secure channel 105b (or quantum-secure channel 115b) with the second key node 106b, the Receiver endpoint 104b requests the Bilocation Key, K BK, a Receiver anti-replay nonce, N REPR, a Bilocation Key ID, ID_BK, and a check value, C, (equal to the N_IR' it received) where the Bilocation Key request includes and/or passes the data representative of the following: a) The incomplete link-info, L_R; and b) The Initiator anti-replay nonce, N REPI. For example, the Bilocation Key (BK) request may be based on, without limitation, for example data representative of (K_BK, N_REPR,ID_BK,C)=get_bilocation_key (L_R, N_REPI). The Receiver endpoint 104b may check that the returned check value C matches the hashed nonce N_IR' to prevent replay attacks against the client. If the values do not match, an exception may be thrown. Additionally or alternatively, as an option, the Receiver endpoint 104b could also generate an asymmetric transport key (e.g. RSA or PQA) and pass the public part of this key, PK R, in the BK request with which the server should encrypt the BK response to avoid interception as it flows back through the quantum cloud infrastructure. The BK request may take the form of: {(K_BK, N_REPR, ID_BK,C)}PK_R=create_bilocation_key(L_R, N_REPI, PK_R), where {K_BK} PK_R denotes the K_BK encrypted with the public part of the key, PK_R. Additionally, as an option, the Receiver endpoint 104b may be further configured to add additional metadata to the BK request describing which functions that the second key node 106b is to use in the calculation of the bilocation key, K BK, etc. This metadata would need to be passed previously from the Initiator endpoint 104a to the Receiver endpoint 104b so that the Receiver endpoint 104b can request the same functions at its end are used by the second key node 106b.

After the bilocation key request process 330, the Receiver endpoint 104b awaits reception of the bilocation key, K BK, and the Receiver anti-replay nonce, N REPR, which is generated by the second key node 104b using the bilocation key (BK) establishment process 340. Although in this example the steps of the BK establishment process 340 are performed by the second key node 106b, this is by way of example only and the invention is not so limited, it is to be appreciated by the skilled person that the cryptographic operations used in IBK process 340 may be performed inside an HSM that the second key node 106b may have access to, may be connected to or related to and/or by any other secure computing component associated with the second key node 106b and/or the second key node 106b itself, combinations thereto, modifications thereof, as herein described and/or as the application demands. Additionally, as an option, if the Receiver endpoint 104b has included additional metadata to the BK request describing which functions that the second key node 106b is to use in the calculation of the bilocation key, K BK, etc., then the bilocation key establishment process 340 may be further modified to ensure the second key node 106b and/or HSM uses the same functions are used by the second key node 106b as were used at the first key node 106a.

The bilocation key establishment process 340, which in this example may be performed by the second key node 106b, but where the cryptographic operations of the bilocation key establishment process 340 may be performed by an HSM connected/accessible by the second key node 106b, may be based on the following steps of:

In step 341, the second key node 106b (e.g. KNode (Receiver) or KNode R) supplements L_R to create the complete link-info L' using data representative of: a) the unique ID of the Receiver endpoint 104b (implied as the Receiver endpoint 104b has authenticated with the second key node 106b), ID R; and b) the unique ID of the second key node 106b (KNode R) itself, KID_R; this information is combined to form the following complete link-info L' such as, without limitation, for example L'=(L_R.ID_III L_R.KID_I II ID_R I I KID_R I I L_R.N_IR') where II denotes concatenation and X.Y denotes the value Y from the LinkInfo X.

In step 342, the second key node 106b (e.g. KNode (Receiver) or KNode R) looks up the identity key, K I, associated with the identity of the first key node 106a, KID I, from the KNode mapping or lookup table maintained by the second key node 106b (e.g. Get Identity Key K I=IDENTITYKEY(L_R.K/D_I/). The second key node 106b (e.g. KNode (Receiver) or KNode R) of course knows its own identity key, K R.

In step 343, the second key node 106b (e.g. KNode (Receiver) or KNode R) selects a key from the set of distributed keys in the KEYPOOL of the second key node 106b that it has been provided with (these are the same as the set of distributed keys in the KEYPOOL of the first key node 106a that have been provided to the first key node 106a) based on a key selection process using the complete link-info, L'. For example, the key selection process may be based on, without limitation, for example: calculating the hash of L, denoted #(L9, and using the #(L') is used to provide the location or index into the set of distribution keys in the KEYPOOL that is associated with both the first key node 106a and the second key node 106b. That is, the second key node 106b (KNode (Receiver) or KNode R) uses #(L') to identify which key should be selected from the set of distributed keys in the KEYPOOL of the second key node 106b that is shared with the first key node 106a (e.g. KNode I) with ID KID I. The second key node 106b (e.g. KNode (Receiver) or KNode R) selects a key, KQ, from the set of distributed keys in the KEYPOOL (or pool of shared QKD keys) using an appropriate key selection algorithm applied to the complete link-info L'. For example, the key selection algorithm may be based on, without limitation, for example the bottom N bits of #(L') or other function named SelectKeyIndex that is capable or suitable for selecting a key index. However, it is assumed that the first key node 106a also uses the same key selection algorithm as is used by the second key node 106b, which ensures the same key, KQ, is selected by the first and second key nodes accordingly. In any event, the second key node 106b selects the key, KQ, based on, without limitation, for example K_Q=KEYPOOLIKID_Iff SelectKeyIndex(#(L'))], where KEYPOOL[KIDI] is the set of distributed keys in the KEYPOOL that are shared with KNode 106a with ID KID'.

In step 344, the second key node 106b (KNode (Receiver) or KNode R) creates the Intermediate Bilocation Key by hashing the following data and XORing the result with Ki and its own K R: a) The selected key, K0; b) The hash of the complete link-info, # (L'); and c) The Initiator anti-replay nonce, N REPI, received from the Receiver endpoint 104b.

The Intermediate Bilocation Key, K IS, is created based on, without limitation, for example K_IS=#(K_Q, #(0, N_REPI) XOR K_I XOR KR.

In step 345, the second key node 106b (KNode (Receiver) or KNode R) creates an anti-replay nonce, NREPR.

In step 346, the second key node 106b (KNode(Receiver) or KNode R) creates the Bilocation Key, K BK, by hashing the following data: a) The Intermediate Bilocation Key, Kis; and b) the Receiver anti-replay nonce, N REPR. The Bilocation Key, K BK, is created based on, without limitation, for example K_BK=#(K_IS, N_REPR). The KNode (Receiver) then creates a random Bilocation Key ID, ID_BK.

In step 347, the second key node 106b (KNode (Receiver) or KNode R) uses the secure channel 105b (or quantum-secure channel 115b) to return the Bilocation Key, K BK, the Receiver anti-replay nonce, N REPR, the ID ID BK and the check value C (equal to N IR) to the Receiver endpoint 104b (e.g. Return_Bilocation_Key (K BK, N REPR)). The Initiator checks that the returned check value C matches the hashed nonce N IR' to prevent replay attacks against the client; if the values don't match, an exception is thrown. The Receiver also calculates the final bilocation key K BK' by combining K BK with the original compound hash N IR (thus preventing the KNode from calculating K BK'=#(N IR, K BK)). Once this has been sent, the second key node 106b (e.g. KNode (Receiver) or KNode R) zeros or deletes the data representative of K IS and/or K BK.

As an option, the bilocation key establishment process 340 may be modified such that, in order to provide symmetry with the process on the Initiator side, the Receiver endpoint 104b could instead request the Intermediate Bilocation Key from the second key node 106b (e.g. KNode R) and anti-replay nonce N_REPR, and instead of the second key node 106b (or HSM) forming and sending the Bilocation Key, the Intermediate Bilocation Key may be sent by the second key node 106b to the Receiver endpoint 104b where the Receiver endpoint generates the Bilocation Key, K BK, rather than being formed by the second key node 106b (e.g. KNode_R) itself.

After the bilocation key establishment process 340, the Receiver endpoint 104b receives the bilocation key, K BK, that was created/generated and/or sent by the second key node 106b based on the bilocation key establishment process 340. The key establishment process 300 now proceeds to the final handshake process 350 of the session establishment protocol/process 300 for establishing a key for use by the Initiator endpoint 104a and Receiver endpoint 104b in a communication session therebetween. Referring to FIG. 3c, the final handshake process 350 between the Receiver endpoint 104b and the Initiator endpoint 104a may include the following steps of:

In step 351, the Receiver endpoint 104b sends the following data to the Initiator endpoint 104a through the open connection therebetween, or if closed opens another connection with the Initiator endpoint 104a: a) the Receiver's anti-replay nonce, N REPR, and the Bilocation Key ID ID BK, and optionally, if not done so already in the first handshake process 310, b) a further "trustless" nonce N Tthat may be generated by the Receiver endpoint 104b. Thus, both receiver endpoint 104b and initiator endpoint 104a have the "trustless" nonce N T. The "trustless" nonce N T may be used by the Initiator and Receiver endpoints 104a and 104b in first key creation process 355 during creation of the Final Key and ensures that the cloud service or applications of the cloud system 100 (or quantum cloud service of the quantum cloud 110/120) can never know the Final Key shared between the Initiator and Receiver endpoints 104a and 104b.

In step 352, the Initiator endpoint 104a creates the Bilocation Key, K BK, by hashing the following data: a) The Intermediate Bilocation Key, K IS; and b) The Receiver's anti-replay nonce, N REPR. The Bilocation Key, K BK, is created at the Initiator endpoint 104a based on, without limitation, for example K_BK=#(K_IS, N_REPR). The Initiator calculates the final bilocation key K BK' by combining K BK with the original compound hash N IR (thus preventing the KNode from calculating K BK' or #(N IR, K BK)). Thus, the Initiator endpoint 104a and Receiver endpoint 104b have a shared K_BK'. That is, both Initiator endpoint 104a and Receiver endpoint 104b are now in possession of the same final Bilocation Key, K BK, with the ID ID BK, where each of the parties has received their copy of the key rooted in a different geographical location. This final Bilocation Key, K BK', can be used directly for secure communications since it cannot be calculated by either of the KNodes. Alternatively, it can be used as a shared secret between the Initiator and Receiver to derive one or more session keys, as below. This is because the first and second key nodes 106a and 106b are in different and distinct geographic locations. By sharing the Bilocation Key ID during session key establishment, it is possible for multiple bilocation keys to be handled simultaneously.

Figure 3D:
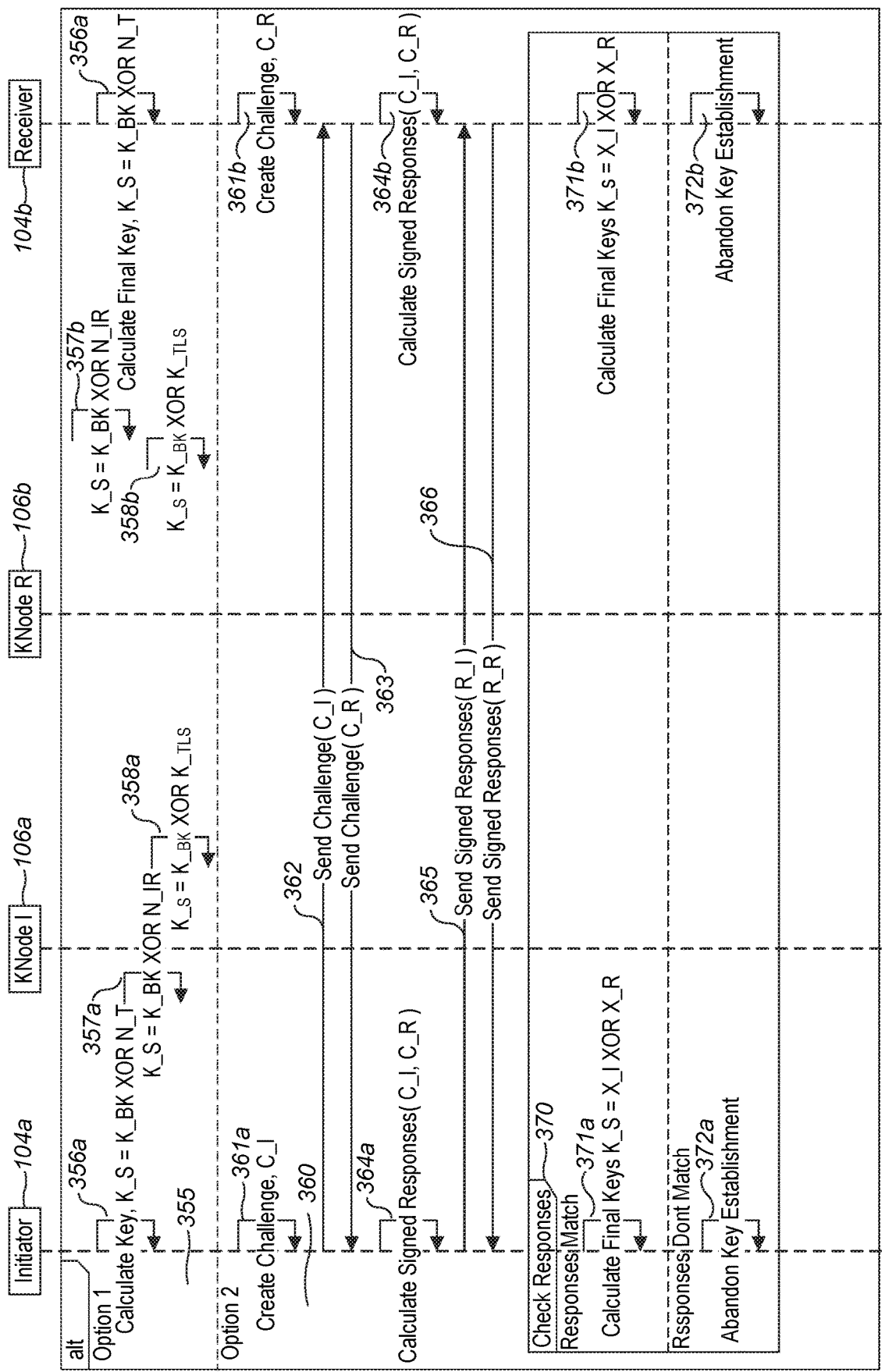
FIG. 3d is a signal flow sequence diagram illustrating an example key creation process and another example key creation process for use with a key establishment process according to some embodiments of the invention.

The key establishment process 300 now proceeds to FIG. 3d, where the Final Key for the Initiator and Receiver endpoints is established via, without limitation, for example a first and second key creation process(es) 355 and 360. In first key creation process 355 (e.g. option 1), the Final Key is calculated using key information (e.g. K_BK) and nonce information (e.g. N T, N IR). In the second key creation process 360 (e.g. option 2), the Final Key is calculated using a challenge/response protocol.

Referring to FIG. 3d, given that the Initiator endpoint 104a and the Receiver endpoint 104b now have the same bilocation key, K BK, they may then agree on how to create the Final Key. In the first key creation process 355, the Initiator and Receiver endpoints 104a and 104b may agree on a nonce or nonce(s) (e.g. N_IR and/or N_T) and/or key information (e.g. K_TLS, a Transport Layer Security (TLS) session key) for use in creating the Final Key.

In a first example of the first key creation process 355 (e.g. option 1) for calculating the Final Key at the Initiator device 104a and the Receiver device 104b of the key establishment process 300 may include the following steps of:

In step 356a, the Initiator endpoint 104a creates the Final Key, K S, by XORing with the nonce, NT, created by the Receiver, which is known to both Initiator endpoint 104a and Receiver endpoint 104b but not by the quantum cloud system/infrastructure 100. The Final Key may be calculated by the Initiator endpoint 104a based on, without limitation, for example K_S =K_BK XOR N_T.

In step 356b, the Receiver endpoint 104b also creates the Final Key, K S, by XORing with the nonce, N T, created by the Receiver endpoint 104b, which is known to both Initiator endpoint 104a and Receiver endpoint 104b but not by the quantum cloud system/infrastructure 100. The Final Key may be calculated by the Receiver endpoint 104b based on, without limitation, for example K_S=K_BK XOR N_T.

In a second example of the first key creation process 355 (e.g. option 1) for calculating the Final Key at the Initiator device 104a and the Receiver device 104b of the key establishment process 300 may include the following steps of:

In step 357a, the Initiator endpoint 104a creates the Final Key, K S, by XORing with the nonce, N IR, created by the Receiver, which is known to both Initiator endpoint 104a and Receiver endpoint 104b. The Final Key may be calculated by the Initiator endpoint 104a based on, without limitation, for example K_S=K_BK XOR N_IR. Alternatively, for added security or if the Initiator endpoint 104a receiver N T from the Receiver endpoint 104b, then K_S=K_BK XOR N_IR XOR N_T.

In step 357b, the Receiver endpoint 104b also creates the Final Key, K S, by XORing with the nonce, N IR, created by the Receiver endpoint 104b, which is known to both Initiator endpoint 104a and Receiver endpoint 104b. The Final Key may be calculated by the Receiver endpoint 104b based on, without limitation, for example K_S=K_BK XOR N_IR. Alternatively, for added security or if the Receiver endpoint 104b generated nonce N T, then K_S=K_BK XOR N_IR XOR N_T.

In a third example of the first key creation process 355 (e.g. option 1) for calculating the Final Key at the Initiator device 104a and the Receiver device 104b of the key establishment process 300 may include the following steps of:

In step 358a, the Initiator endpoint 104a creates the Final Key, K S, by XORing with another key such as, without limitation, for example a TLS session key, K TLS of a TLS session between the Initiator the Receiver endpoints 104a and 104b, which is known to both Initiator endpoint 104a and Receiver endpoint 104b. The Final Key may be calculated by the Initiator endpoint 104a based on, without limitation, for example K_S=K_BK XOR K_TLS. Alternatively, for added security or if the Initiator endpoint 104a receiver N T from the Receiver endpoint 104b, then K_S=K_BK XOR K_TLS XOR N_T.

In step 358b, the Receiver endpoint 104b also creates the Final Key, K S, by XORing with another key such as, without limitation, for example a TLS session key, K TLS of a TLS session between the Initiator the Receiver endpoints 104a and 104b, which is known to both Initiator endpoint 104a and Receiver endpoint 104b and is unknown to the cloud system 100 or secure network 102 (or quantum cloud system 110/120 and quantum network 112/122). The Final Key K_S may be calculated by the Receiver endpoint 104b based on, without limitation, for example K_S=K_BK XOR K_TLS. Alternatively, for added security or if the Receiver endpoint 104b generated nonce NT, then K_S=K_BK XOR K_TLS XOR N_T.

Thereafter, the Initiator endpoint 104a and Receiver Endpoint 104b may use the Final Key, K_S, therebetween. For example, the Initiator endpoint 104a and Receiver Endpoint 104b may, without limitation, for example initiate a secure communication session using the Final Key, K S, to encrypt their communications channel and/or data communicated therebetween and/or for any other purpose as the application demands. Thus, the Initiator device and Receiver endpoint/device 104a-104b may use the above-mentioned key establishment process 300 to generate or establish a Final Key, K_S, that may be used for, without limitation, for example secure communications between the Initiator and Receiver endpoints/devices; quantum-secure communications therebetween when QKD keys are used in the calculation of the Bilocation Key; establish further shared keys between the Initiator and Receiver endpoints/devices 104a and 104b for use in, without limitation, for example other group key establishment protocols for establishing a group key among a group of parties including the Initiator and Receiver endpoints/devices; secure a communication session between the Initiator and Receiver devices; establish a long-lived communication channel between the Initiator and Receiver endpoints/devices; the Final Key that is established may form a signing secret between the Initiator and Receiver endpoints/devices 104a and 104b, which may be used, without limitation, for example to create a message authentication code (MAC) or tag etc.; the Final Key established between the Initiator and Receiver endpoints/devices 104a and 104b may be used for any other type of cryptography application/operations performed by each of or between the Initiator and Receiver endpoints/devices 104a and 104b and the like; modifications thereof; combinations thereto; and/or as the application demands. This ends the key establishment process/protocol 300 between the Initiator endpoint 104a and the Receiver endpoint 104b when using the cloud system/infrastructure 100 or quantum cloud system/infrastructure 110/120.

Referring to FIG. 3d, given that the Initiator endpoint 104a and the Receiver endpoint 104b now have the same bilocation key, K BK, they may then agree on how to create the Final Key. The second key creation process 360 (e.g. option 2) using a challenge/response protocol for calculating the Final Key at the Initiator endpoint/device 104a and the Receiver endpoint/device 104b of the session establishment process 300 includes the following steps of:

In step 361a, the Initiator endpoint 104a creates a random challenge nonce, C I.

In step 361b, the Receiver endpoint 104b creates a random challenge nonce, C R.

In step 362, the Initiator endpoint 104a sends the random challenge nonce, C and the ID of a previously agreed Bilocation Key ID BK to the Receiver endpoint 104b.

In step 363, the Receiver endpoint 104b sends the random challenge nonce, C_R, to the Initiator endpoint 104a.

In step 364a, the Initiator endpoint 104a initially calculates an intermediate key value, K_X, which is set to the final Bilocation Key with the ID ID BK (which is unknown to the KNodes) K_BK' (e.g. K_X=K_BK'). Alternatively, the intermediate key value, K_X, may be derived from the TLS session key, K_TLS, between Initiator and Receiver endpoints 104a and 104b in which K_X is set to #(K_BK', K_TLS) or some other combination of K_X and K_TLS (e.g. K_X=#(K_BK',K_TLS) or K_X=K_TLS XOR K_BK'). The Receiver endpoint 104b also performs the corresponding matching operations to calculate K_X, so that the K_X calculated at the Receiver endpoint 104b is the same as the K_X calculated at the Initiator endpoint 104a. In any event, the Initiator endpoint 104a calculates the signed responses using K_X, C I and the received C R based on the following values of: X I=#(K_X, CJ, 0); X R = # (K_X, C_R, 1); R_I=#(XI, C_R); R_R=#(X R, C_I), where # is a hash function.

In step 364b, similarly, the Receiver endpoint 104b initially calculates an intermediate key value, K_X, which is set to K_BK' (e.g. K_X=K_BK'). Alternatively, the intermediate key value, K_X, may be derived from the TLS session key, K_TLS, between Initiator and Receiver endpoints 104a and 104b in which K_X is set to #(K_BK', K_TLS) or some other combination of K_X and K_TLS (e.g. K_X=#(K_BK', K_TLS) or K_X=K_TLS XOR K_BK'). The Receiver endpoint 104b also performs the corresponding matching operation to calculate K_X so that the K_X calculated at the Receiver endpoint 104b is the same as the K_X calculated at the Initiator endpoint 104a in step 364a. In any event, the Receiver endpoint 104b calculates the signed responses using K_X, C R and the received C_I based on the following values of: X I=#(K_X, CJ, 0); X R=#(K_X, C_R, 1); R_I=#(X 1, C_R); R_R = # (X R, C_I), where # is the same hash function used by the Initiator endpoint 104a in step 364a.

In step 365, the Initiator endpoint 104a returns the challenge response or signed response R I to the Receiver endpoint 104b (e.g. Send_Signed_Response (R I)).

in step 366, the Receiver endpoint 104b returns the challenge response or signed response R R to the Initiator endpoint 104b (e.g. Send_Signed_Response (R R)).

For example, challenge response checking process 370 may be used by the Initiator endpoint 104a and Receiver endpoint 104b to check that the received signed responses are correct or not. The Challenge response checking process 370 includes the steps of:

In step 371a, the Initiator endpoint 104a confirms whether the R R received from the Receiver endpoint 104b matches the value of R R that the Initiator endpoint 104a calculated in step 364a. If the received R R matches the R R that the Initiator endpoint 104a calculated, then the Initiator endpoint calculates the Final Key, K S, based on, without limitation, for example K_S=X I XOR XR or K_S=#(X 1, X R). Alternatively, as an option, if N_T was sent from the Receiver endpoint 104b to the Initiator endpoint 104a, then this may also be applied in which the Final Key, K_S=K_BK XOR N_IR XOR N_T or K_S=X I XOR XR XOR N_T. Otherwise, the process 370 performed by the Initiator endpoint 104a proceeds to step 372a.

In step 372a, the connection is abandoned as the R R received from the Receiver endpoint 104b does not match the value of R R that the Initiator endpoint 104a calculated.

In step 371b, the Receiver endpoint 104b confirms whether the R I received from the Initiator endpoint 104b matches the value of R I that the Receiver endpoint 104b calculated in step 364b. If the received R I matches the RI that the Receiver endpoint 104b calculated, then the Receiver endpoint calculates the Final Key, K S, based on, without limitation, for example K_S=X I XOR X R or K_S=#X I, X R). Alternatively, as an option, if NT was sent from the Receiver endpoint 104b to the Initiator endpoint 104a, then this may also be applied in which the Final Key, K_S=K_BK XOR N_IR XOR N_T or K_S=X I XOR XR XOR N_T. In step 371b, the Receiver endpoint 104b is configured to agree or perform the same operations that the Initiator endpoint 104a uses when generating/calculating K_S. Otherwise, the process 370 performed by the Receiver endpoint 104b proceeds to step 372b.

In step 372b, the connection is abandoned as the R/received from the Initiator endpoint 104a does not match the value of R I that the Receiver endpoint 104b calculated.

Thereafter, if the connection is not abandoned, then the Initiator endpoint 104a and Receiver Endpoint 104b may use the Final Key, K_S, therebetween. For example, the Initiator endpoint 104a and Receiver Endpoint 104b may, without limitation, for example initiate a secure communication session using the Final Key, K S, to encrypt their communications channel and/or data communicated therebetween and/or for any other suitable purpose as the application demands. Thus, the Initiator device and Receiver endpoint/device 104a-104b may use the above- mentioned key establishment process 300 to generate or establish a Final Key, K_S, that may be used for, without limitation, for example secure communications between the Initiator and Receiver endpoints/devices; quantum- secure communications therebetween when the set of keys are QKD keys; establish further shared keys between the Initiator and Receiver endpoints/devices 104a and 104b for use in, without limitation, for example other group key establishment protocols for establishing a group key among a group of parties including the Initiator and Receiver endpoints/devices; secure a communication session between the Initiator and Receiver devices; establish a long-lived communication channel between the Initiator and Receiver endpoints/devices; the Final Key that is established may form a signing secret between the Initiator and Receiver endpoints/devices 104a and 104b, which may be used, without limitation, for example to create a message authentication code (MAC) or tag etc.; the Final Key established between the Initiator and Receiver endpoints/devices 104a and 104b may be used for any other type of cryptography application/operations performed by each of or between the Initiator and Receiver endpoints/devices 104a and 104b and the like; modifications thereof; combinations thereto; and/or as the application demands. This ends the key establishment process/protocol 300 between the Initiator endpoint 104a and the Receiver endpoint 104b when using the cloud system/infrastructure 100 (or quantum cloud system/infrastructure 110/120).

Although the first key node (e.g. KNodeA) and second key node (e.g. KNodeB) are described in FIGS. 3a to 3d as being located in different geographical locations (e.g. KNodeA⇔KNodeB), this is for simplicity and by way of example only and the invention is not so limited, it is to be appreciated by the skilled person that the key establishment systems, apparatus and process(es) according to the invention and/or as described herein with reference to FIGS. 3a to 3d and/or herein described are also applicable to or can be modified to take into account when first key node and second key nodes are the same key node, or have two different logical locations on the same key node, or are the same logical key node (e.g. KNode A==KNode B), where both Initiator endpoint/device and Receiver endpoint/device communicate with the same server/computing device of the KNode or logical KNode rather than two different geographically located servers/computing devices of two different KNodes, and the resulting KNode may be configured to select a key from the set of keys (e.g. a QKD key from an array of QKD keys) "shared with itself (i.e. keys that it alone owns or knows) for use in generating the Bilocation or Intermediate Bilocation keys for the corresponding endpoints/devices when establishing a key between the Initiator endpoint/device and Receiver endpoint/device.

Figure 4A:
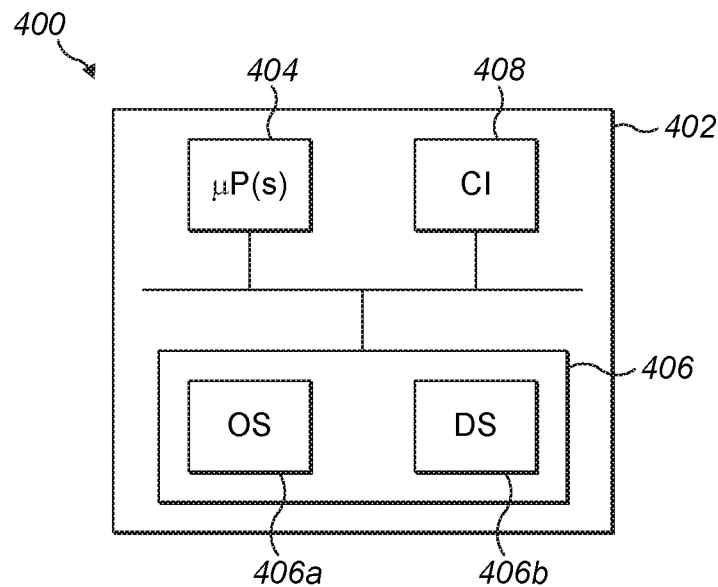
FIG. 4a is a schematic diagram illustrating an example computing system, device or apparatus for use in implementing one or more portions of an example key establishment protocol/process according to the invention.

FIG. 4a is a schematic diagram of an example computing system 400 for use in implementing and/or performing a session establishment protocol/process according to aspects of the invention. Computing system 400 may be used to implement one or more aspects of the systems, apparatus, QS servers, key nodes, endpoints, devices, methods, key establishment protocol(s), key establishment process(es), first and second device(s)/endpoints, Initiator endpoints/devices, Receiver endpoints/devices, and/or use cases as described with reference to FIGS. Ia to 3d, combinations thereof, modifications thereto, as herein describe and/or as the application demands. Computing system 400 includes a computing device or apparatus 402 (e.g. QS server, first or second key node, first and/or second device(s)). The computing device or apparatus 402 includes one or more processor unit(s) 404, memory unit 406 and a communication interface 408 in which the one or more processor unit(s) 404 are connected to the memory unit 406, the communication interface 408. The communications interface 408 may connect the computing device or apparatus 402 with one or more other computing devices and/or apparatus (e.g. key nodes, Initiator devices/endpoints, Receiver devices/endpoints, first and/or second device(s)/endpoint(s)) (not shown) to establish a Final Key between a first and a second device (Initiator and Receiver endpoint) based on the key establishment protocol/process(es) as described with reference to FIGS. Ia to 3d according to the invention as described herein, combinations thereof, modifications thereto as the application demands. The memory unit 406 may store one or more program instructions, code or components such as, by way of example only but not limited to, an operating system 406a for operating computing device 402, and a data store 406b for storing computer program instructions, executable code, code and/or components associated with implementing the functionality and/or one or more function(s) or functionality associated with one or more portions of the session establishment protocol/process(es), one or more session establishment process(es), one or more key nodes, one or more first and/or second devices, one or more Initiator and/or Receiver endpoints; one or more method(s) and/or process(es) of performing a key establishment process or protocol for establishing a Final Key between an Initiator endpoint/first device and a Receiver endpoint/second device according to the invention, system(s)/platforms, combinations thereof, modifications there to, and/or as described herein with reference to at least any one of FIGS. Ia to 3d.

Figure 4B:
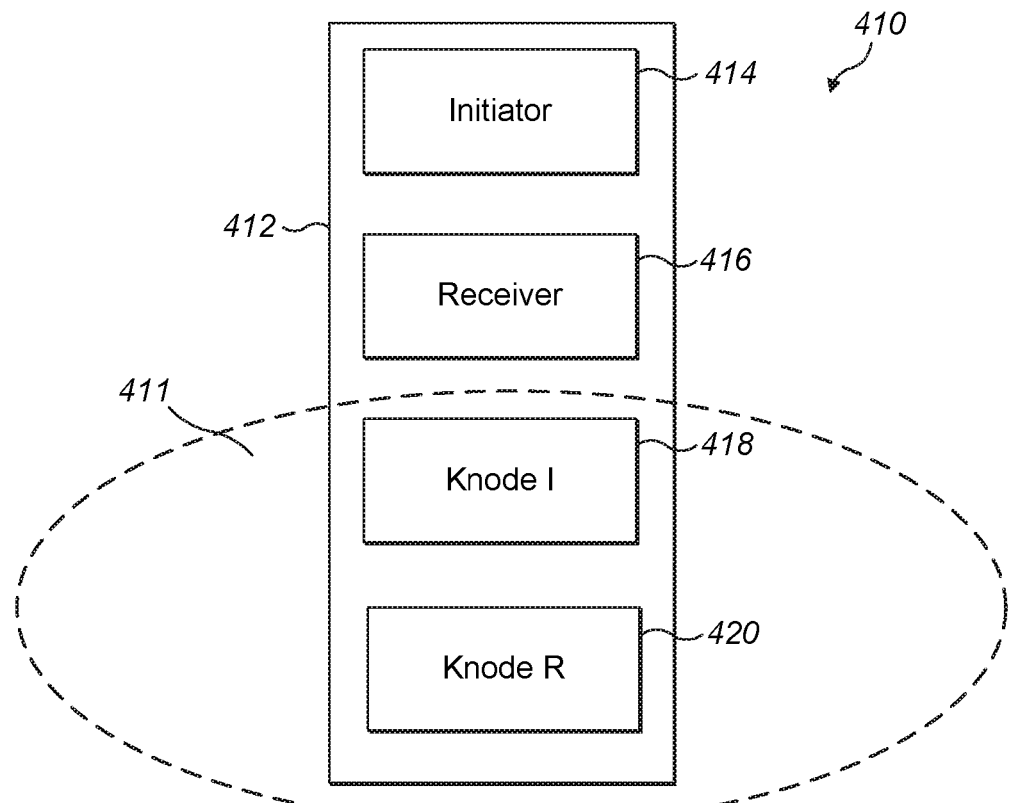
FIG. 4b is a schematic diagram illustrating an example system for use in implementing an example key establishment protocol/process according to the invention Common reference numerals are used throughout the figures to indicate similar features.

FIG. 4b is a schematic diagram of another example cloud system 420 for facilitating and/or implementing a key establishment protocol and/or process(es) for use by an Initiator endpoint 414 and a Receiver end point 416 thereto according to the invention. The cloud system 420 may include a plurality of computing devices or apparatus 402 that includes an Initiator endpoint 414, an Receiver endpoint 416, and a classically or quantum-secure network 411 including a first key node/secure sever (KNode I) 418 that may be accessed by the Initiator endpoint 414 over a secure channel (e.g. classically or quantum secure channel depending whether a classically secure network 102 or quantum-secure network 112 or 122 is used) and a second key node/secure server (KNode R) 420 that may be accessed by the Receiver endpoint 416 over another secure channel (e.g. classically or quantum secure channel depending whether a classically secure network 102 or quantum-secure network 112 or 122 is to be used). The first key node 418 and second key node 420 are located at different geographical locations but share a set of distributed keys (e.g. classically distributed keys and/or quantum distributed keys depending on whether a classically secure network 102 or quantum-secure network 112 or 122 is to be used). The Initiator endpoint 414, Receiver endpoint 416, first key node 418 and second key node 420 are configured to operate and/or implement the corresponding steps and/or functions of the key establishment protocol/process(es) according to the invention for establishing a key for a communication session between the Initiator endpoint 414 and the Receiver endpoint 416 as described with reference to said one or more systems 100, 110, 120 of FIGS. 1a, 1b and/or 1c, one or more key establishment process(es)/method(s) 200, 210, 230, 240, 240, 260, 270 of FIGS. 2a to 2g, one or more key establishment process(es)/method(s) 300, 310, 315, 320, 330, 335, 340, 350, 355, 360, 370 of FIGS. 3a to 3d, combinations thereof, modifications thereto and/or as herein described with reference to any one of FIGS. Ia to 4a.

Although the following description may describe that the first key node (e.g. KNodeA) and second key node (e.g. KNodeB) are located in different geographical locations (e.g. KNodeA⇔KNodeB), this is for simplicity and by way of example only and the invention is not so limited, it is to be appreciated by the skilled person that the key establishment systems, apparatus and process(es) according to the invention and/or as described herein with reference to figures 1a to 4b and/or herein described are also applicable to or can be modified to take into account when first key node and second key nodes are the same key node, or have two different logical locations on the same key node, or are the same logical key node (e.g. KNode A==KNode B), where both Initiator endpoint/device and Receiver endpoint/device communicate with the same server/computing device of the KNode or logical KNode rather than two different geographically located servers/computing devices of two different KNodes, and the resulting KNode may be configured to select a key from the set of keys (e.g. a QKD key from an array of QKD keys) "shared with itself (i.e. keys that it alone owns or knows) for use in generating the Bilocation or Intermediate Bilocation keys for the corresponding endpoints/devices when establishing a key between the Initiator endpoint/device and Receiver endpoint/device.

For the embodiments described above, each of the signed secrets and/or responses processed by the Initiator and the Receivers may be symmetrically signed by the cloud server(s)/service(s).

While in the embodiments described above, the Intermediate Bilocation Key is determined at the Initiator, the Intermediate Bilocation Key may, in some embodiments, be determined at the Receiver without modifying other aspects of the embodiments described above. Similarly, the Bilocation Key may, in some embodiments, be determined at the Initiator without modifying other aspects of the embodiments described above.

In the embodiments described above the server or computing device may comprise a single server/computing device or a network of servers/computing devices. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device. Although illustrated as a local device it will be appreciated that the computing device may be located remotely and accessed via a network or other communication link (for example using a communication interface). The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something". Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of establishing a key between a first device and a second device in a network, the network comprising a first key node and a second key node, the first key node and second key node with access to a same set of keys, wherein the first key node and the second key node have different geographical or logical locations, the method comprising:
    receiving, at the first device, data representative of first key establishment data from at least the first key node and the second device for use in calculating a Bilocation Key, wherein the Bilocation Key is based on a selected key from the set of keys; and
    receiving, at the second device, data representative of second key establishment data from at least the first device for use in requesting the Bilocation Key from the second key node, wherein the Bilocation Key is calculated based on the selected key from the set of keys, wherein the first device and the second device have the same Bilocation Key, wherein each copy of the Bilocation Key at the first device and the second device is derived from data located at different physical or logical locations;
    wherein the first and second devices use their corresponding Bilocation Keys to each generate a Final Key based on an agreed portion of the first key establishment data and second key establishment data.

2. The computer-implemented method according to claim 1, wherein the first device and the second device are using a quantum-secure network, the quantum-secure network comprising the first key node and the second key node, the set of keys of the first key node and second key node being a set of quantum distributed keys that are the same, the method further comprising:
    receiving, at the first device, data representative of first key establishment data from at least the first key node and the second device for use in calculating the Bilocation Key, wherein the Bilocation Key is based on a selected quantum distributed key from the set of quantum distributed keys; and
    receiving, at the second device, data representative of second key establishment data from at least the first device for use in requesting the Bilocation Key from the second key node, wherein the Bilocation Key is calculated based on the selected quantum distributed key from the set of quantum distributed keys;
    wherein the first and second devices use their corresponding Bilocation Keys to each generate the Final Key based on an agreed portion of the first key establishment data and second key establishment data.

3. The computer-implemented method according to claim 1, wherein the Final Key is calculated by each of the first and second devices based on combining their corresponding Bilocation Keys with an agreed combination of one or more random nonces received in the first or second session establishment data therebetween.

4. The computer-implemented method according to claim 1, wherein the Final Key is calculated by each of the first and second devices based on their corresponding Bilocation Keys and a challenge response protocol the results of which are used to agree the Final Key.

5. The computer-implemented method according to claim 1, wherein receiving, at the first device, data representative of first session establishment data further comprises:
    performing a first handshake with the second device to receive data representative of identity data associated with the second device and second key node, and a first nonce generated by the second device;

requesting an Intermediate Bilocation Key from the first key node, wherein the request includes data representative of the retrieved identity data and a third nonce computed from the received first nonce and a second nonce generated by the first device, wherein the first key node uses the request data and a selected key from the set of keys to establish the Intermediate Bilocation Key and a first anti-replay nonce;

receiving the Intermediate Bilocation Key and the first anti-replay nonce from the first key node; and performing a further handshake with the second device for receiving a second anti-replay nonce from the second device after the second device receives the Bilocation Key and the second anti-replay nonce from the second key node.

6. The computer-implemented method according to claim 5, wherein receiving, at the second device, data representative of second session establishment data further comprises:

performing a second handshake with the first device to receive data representative of identity data associated with the first device and first key node, and the first anti-replay nonce, and the second nonce;

requesting a Bilocation Key from the second key node, wherein the request includes data representative of the retrieved identity data, a third nonce computed from the first nonce and second nonce, and the first anti-replay nonce, wherein the second key node uses the data in the request and a selected key from the set of keys to generate the Bilocation Key;

receiving the Bilocation Key from the second key node and a second anti- replay nonce generated by the second key node.

7. The computer-implemented method according to claim 1, wherein receiving, at the first device, data representative of first session establishment data further comprises:

sending, by the first device, a first handshake request for the second device to provide data representative of: the identity of the second device; the identity of the second key node; and a first nonce generated by the second device;

receiving, from the second device, data representative of: the generated first nonce; the identity of the second device; and the identity of the second key node;

generating, by the first device, a second random nonce;

sending, from the first device, an Intermediate Bilocation Key request to the first key node, wherein the Intermediate Bilocation Key request includes data representative of: the identity of the second device, the identity of the second node, a third nonce based on combining the first and second nonces;

receiving, at the first device, the Intermediate Bilocation Key established by the first key node and a first anti-replay nonce generated by the first key node;

sending, by the first device, a second handshake message to the second device including data representative of: the second nonce and first anti-replay nonce; the identity of the first device; and the identity of the first key node;

generating at the second device the third nonce based on the received second nonce and its generated first nonce;

sending, by the second device, a Bilocation Key request to the second key node including data representative of: the third and first anti-replay nonces; the identity of the first device; and the identify of the first key node;

receiving, at the second device, the Bilocation Key established by the second key node and a second anti-replay nonce generated by the second key node, wherein the second key node establishes the Bilocation Key based on generating the Intermediate Bilocation Key based on the received data from the second device and combining the Intermediate Bilocation Key with the second anti-replay nonce;

sending, from the second device, in a further handshake message the received second anti-replay nonce to the first device;

generating, at the first device, the Bilocation key based on combining the received second anti-replay nonce with the received Intermediate Bilocation Key;

wherein the first device and second device each establish a Final Key therebetween based at least on the Bilocation key.

8. The computer-implemented method according to claim 5, further comprising establishing, at the first key node, an Intermediate Bilocation Key for use by the first device in calculating the Bilocation Key, wherein establishing the Intermediate Bilocation Key comprises:

receiving, at the first key node from the first device, a Intermediate Bilocation Key request to generate the Intermediate Bilocation Key, wherein the request includes data representative of: the identity of the second device, the identity of the second key node, and a third nonce which is derived from a first random nonce generated by the second device and a second random nonce generated by the first device;

selecting, at the first key node, a key from the set of keys accessible by the first key node using a key selection function with inputs based at least on data representative of the identity of the second device, the identity of the second key node, the identity of the first device, the identity of the first key node, and the third nonce, wherein the set of keys accessible by the first key node are the same as the set of keys accessible by the second key node;

generating, at the first key node, a first random anti-replay nonce;

generating, at the first key node, the Intermediate Bilocation Key based on the selected key, the first anti-replay nonce, the identity of the second device, the identity of the second key node, the identity of the first device, the identity of the first key node, and the third nonce;

sending, from the first key node to the first device, the Intermediate Bilocation Key and the first anti-replay nonce.

9. The computer-implemented method according to claim 5, further comprising establishing, at the second key node, the Bilocation Key for use by the second device in calculating the Key, wherein establishing the Bilocation Key comprises:

receiving, at the second key node from the second device, a request for a Bilocation Key, wherein the request includes data representative of: the identity of the first device, the identity of the first key node, a third nonce derived from a first random nonce generated by the second device and a second random nonce generated by the first device, and a first anti- replay nonce received at the second device from the first device;

selecting a key from the set of keys accessible by the second key node using a key selection algorithm based at least on the identity of the second device, the identity of the second key node, the identity of the first device, the identity of the first key node, and the third nonce, wherein the set of keys accessible by the first key node are the same as the set of keys accessible by the second key node;

generating, at the second key node, the Intermediate Bilocation Key based on the selected key, the first anti-replay nonce, the identity of the second device, the identity of the second key node, the identity of the first device, the identity of the first key node, and the third nonce;

generating, at the second key node, a second random anti-replay nonce;

generating, at the second key node, the Bilocation Key based on combining the Intermediate Bilocation Key with the second anti-replay nonce; and sending, from the second key node to the second device, data representative of the Bilocation Key and the second anti-replay nonce.

10. The computer-implemented method according to claim 5, wherein sending, from the first device, the Intermediate Bilocation Key request further comprises:

generating, by the first device, a second random nonce, N_I;

generating, by the first device, the third nonce, N_IR, based on the second random nonce, N_I, and the first random nonce, N_R;

creating, by the first device, a first incomplete link-info data packet, L_I, based on data representative of at least: the identity of the second device, ID_R; the identity of the second key node, KID_R; and the third nonce, N_IR;

sending, from the first device to the first key node, a Intermediate Bilocation Key requests, wherein the request includes data representative of the first incomplete link-info data packet, L_I.

11. The computer-implemented method according to claim 10, wherein the first incomplete link-info packet takes the form L_I = {ID_R, KID_R, N_IR}.

12. The computer-implemented method according to claim 1, wherein each of the key nodes are part of a quantum-secure network, and each set of keys are a set of quantum distributed keys delivered using a quantum key distribution system.

13. The computer-implemented method according to claim 1, wherein each of the key nodes are part of a classically-secure network, and each set of keys or distributed keys are delivered using a classical key distribution system.

14. The computer-implemented method according to claim 1, wherein:

communications between the first device and the first key node are performed over a first quantum-secure channel;

communications between the second device and the second key node are performed over a second quantum-secure channel; and communications between the first device and second device are performed, during establishment of the Final Key over a classical communications channel.

15. A system comprising a first device and a second device and a secure network, the secure network comprising a first key node and a second key node, the first key node including or accessing a set of keys and the second key node including or accessing the same set of keys, wherein each of the first device, the second device, the first key node and second key node include a processor unit, a memory unit, and a communication interface, the processor unit connected to the memory unit and the communication interface, wherein the processor unit, memory unit and communication interface are adapted to implement the corresponding steps of the computer-implemented method for establishing a key between the first device and the second device, the method comprising:

receiving, at the first device, data representative of first key establishment data from at least the first key node and the second device for use in calculating a Bilocation Key, wherein the Bilocation key is based on a selected key from the set of keys; and receiving, at the second device, data representative of second key establishment data from at least the first device for use in requesting the Bilocation Key from the second key node, wherein the Bilocation Key is calculated based on the selected key from the set of keys, wherein the first device and the second device have the same Bilocation key, wherein each copy of the Bilocation Key at the first device and the second device is derived from data located at different physical or logical locations;

wherein the first and second devices use their corresponding Bilocation Keys to each generate a Final Key based on an agreed portion of the first key establishment data and second key establishment data.

* * * * *